United States Patent
Brocklebank et al.

(10) Patent No.: US 12,242,940 B1
(45) Date of Patent: Mar. 4, 2025

(54) DYNAMIC SIMULATION ANALYTICS

(71) Applicant: SAS Institute Inc., Cary, NC (US)

(72) Inventors: John Clare Brocklebank, Franklin, TN (US); Ann L. Cutrell, Durham, NC (US); Savera Tanwir, Morrisville, NC (US); William Cyrus Bradford, Durham, NC (US)

(73) Assignee: SAS INSTITUTE INC., Cary, NC (US)

( * ) Notice: Subject to any disclaimer, the term of this patent is extended or adjusted under 35 U.S.C. 154(b) by 0 days.

(21) Appl. No.: 18/733,296

(22) Filed: Jun. 4, 2024

Related U.S. Application Data

(60) Provisional application No. 63/556,704, filed on Feb. 22, 2024, provisional application No. 63/618,755, filed on Jan. 8, 2024, provisional application No. 63/606,460, filed on Dec. 5, 2023.

(51) Int. Cl.
*G06N 20/00* (2019.01)

(52) U.S. Cl.
CPC .................. *G06N 20/00* (2019.01)

(58) Field of Classification Search
CPC .......... G06N 5/045; G06N 20/00; G06N 7/01; G06Q 10/06393
See application file for complete search history.

(56) References Cited

U.S. PATENT DOCUMENTS

| | | | |
|---|---|---|---|
| 2023/0043855 A1* | 2/2023 | Sall | G06F 40/18 |
| 2024/0273623 A1* | 8/2024 | Kilitcioglu | G06Q 40/04 |

OTHER PUBLICATIONS

SAS, "SAS Forecasting and Econometrics, How to perform a What-If Analysis in SAS/ETS", Oct. 6, 2016 pp. 1-6, SAS Institute Inc.
Littell, R. et al., "SAS For Linear Models", Fourth Edition, Cary, NC., Mar. 1, 2002, pp. 1-106, SAS Institute Inc.

* cited by examiner

*Primary Examiner* — Abdullah Al Kawsar
*Assistant Examiner* — Tewodros E Mengistu
(74) *Attorney, Agent, or Firm* — COATS & BENNETT, PLLC

(57) ABSTRACT

A computing device obtains a computer model that predicts a predicted output for a studied system. The device obtains an initial predicted state for an applied system according to initial inputs to the computer model. The device receives a request for derived inputs that will generate, for the applied system, a user-requested change in the initial predicted state. The device generates decision deltas for the computer model. The device determines allowable function inputs to a computer function. The allowable function inputs are derived based on the decision deltas, the user-requested change, and the computer model. The device computes, using one or more of the allowable function inputs, at least one minimum or maximum value for the computer function. The device outputs output information based on the derived inputs that, according to the computer model, will affect the user-requested change in the initial predicted state.

30 Claims, 30 Drawing Sheets

| Year 1602 | Location 1604 | Lack of health insurance AAP | Binge drinking among adults aged AAP | Visits to doctor within the past yr AAP | Current smoking among adults AAP | Mental health not good for 14 days AAP | Obesity among adults aged AAP | Physical health not good for 14 days AAP | Fair or poor self-rated health status AAP | Depression among adults AAP |
|---|---|---|---|---|---|---|---|---|---|---|
| 2018 | Anderson | 15.3 | 14.9 | 74.2 | 24.4 | 16.9 | 34.5 | 14.7 | | |
| 2019 | Anderson | 18.8 | 13.7 | 75.9 | 23.1 | 18.2 | 34.9 | 15.4 | 22.1 | 28.2 |
| 2020 | Anderson | 16.6 | 15.8 | 72.4 | 22.4 | 17.6 | 35.5 | 11.2 | 15.8 | 27.0 |
| 2021 | Anderson | 11.7 | 16.1 | 75.6 | 21.1 | 19.4 | 38.3 | 13.2 | 18.4 | 29.5 |
| 2018 | Bedford | 19.2 | 14.8 | 74.7 | 26.3 | 18.0 | 37.1 | 16.5 | | |
| 2019 | Bedford | 24.5 | 13.7 | 74.6 | 24.4 | 18.3 | 39.6 | 16.2 | 25.3 | 26.5 |
| 2020 | Bedford | 20.5 | 14.2 | 75.0 | 23.4 | 17.7 | 37.4 | 11.8 | 17.8 | 26.8 |
| 2021 | Bedford | 15.2 | 15.4 | 73.4 | 22.6 | 19.2 | 36.7 | 13.9 | 20.5 | 27.3 |
| 2018 | Benton | 18.6 | 14.7 | 73.9 | 29.9 | 19.7 | 36.7 | 18.5 | | |

FIG. 16A

| Year | Location | Lack of health insurance CPR | Binge drinking among adults aged CPR | Visits to doctor within the past yr CPR | Current smoking among adults CPR | Mental health not good for 14 days CPR | Obesity among adults aged CPR | Physical health not good for 14 days CPR | Fair or poor self-rated health status CPR | Depression among adults CPR |
|---|---|---|---|---|---|---|---|---|---|---|
| 2018 | Anderson | 14.6 | 13.0 | 77.1 | 23.1 | 15.9 | 34.7 | 16.2 | | |
| 2019 | Anderson | 18.0 | 12.0 | 78.6 | 22.0 | 17.0 | 35.1 | 16.9 | 23.9 | 27.4 |
| 2020 | Anderson | 15.9 | 13.7 | 75.3 | 21.3 | 16.2 | 35.6 | 12.4 | 17.7 | 25.9 |
| 2021 | Anderson | 11.2 | 14.1 | 78.2 | 20.3 | 17.9 | 38.4 | 14.5 | 20.2 | 28.2 |
| 2018 | Bedford | 18.6 | 14.0 | 76.0 | 25.9 | 17.6 | 37.3 | 17.4 | | |
| 2019 | Bedford | 24.1 | 13.3 | 75.4 | 24.3 | 18.1 | 39.7 | 16.7 | 25.8 | 26.5 |
| 2020 | Bedford | 19.9 | 13.4 | 76.3 | 23.1 | 17.1 | 37.6 | 12.5 | 18.8 | 26.5 |
| 2021 | Bedford | 14.7 | 14.6 | 74.7 | 22.4 | 18.6 | 37.0 | 14.6 | 21.5 | 26.9 |
| 2018 | Benton | 17.4 | 12.0 | 78.0 | 27.7 | 18.0 | 37.1 | 21.0 | | |

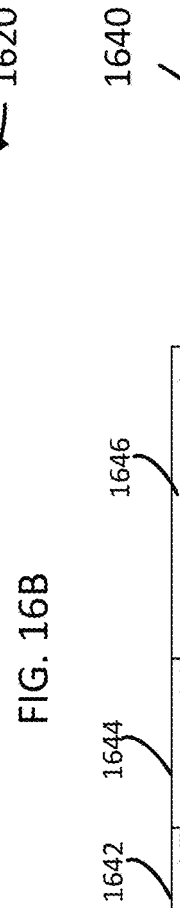

1640 ↙

| Year | County | Overdose Deaths |
|---|---|---|
| 2017 | Anderson | 107 |
| 2022 | Anderson | 75 |
| 2017 | Bedford | 5 |
| 2022 | Bedford | 15 |
| 2017 | Benton | 6 |
| 2022 | Benton | 6 |

| Dimensions | Overall ANOVA | Fit Statistics | Parameter Estimates | Type III Test | Assessment | Assessment Stats | Assessment Summary |

| Effect | DF | DenDF | F Value | Pr > F |
|---|---|---|---|---|
| adod_count_L2 | 1 | 86 | 2.9815 | 0.08781 |
| Below Poverty L1 | 1 | 86 | 8.0002 | 0.00582 |
| Multi-Unit Housing L1 | 1 | 86 | 7.8378 | 0.00632 |
| Uninsured L1 | 1 | 86 | 8.0556 | 0.00566 |
| Opiodisforpain_patients_L1 | 1 | 86 | 2.4528 | 0.12099 |
| Opiodisforpain_count_L1 | 1 | 86 | 4.2777 | 0.04162 |
| Benzodiaz_count_L1 | 1 | 86 | 6.7264 | 0.01116 |
| OutpatientVisitALLDOs_count_L2 | 1 | 86 | 5.9094 | 0.01714 |
| Year*County | 95 | 86 | 6.4452 | <0.00001 |

| Dimensions | Overall ANOVA | Fit Statistics | Parameter Estimates | Type III Test | Assessment | Assessment Stats | Assessment Summary |

Parameter Estimates — 1782

| Regressor | Parameter Estimate |
|---|---|
| Intercept | 435.686931 |
| adod_count_L2 | -0.214566 |
| Below Poverty L1 | 0.003377 |
| Multi-Unit Housing L1 | 0.023777 |
| Uninsured L1 | -0.009151 |
| Opioidsforpain_patients_L1 | 0.00793 |
| Opioidsforpain_count_L1 | -0.00248 |
| Benzodiaz_count_L1 | 0.003583 |
| OutpatientVisitALLDOs_count_L2 | -0.084151 |
| Year | -0.991086 |

Edit Constraints

| Input 2210 | Upper Bound 2220 | Lower Bound 2222 | Weight 2230 | Integer 2240 |
|---|---|---|---|---|
| Benzodiazopine RX | 220,000 | 196,000 | 1 | ✓ |
| Persons Living in Poverty | 220,000 | 0 | 3 | ✓ |
| Prescriptions of Opioids for Pain | Baseline | 40,000 | 2 | ✓ |
| Multi-unit Housing | Baseline+20,000 | Baseline-10,000 | 2 | ✓ |
| Amount of Air Pollutant (ppm) | | Baseline-2 | 2 | |

Submit 2260

To achieve a 10% targeted reduction in opioid-related deaths and 2% reduction in opioid-related hospital stays:
- increase media advertisements by 5%;
- increase community outreach personal by 2%; and
- increase % of school curriculum dedicated to opioid awareness by 0.5%

With a 10% targeted reduction in opioid-related deaths and 2% reduction in opioid-related hospital stays, the target area would need in one year:
- 2     Rehabilitation facilities
- 50    Outpatient Service Centers
- 100   Mental Health Professionals

FIG. 25

DYNAMIC SIMULATION ANALYTICS

CROSS-REFERENCE TO RELATED APPLICATIONS

This application claims the benefit of, and priority based on, 35 U.S.C. § 119 to U.S. Provisional Application No. 63/556,704, filed Feb. 22, 2024, U.S. Provisional Application No. 63/618,755, filed Jan. 8, 2024, and U.S. Provisional Application 63/606,460, filed Dec. 5, 2023, disclosures of each of which are incorporated herein by reference in their entirety.

BACKGROUND

Computer modeling of studied systems can have many different inputs influencing an outcome for the system. For example, for modeling an outcome related to death rates in a studied population (e.g., from a drug overdose), there could be many different inputs related to, for example, medical practices, environmental quality, wealth distribution, and location of members of the population. These different inputs can influence one another forming complex relationships between inputs in simulations of the studied system.

SUMMARY

In an example embodiment, a computer-program product tangibly embodied in a non-transitory machine-readable storage medium is provided. The computer-program product includes instructions to cause a computing device to obtain a computer model that predicts a predicted output for a studied system. The computer model is generated based on data of at least two data types that are different data types. The computer-program product includes instructions to cause a computing device to obtain an initial predicted state for an applied system according to an initial set of inputs to the computer model. The computer-program product includes instructions to cause a computing device to receive, at a graphical user interface, a request for a derived set of inputs that will generate, for the applied system, a user-requested change in the initial predicted state. The computer-program product includes instructions to cause a computing device to generate a set of decision deltas for the computer model. Each decision delta of the set of decision deltas corresponds to a respective one of the at least two data types. A first decision delta corresponding to a first data type of the at least two data types indicates an extent of allowable change of a first initial input of the initial set of inputs. A second decision delta corresponding to a second data type of the at least two data types indicates an extent of allowable change of a second initial input of the initial set of inputs. The computer-program product includes instructions to cause a computing device to obtain a computer function for the set of decision deltas. The computer-program product includes instructions to cause a computing device to determine allowable function inputs to the computer function. The allowable function inputs are derived based on the set of decision deltas, the user-requested change, and the computer model. The computer-program product includes instructions to cause a computing device to compute, using one or more of the allowable function inputs, at least one minimum or maximum value for the computer function. The computer-program product includes instructions to cause a computing device to, based on the at least one minimum or maximum value for the computer function, output, to the graphical user interface, output information based on the derived set of inputs that, according to the computer model, will affect the user-requested change in the initial predicted state. The derived set of inputs comprise a first derived input corresponding to the first data type that is different from the first initial input; and a second derived input corresponding to the second data type that is different from the second initial input.

In another example embodiment, a computing device is provided. The computing device includes, but is not limited to, a processor and memory. The memory contains instructions that when executed by the processor control the computing device to output information based on the derived set of inputs that, according to the computer model, will affect the user-requested change in the initial predicted state.

Another example embodiment provides a method of outputting information based on the derived set of inputs that, according to the computer model, will affect the user-requested change in the initial predicted state.

Other features and aspects of example embodiments are presented below in the Detailed Description when read in connection with the drawings presented with this application.

BRIEF DESCRIPTION OF THE DRAWINGS

FIGS. 16A-16D illustrate data for obtaining a computer model according to at least one embodiment of the present technology.

FIGS. 17A-17D illustrate a graphical user interface for displaying information pertaining to a generated computer model according to at least one embodiment of the present technology.

FIG. 22 illustrates a graphical user interface for editing constraints according to at least one embodiment of the present technology.

FIG. 25 illustrates a graphical user interface for computer-generated recommendations according to at least one embodiment of the present technology.

DETAILED DESCRIPTION

In the following description, for the purposes of explanation, specific details are set forth in order to provide a thorough understanding of embodiments of the technology. However, it will be apparent that various embodiments may be practiced without these specific details. The figures and description are not intended to be restrictive.

The ensuing description provides example embodiments only, and is not intended to limit the scope, applicability, or configuration of the disclosure. Rather, the ensuing description of the example embodiments will provide those skilled in the art with an enabling description for implementing an example embodiment. It should be understood that various changes may be made in the function and arrangement of elements without departing from the spirit and scope of the technology as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional operations not included in a figure. A process may correspond to a method, a function, a procedure, a subroutine, a subprogram, etc. When a process corresponds to a function, its termination can correspond to a return of the function to the calling function or the main function.

Systems depicted in some of the figures may be provided in various configurations. In some embodiments, the systems may be configured as a distributed system where one or more components of the system are distributed across one or more networks in a cloud computing system.

Figure 1:
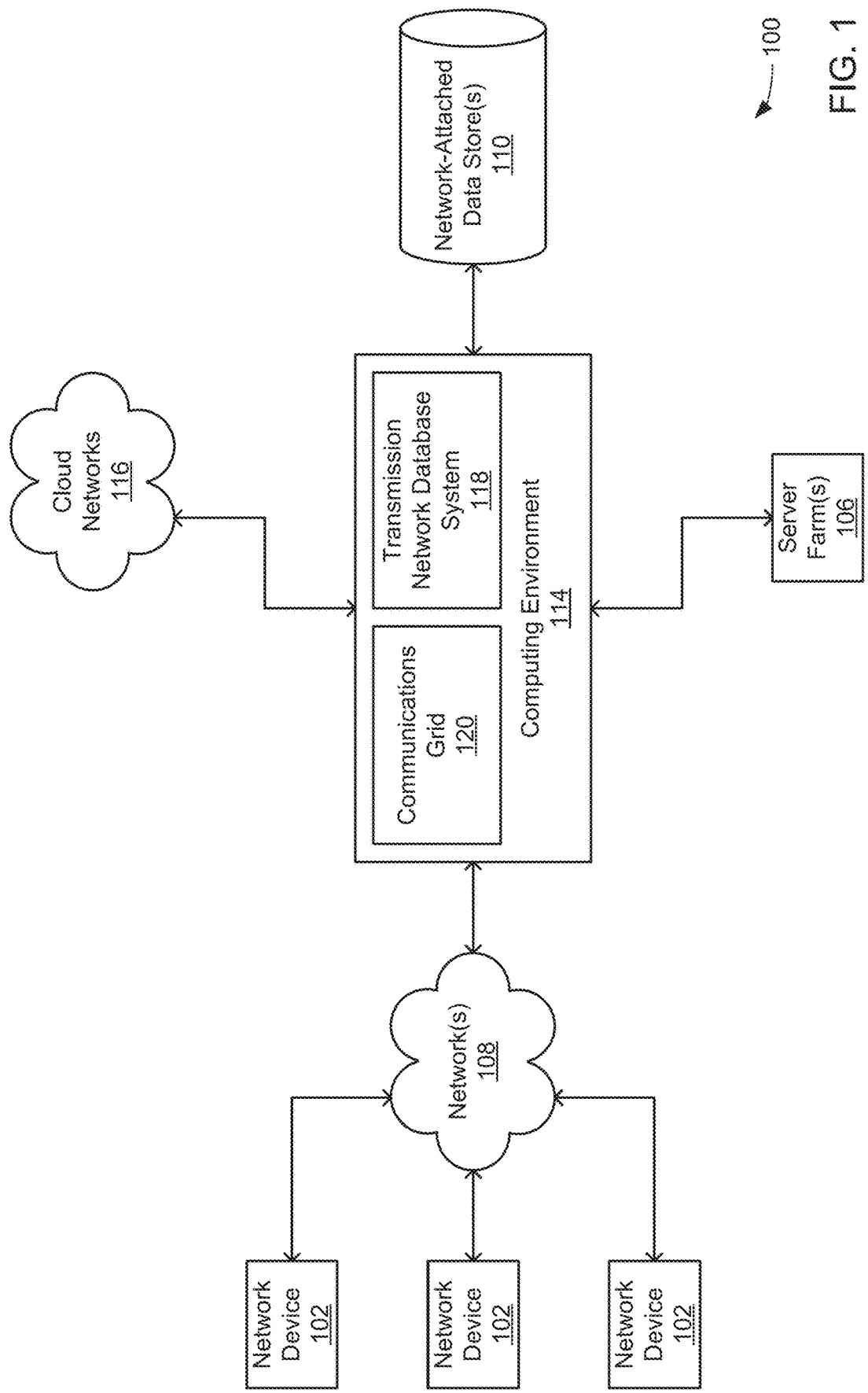
FIG. 1 illustrates a block diagram that provides an illustration of the hardware components of a computing system, according to some embodiments of the present technology.

FIG. 1 is a block diagram that provides an illustration of the hardware components of a data transmission network 100, according to embodiments of the present technology. Data transmission network 100 is a specialized computer system that may be used for processing large amounts of data where a large number of computer processing cycles are required.

Data transmission network 100 may also include computing environment 114. Computing environment 114 may be a specialized computer or other machine that processes the data received within the data transmission network 100. Data transmission network 100 also includes one or more network devices 102. Network devices 102 may include client devices that attempt to communicate with computing environment 114. For example, network devices 102 may send data to the computing environment 114 to be processed, may send signals to the computing environment 114 to control different aspects of the computing environment or the data it is processing, among other reasons. Network devices 102 may interact with the computing environment 114 through a number of ways, such as, for example, over one or more networks 108. As shown in FIG. 1, computing environment 114 may include one or more other systems. For example, computing environment 114 may include a database system 118 and/or a communications grid 120.

Figure 8:
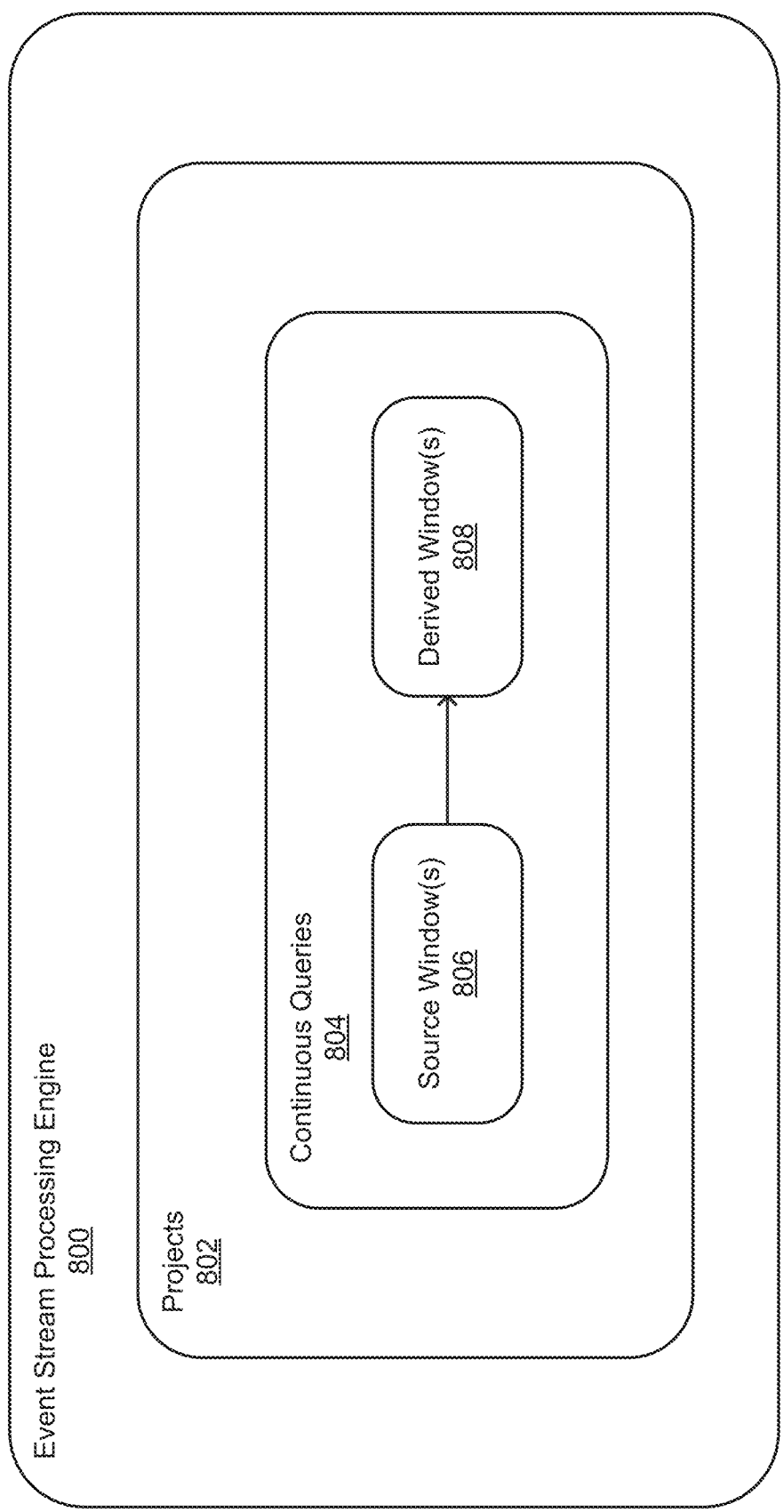
FIG. 8 illustrates a block diagram including components of an Event Stream Processing Engine (ESPE), according to embodiments of the present technology.
Figure 9:
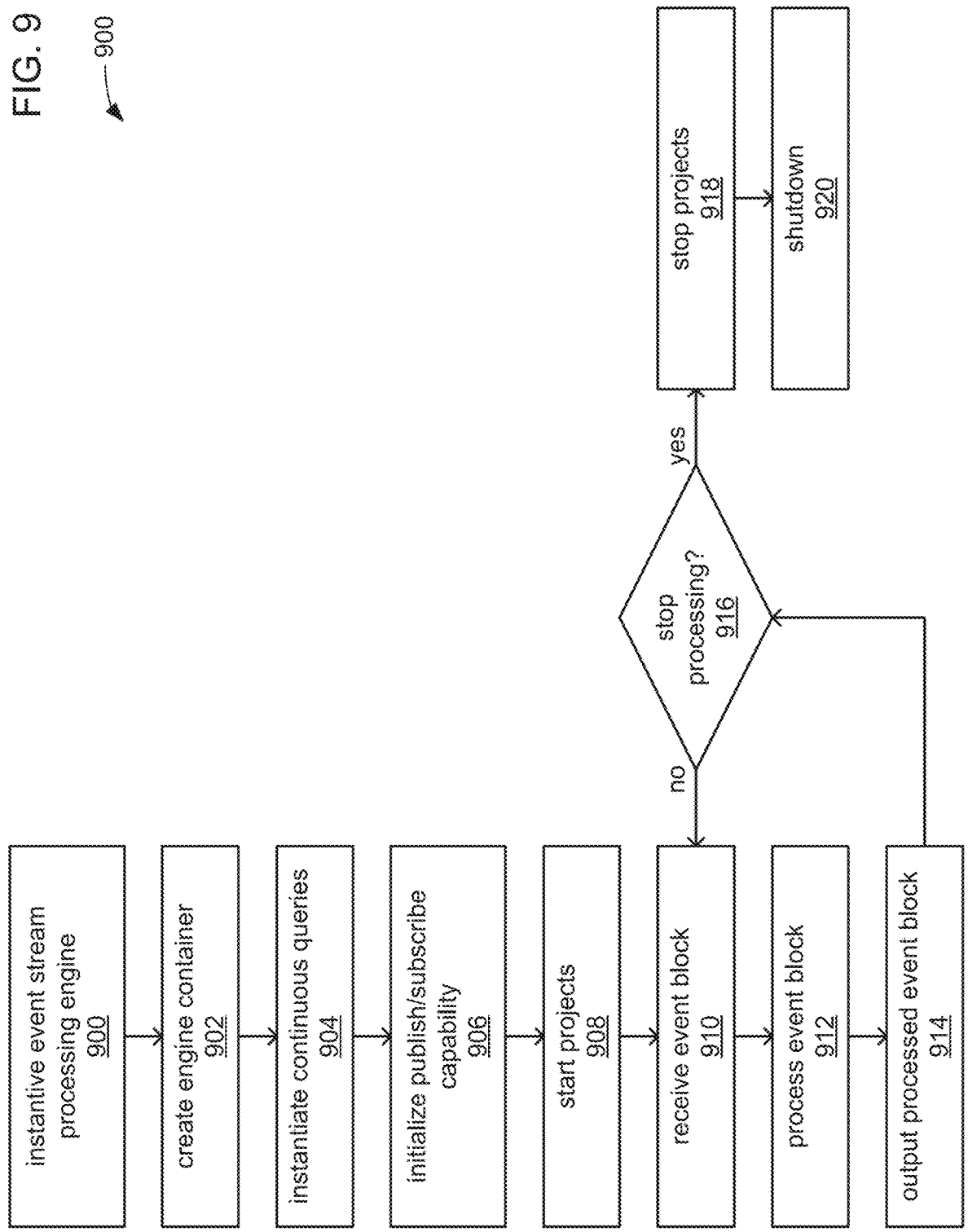
FIG. 9 illustrates a flow chart showing an example process including operations performed by an event stream processing engine, according to some embodiments of the present technology.
Figure 10:
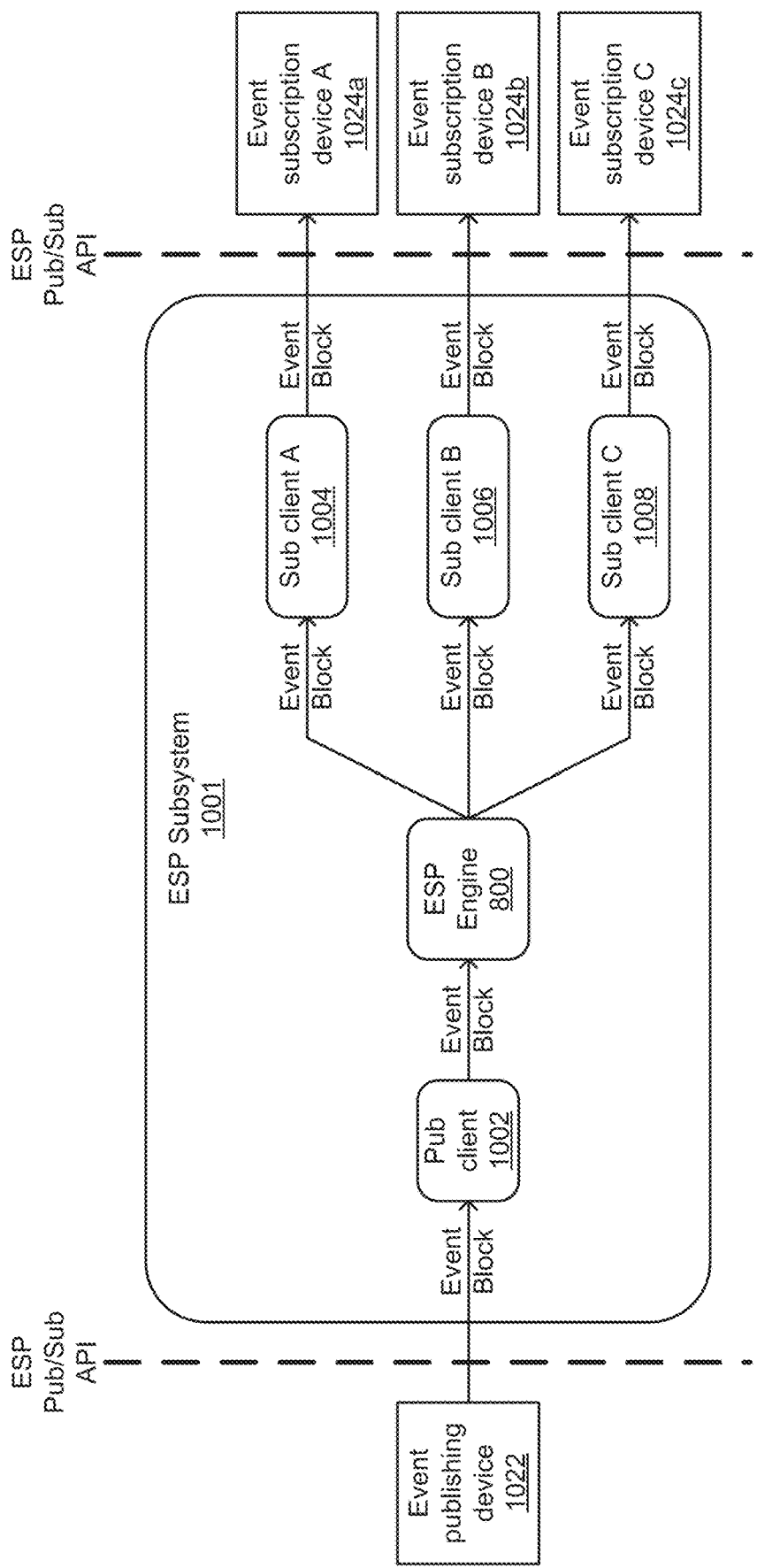
FIG. 10 illustrates an ESP system interfacing between a publishing device and multiple event subscribing devices, according to embodiments of the present technology.

In other embodiments, network devices may provide a large amount of data, either all at once or streaming over a period of time (e.g., using event stream processing (ESP), described further with respect to FIGS. 8-10), to the computing environment 114 via networks 108. For example, network devices 102 may include network computers, sensors, databases, or other devices that may transmit or otherwise provide data to computing environment 114. For example, network devices may include local area network devices, such as routers, hubs, switches, or other computer networking devices. These devices may provide a variety of stored or generated data, such as network data or data specific to the network devices themselves. Network devices may also include sensors that monitor their environment or other devices to collect data regarding that environment or those devices, and such network devices may provide data they collect over time. Network devices may also include devices within the internet of things, such as devices within a home automation network. Some of these devices may be referred to as edge devices and may involve edge computing circuitry. Data may be transmitted by network devices directly to computing environment 114 or to network-attached data stores, such as network-attached data stores 110 for storage so that the data may be retrieved later by the computing environment 114 or other portions of data transmission network 100.

Data transmission network 100 may also include one or more network-attached data stores 110. Network-attached data stores 110 are used to store data to be processed by the computing environment 114 as well as any intermediate or final data generated by the computing system in non-volatile memory. However in certain embodiments, the configuration of the computing environment 114 allows its operations to be performed such that intermediate and final data results can be stored solely in volatile memory (e.g., RAM), without a requirement that intermediate or final data results be stored to non-volatile types of memory (e.g., disk). This can be useful in certain situations, such as when the computing environment 114 receives ad hoc queries from a user and when responses, which are generated by processing large amounts of data, need to be generated on-the-fly. In this non-limiting situation, the computing environment 114 may be configured to retain the processed information within memory so that responses can be generated for the user at different levels of detail as well as allow a user to interactively query against this information.

Network-attached data stores may store a variety of different types of data organized in a variety of different ways and from a variety of different sources. For example, network-attached data storage may include storage other than primary storage located within computing environment 114 that is directly accessible by processors located therein. Network-attached data storage may include secondary, tertiary or auxiliary storage, such as large hard drives, servers, virtual memory, among other types. Storage devices may include portable or non-portable storage devices, optical storage devices, and various other mediums capable of storing, containing data. A machine-readable storage medium or computer-readable storage medium may include a non-transitory medium in which data can be stored and that does not include carrier waves and/or transitory electronic signals. Examples of a non-transitory medium may include, for example, a magnetic disk or tape, optical storage media such as compact disk or digital versatile disk, flash memory, memory or memory devices. A computer-program product may include code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, among others. Furthermore, the data stores may hold a variety of different types of data. For example, network-attached data stores 110 may hold unstructured (e.g., raw) data, such as manufacturing data (e.g., a database containing records identifying products being manufactured with parameter data for each product, such as colors and models) or product sales databases (e.g., a database containing individual data records identifying details of individual product sales).

The unstructured data may be presented to the computing environment 114 in different forms such as a flat file or a conglomerate of data records and may have data values and accompanying time stamps. The computing environment 114 may be used to analyze the unstructured data in a variety of ways to determine the best way to structure (e.g., hierarchically) that data, such that the structured data is tailored to a type of further analysis that a user wishes to perform on the data. For example, after being processed, the unstructured time stamped data may be aggregated by time (e.g., into daily time period units) to generate time series data and/or structured hierarchically according to one or more dimensions (e.g., parameters, attributes, and/or variables). For example, data may be stored in a hierarchical data structure, such as a ROLAP OR MOLAP database, or may be stored in another tabular form, such as in a flat-hierarchy form.

Data transmission network 100 may also include one or more server farms 106. Computing environment 114 may route select communications or data to the one or more sever farms 106 or one or more servers within the server farms. Server farms 106 can be configured to provide information in a predetermined manner. For example, server farms 106 may access data to transmit in response to a communication. Server farms 106 may be separately housed from each other device within data transmission network 100, such as computing environment 114, and/or may be part of a device or system.

Server farms 106 may host a variety of different types of data processing as part of data transmission network 100. Server farms 106 may receive a variety of different data from network devices, from computing environment 114, from cloud network 116, or from other sources. The data may have been obtained or collected from one or more sensors, as inputs from a control database, or may have been received as inputs from an external system or device. Server farms 106 may assist in processing the data by turning raw data into processed data based on one or more rules implemented by the server farms. For example, sensor data may be analyzed to determine changes in an environment over time or in real-time.

Data transmission network 100 may also include one or more cloud networks 116. Cloud network 116 may include a cloud infrastructure system that provides cloud services. In certain embodiments, services provided by the cloud network 116 may include a host of services that are made available to users of the cloud infrastructure system on demand. Cloud network 116 is shown in FIG. 1 as being connected to computing environment 114 (and therefore having computing environment 114 as its client or user), but cloud network 116 may be connected to or utilized by any of the devices in FIG. 1. Services provided by the cloud network can dynamically scale to meet the needs of its users. The cloud network 116 may include one or more computers, servers, and/or systems. In some embodiments, the computers, servers, and/or systems that make up the cloud network 116 are different from the user's own on-premises computers, servers, and/or systems. For example, the cloud network 116 may host an application, and a user may, via a communication network such as the Internet, on demand, order and use the application.

While each device, server and system in FIG. 1 is shown as a single device, it will be appreciated that multiple devices may instead be used. For example, a set of network devices can be used to transmit various communications from a single user, or remote server 140 may include a server stack. As another example, data may be processed as part of computing environment 114.

Each communication within data transmission network 100 (e.g., between client devices, between servers 106 and computing environment 114 or between a server and a device) may occur over one or more networks 108. Networks 108 may include one or more of a variety of different types of networks, including a wireless network, a wired network, or a combination of a wired and wireless network. Examples of suitable networks include the Internet, a personal area network, a local area network (LAN), a wide area network (WAN), or a wireless local area network (WLAN). A wireless network may include a wireless interface or combination of wireless interfaces. As an example, a network in the one or more networks 108 may include a short-range communication channel, such as a BLUETOOTH® communication channel or a BLUETOOTH® Low Energy communication channel. A wired network may include a wired interface. The wired and/or wireless networks may be implemented using routers, access points, bridges, gateways, or the like, to connect devices in the network 114, as will be further described with respect to FIG. 2. The one or more networks 108 can be incorporated entirely within or can include an intranet, an extranet, or a combination thereof. In one embodiment, communications between two or more systems and/or devices can be achieved by a secure communications protocol, such as secure sockets layer (SSL) or transport layer security (TLS). In addition, data and/or transactional details may be encrypted.

Some aspects may utilize the Internet of Things (IoT), where things (e.g., machines, devices, phones, sensors) can be connected to networks and the data from these things can be collected and processed within the things and/or external to the things. For example, the IoT can include sensors in many different devices, and high value analytics can be applied to identify hidden relationships and drive increased efficiencies. This can apply to both big data analytics and real-time (e.g., ESP) analytics. This will be described further below with respect to FIG. 2.

As noted, computing environment 114 may include a communications grid 120 and a transmission network database system 118. Communications grid 120 may be a grid-based computing system for processing large amounts of data. The transmission network database system 118 may be for managing, storing, and retrieving large amounts of data that are distributed to and stored in the one or more network-attached data stores 110 or other data stores that reside at different locations within the transmission network database system 118. The compute nodes in the grid-based computing system 120 and the transmission network database system 118 may share the same processor hardware, such as processors that are located within computing environment 114.

Figure 2:
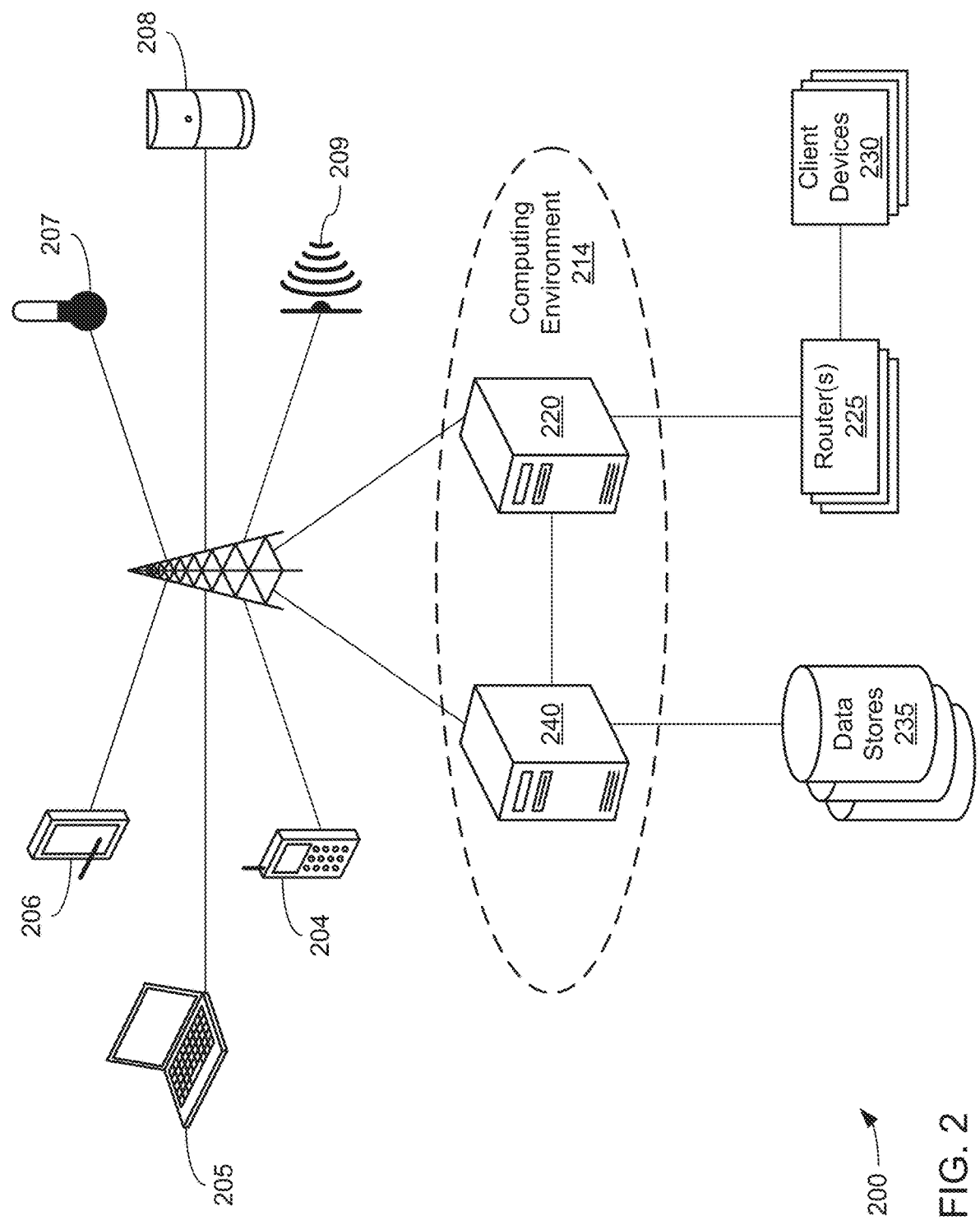
FIG. 2 illustrates an example network including an example set of devices communicating with each other over an exchange system and via a network, according to some embodiments of the present technology.

FIG. 2 illustrates an example network including an example set of devices communicating with each other over an exchange system and via a network, according to embodiments of the present technology. As noted, each communication within data transmission network 100 may occur over one or more networks. System 200 includes a network device 204 configured to communicate with a variety of types of client devices, for example client devices 230, over a variety of types of communication channels.

As shown in FIG. 2, network device 204 can transmit a communication over a network (e.g., a cellular network via a base station 210). The communication can be routed to another network device, such as network devices 205-209, via base station 210. The communication can also be routed to computing environment 214 via base station 210. For example, network device 204 may collect data either from its surrounding environment or from other network devices (such as network devices 205-209) and transmit that data to computing environment 214.

Although network devices 204-209 are shown in FIG. 2 as a mobile phone, laptop computer, tablet computer, temperature sensor, motion sensor, and audio sensor respectively, the network devices may be or include sensors that are sensitive to detecting aspects of their environment. For example, the network devices may include sensors such as water sensors, power sensors, electrical current sensors, chemical sensors, optical sensors, pressure sensors, geographic or position sensors (e.g., GPS), velocity sensors, acceleration sensors, flow rate sensors, among others. Examples of characteristics that may be sensed include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, and electrical current, among others. The sensors may be mounted to various components used as part of a variety of different types of systems (e.g., an oil drilling operation). The network devices may detect and record data related to the environment that it monitors, and transmit that data to computing environment 214.

As noted, one type of system that may include various sensors that collect data to be processed and/or transmitted to a computing environment according to certain embodiments includes an oil drilling system. For example, the one or more drilling operation sensors may include surface sensors that measure a hook load, a fluid rate, a temperature and a density in and out of the wellbore, a standpipe pressure, a surface torque, a rotation speed of a drill pipe, a rate of penetration, a mechanical specific energy, etc. and downhole sensors that measure a rotation speed of a bit, fluid densities, downhole torque, downhole vibration (axial, tangential, lateral), a weight applied at a drill bit, an annular pressure, a differential pressure, an azimuth, an inclination, a dog leg severity, a measured depth, a vertical depth, a downhole temperature, etc. Besides the raw data collected directly by the sensors, other data may include parameters either developed by the sensors or assigned to the system by a client or other controlling device. For example, one or more drilling operation control parameters may control settings such as a mud motor speed to flow ratio, a bit diameter, a predicted formation top, seismic data, weather data, etc. Other data may be generated using physical models such as an earth model, a weather model, a seismic model, a bottom hole assembly model, a well plan model, an annular friction model, etc. In addition to sensor and control settings, predicted outputs, of for example, the rate of penetration, mechanical specific energy, hook load, flow in fluid rate, flow out fluid rate, pump pressure, surface torque, rotation speed of the drill pipe, annular pressure, annular friction pressure, annular temperature, equivalent circulating density, etc. may also be stored in the data warehouse.

In another example, another type of system that may include various sensors that collect data to be processed and/or transmitted to a computing environment according to certain embodiments includes a home automation or similar automated network in a different environment, such as an office space, school, public space, sports venue, or a variety of other locations. Network devices in such an automated network may include network devices that allow a user to access, control, and/or configure various home appliances located within the user's home (e.g., a television, radio, light, fan, humidifier, sensor, microwave, iron, and/or the like), or outside of the user's home (e.g., exterior motion sensors, exterior lighting, garage door openers, sprinkler systems, or the like). For example, network device 102 may include a home automation switch that may be coupled with a home appliance. In another embodiment, a network device can allow a user to access, control, and/or configure devices, such as office-related devices (e.g., copy machine, printer, or fax machine), audio and/or video related devices (e.g., a receiver, a speaker, a projector, a DVD player, or a television), media-playback devices (e.g., a compact disc player, a CD player, or the like), computing devices (e.g., a home computer, a laptop computer, a tablet, a personal digital assistant (PDA), a computing device, or a wearable device), lighting devices (e.g., a lamp or recessed lighting), devices associated with a security system, devices associated with an alarm system, devices that can be operated in an automobile (e.g., radio devices, navigation devices), and/or the like. Data may be collected from such various sensors in raw form, or data may be processed by the sensors to create parameters or other data either developed by the sensors based on the raw data or assigned to the system by a client or other controlling device.

In another example, another type of system that may include various sensors that collect data to be processed and/or transmitted to a computing environment according to certain embodiments includes a power or energy grid. A variety of different network devices may be included in an energy grid, such as various devices within one or more power plants, energy farms (e.g., wind farm, solar farm, among others) energy storage facilities, factories, homes and businesses of consumers, among others. One or more of such devices may include one or more sensors that detect energy gain or loss, electrical input or output or loss, and a variety of other efficiencies. These sensors may collect data to inform users of how the energy grid, and individual devices within the grid, may be functioning and how they may be made more efficient.

Network device sensors may also perform processing on data it collects before transmitting the data to the computing environment 114, or before deciding whether to transmit data to the computing environment 114. For example, network devices may determine whether data collected meets certain rules, for example by comparing data or values calculated from the data and comparing that data to one or more thresholds. The network device may use this data and/or comparisons to determine if the data should be transmitted to the computing environment 214 for further use or processing.

Computing environment 214 may include machines 220 and 240. Although computing environment 214 is shown in FIG. 2 as having two machines, 220 and 240, computing environment 214 may have only one machine or may have more than two machines. The machines that make up computing environment 214 may include specialized computers, servers, or other machines that are configured to individually and/or collectively process large amounts of data. The computing environment 214 may also include storage devices that include one or more databases of structured data, such as data organized in one or more hierarchies, or unstructured data. The databases may communicate with the processing devices within computing environment 214 to distribute data to them. Since network devices may transmit data to computing environment 214, that data may be received by the computing environment 214 and subsequently stored within those storage devices. Data used by computing environment 214 may also be stored in data stores 235, which may also be a part of or connected to computing environment 214.

Computing environment 214 can communicate with various devices via one or more routers 225 or other inter-network or intra-network connection components. For example, computing environment 214 may communicate with devices 230 via one or more routers 225. Computing environment 214 may collect, analyze and/or store data from or pertaining to communications, client device operations, client rules, and/or user-associated actions stored at one or more data stores 235. Such data may influence communication routing to the devices within computing environment 214, how data is stored or processed within computing environment 214, among other actions.

Notably, various other devices can further be used to influence communication routing and/or processing between devices within computing environment 214 and with devices outside of computing environment 214. For example, as shown in FIG. 2, computing environment 214 may include a web server 240. Thus, computing environment 214 can retrieve data of interest, such as client information (e.g., product information, client rules, etc.), technical product details, news, current or predicted weather, and so on.

In addition to computing environment 214 collecting data (e.g., as received from network devices, such as sensors, and client devices or other sources) to be processed as part of a big data analytics project, it may also receive data in real time as part of a streaming analytics environment. As noted, data may be collected using a variety of sources as communicated via different kinds of networks or locally. Such data may be received on a real-time streaming basis. For example, network devices may receive data periodically from network device sensors as the sensors continuously sense, monitor and track changes in their environments. Devices within computing environment 214 may also perform pre-analysis on data it receives to determine if the data received should be processed as part of an ongoing project. The data received and collected by computing environment 214, no matter what the source or method or timing of receipt, may be processed over a period of time for a client to determine results data based on the client's needs and rules.

Figure 3:
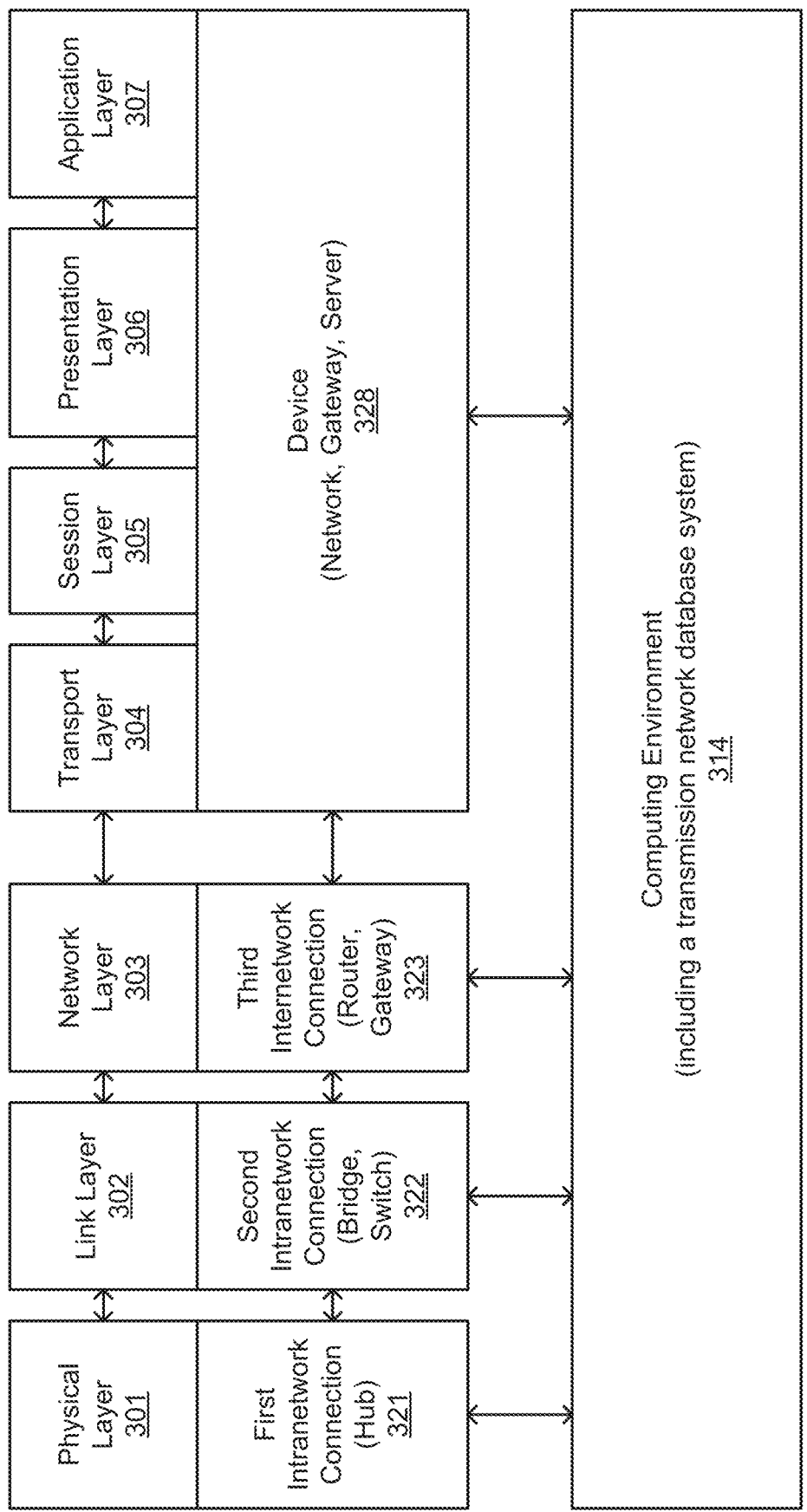
FIG. 3 illustrates a representation of a conceptual model of a communications protocol system, according to some embodiments of the present technology.

FIG. 3 illustrates a representation of a conceptual model of a communications protocol system, according to embodiments of the present technology. More specifically, FIG. 3 identifies operation of a computing environment in an Open Systems Interaction model that corresponds to various connection components. The model 300 shows, for example, how a computing environment, such as computing environment 314 (or computing environment 214 in FIG. 2) may communicate with other devices in its network, and control how communications between the computing environment and other devices are executed and under what conditions.

The model can include layers 301-307. The layers are arranged in a stack. Each layer in the stack serves the layer one level higher than it (except for the application layer, which is the highest layer), and is served by the layer one level below it (except for the physical layer, which is the lowest layer). The physical layer is the lowest layer because it receives and transmits raw bites of data and is the farthest layer from the user in a communications system. On the other hand, the application layer is the highest layer because it interacts directly with a software application.

As noted, the model includes a physical layer 301. Physical layer 301 represents physical communication and can define parameters of that physical communication. For example, such physical communication may come in the form of electrical, optical, or electromagnetic signals. Physical layer 301 also defines protocols that may control communications within a data transmission network.

Link layer 302 defines links and mechanisms used to transmit (i.e., move) data across a network. The link layer 302 manages node-to-node communications, such as within a grid computing environment. Link layer 302 can detect and correct errors (e.g., transmission errors in the physical layer 301). Link layer 302 can also include a media access control (MAC) layer and logical link control (LLC) layer.

Network layer 303 defines the protocol for routing within a network. In other words, the network layer coordinates transferring data across nodes in a same network (e.g., such as a grid computing environment). Network layer 303 can also define the processes used to structure local addressing within the network.

Transport layer 304 can manage the transmission of data and the quality of the transmission and/or receipt of that data. Transport layer 304 can provide a protocol for transferring data, such as, for example, a Transmission Control Protocol (TCP). Transport layer 304 can assemble and disassemble data frames for transmission. The transport layer can also detect transmission errors occurring in the layers below it.

Session layer 305 can establish, maintain, and manage communication connections between devices on a network. In other words, the session layer controls the dialogues or nature of communications between network devices on the network. The session layer may also establish checkpointing, adjournment, termination, and restart procedures.

Presentation layer 306 can provide translation for communications between the application and network layers. In other words, this layer may encrypt, decrypt and/or format data based on data types and/or encodings known to be accepted by an application or network layer.

Application layer 307 interacts directly with software applications and end users and manages communications between them. Application layer 307 can identify destinations, local resource states or availability and/or communication content or formatting using the applications.

Intra-network connection components 321 and 322 are shown to operate in lower levels, such as physical layer 301 and link layer 302, respectively. For example, a hub can operate in the physical layer, a switch can operate in the link layer, and a router can operate in the network layer. Inter-network connection components 323 and 328 are shown to operate on higher levels, such as layers 303-307. For example, routers can operate in the network layer and network devices can operate in the transport, session, presentation, and application layers.

As noted, a computing environment 314 can interact with and/or operate on, in various embodiments, one, more, all or any of the various layers. For example, computing environment 314 can interact with a hub (e.g., via the link layer) so as to adjust which devices the hub communicates with. The physical layer may be served by the link layer, so it may implement such data from the link layer. For example, the computing environment 314 may control which devices it will receive data from. For example, if the computing environment 314 knows that a certain network device has turned off, broken, or otherwise become unavailable or unreliable, the computing environment 314 may instruct the hub to prevent any data from being transmitted to the computing environment 314 from that network device. Such a process may be beneficial to avoid receiving data that is inaccurate or that has been influenced by an uncontrolled environment. As another example, computing environment 314 can communicate with a bridge, switch, router or gateway and influence which device within the system (e.g., system 200) the component selects as a destination. In some embodiments, computing environment 314 can interact with various layers by exchanging communications with equipment operating on a particular layer by routing or modifying existing communications. In another embodiment, such as in a grid computing environment, a node may determine how data within the environment should be routed (e.g., which node should receive certain data) based on certain parameters or information provided by other layers within the model.

As noted, the computing environment 314 may be a part of a communications grid environment, the communications of which may be implemented as shown in the protocol of FIG. 3. For example, referring back to FIG. 2, one or more of machines 220 and 240 may be part of a communications grid computing environment. A gridded computing environment may be employed in a distributed system with non-interactive workloads where data resides in memory on the machines, or compute nodes. In such an environment, analytic code, instead of a database management system, controls the processing performed by the nodes. Data is co-located by pre-distributing it to the grid nodes, and the analytic code on each node loads the local data into memory. Each node may be assigned a particular task such as a portion of a processing project, or to organize or control other nodes within the grid.

Figure 4:
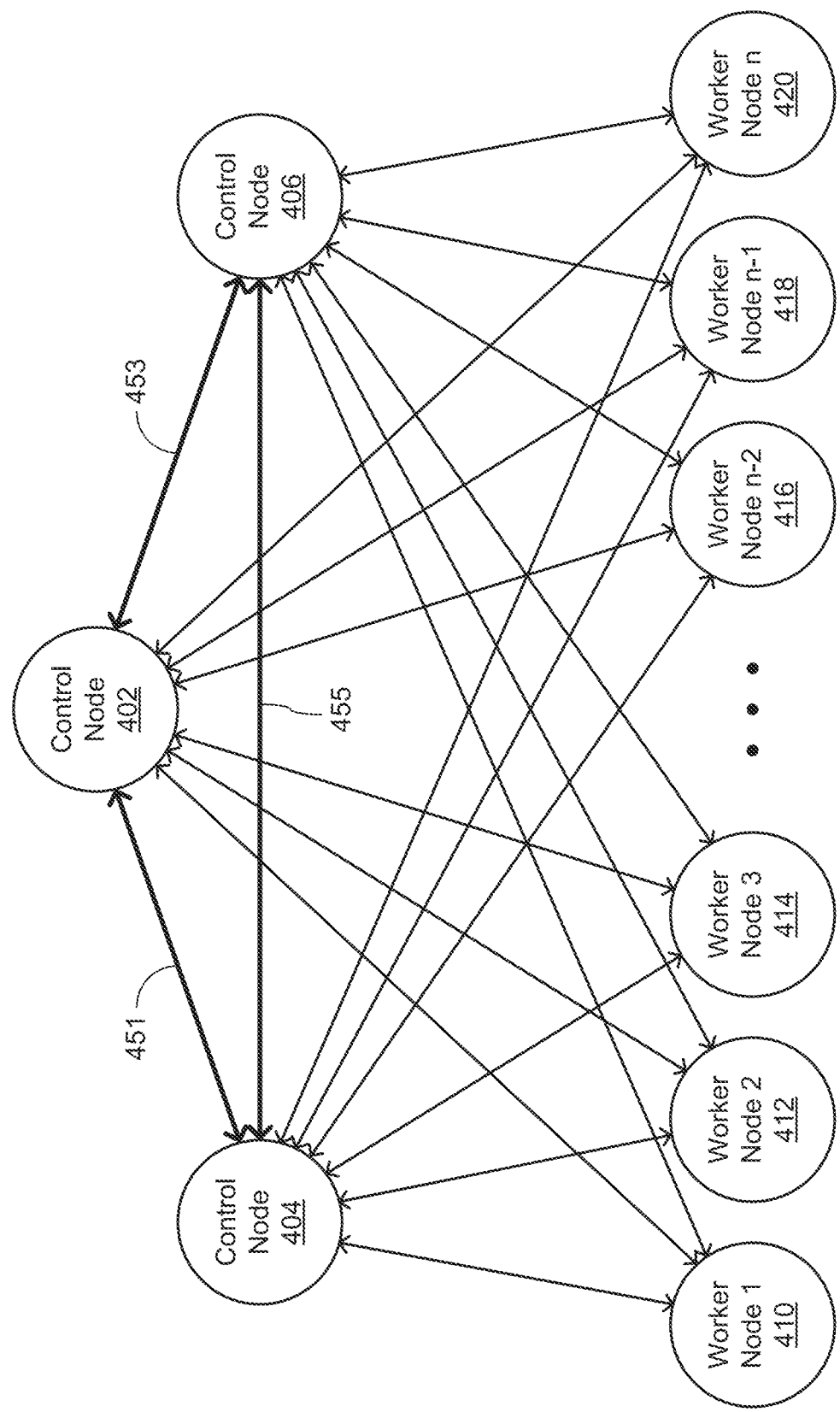
FIG. 4 illustrates a communications grid computing system including a variety of control and worker nodes, according to some embodiments of the present technology.

FIG. 4 illustrates a communications grid computing system 400 including a variety of control and worker nodes, according to embodiments of the present technology. Communications grid computing system 400 includes three control nodes and one or more worker nodes. Communications grid computing system 400 includes control nodes 402, 404, and 406. The control nodes are communicatively connected via communication paths 451, 453, and 455. Therefore, the control nodes may transmit information (e.g., related to the communications grid or notifications), to and receive information from each other. Although communications grid computing system 400 is shown in FIG. 4 as including three control nodes, the communications grid may include more or less than three control nodes.

Communications grid computing system (or just "communications grid") 400 also includes one or more worker nodes. Shown in FIG. 4 are six worker nodes 410-420. Although FIG. 4 shows six worker nodes, a communications grid according to embodiments of the present technology may include more or less than six worker nodes. The number of worker nodes included in a communications grid may be dependent upon how large the project or data set is being processed by the communications grid, the capacity of each worker node, the time designated for the communications grid to complete the project, among others. Each worker node within the communications grid 400 may be connected (wired or wirelessly, and directly or indirectly) to control nodes 402-406. Therefore, each worker node may receive information from the control nodes (e.g., an instruction to perform work on a project) and may transmit information to the control nodes (e.g., a result from work performed on a project). Furthermore, worker nodes may communicate with each other (either directly or indirectly). For example, worker nodes may transmit data between each other related to a job being performed or an individual task within a job being performed by that worker node. However, in certain embodiments, worker nodes may not, for example, be connected (communicatively or otherwise) to certain other worker nodes. In an embodiment, worker nodes may only be able to communicate with the control node that controls it, and may not be able to communicate with other worker nodes in the communications grid, whether they are other worker nodes controlled by the control node that controls the worker node, or worker nodes that are controlled by other control nodes in the communications grid.

A control node may connect with an external device with which the control node may communicate (e.g., a grid user, such as a server or computer, may connect to a controller of the grid). For example, a server or computer may connect to control nodes and may transmit a project or job to the node. The project may include a data set. The data set may be of any size. Once the control node receives such a project including a large data set, the control node may distribute the data set or projects related to the data set to be performed by worker nodes. Alternatively, for a project including a large data set, the data set may be received or stored by a machine other than a control node (e.g., a HADOOP® standard-compliant data node employing the HADOOP® Distributed File System, or HDFS).

Control nodes may maintain knowledge of the status of the nodes in the grid (i.e., grid status information), accept work requests from clients, subdivide the work across worker nodes, and coordinate the worker nodes, among other responsibilities. Worker nodes may accept work requests from a control node and provide the control node with results of the work performed by the worker node. A grid may be started from a single node (e.g., a machine, computer, server, etc.). This first node may be assigned or may start as the primary control node that will control any additional nodes that enter the grid.

When a project is submitted for execution (e.g., by a client or a controller of the grid) it may be assigned to a set of nodes. After the nodes are assigned to a project, a data structure (i.e., a communicator) may be created. The communicator may be used by the project for information to be shared between the project codes running on each node. A communication handle may be created on each node. A handle, for example, is a reference to the communicator that is valid within a single process on a single node, and the handle may be used when requesting communications between nodes.

A control node, such as control node 402, may be designated as the primary control node. A server, computer or other external device may connect to the primary control node. Once the control node receives a project, the primary control node may distribute portions of the project to its worker nodes for execution. For example, when a project is initiated on communications grid 400, primary control node 402 controls the work to be performed for the project in order to complete the project as requested or instructed. The primary control node may distribute work to the worker nodes based on various factors, such as which subsets or portions of projects may be completed most efficiently and in the correct amount of time. For example, a worker node may perform analysis on a portion of data that is already local (e.g., stored on) the worker node. The primary control node also coordinates and processes the results of the work performed by each worker node after each worker node executes and completes its job. For example, the primary control node may receive a result from one or more worker nodes, and the control node may organize (e.g., collect and assemble) the results received and compile them to produce a complete result for the project received from the end user.

Any remaining control nodes, such as control nodes 404 and 406, may be assigned as backup control nodes for the project. In an embodiment, backup control nodes may not control any portion of the project. Instead, backup control nodes may serve as a backup for the primary control node and take over as primary control node if the primary control node were to fail. If a communications grid were to include only a single control node, and the control node were to fail (e.g., the control node is shut off or breaks) then the communications grid as a whole may fail and any project or job being run on the communications grid may fail and may not complete. While the project may be run again, such a failure may cause a delay (severe delay in some cases, such as overnight delay) in completion of the project. Therefore, a grid with multiple control nodes, including a backup control node, may be beneficial.

To add another node or machine to the grid, the primary control node may open a pair of listening sockets, for example. A socket may be used to accept work requests from clients, and the second socket may be used to accept connections from other grid nodes. The primary control node may be provided with a list of other nodes (e.g., other machines, computers, servers) that will participate in the grid, and the role that each node will fill in the grid. Upon startup of the primary control node (e.g., the first node on the grid), the primary control node may use a network protocol to start the server process on every other node in the grid. Command line parameters, for example, may inform each node of one or more pieces of information, such as: the role that the node will have in the grid, the host name of the primary control node, the port number on which the primary control node is accepting connections from peer nodes, among others. The information may also be provided in a configuration file, transmitted over a secure shell tunnel, recovered from a configuration server, among others. While the other machines in the grid may not initially know about the configuration of the grid, that information may also be sent to each other node by the primary control node. Updates of the grid information may also be subsequently sent to those nodes.

For any control node other than the primary control node added to the grid, the control node may open three sockets. The first socket may accept work requests from clients, the second socket may accept connections from other grid members, and the third socket may connect (e.g., permanently) to the primary control node. When a control node (e.g., primary control node) receives a connection from another control node, it first checks to see if the peer node is in the list of configured nodes in the grid. If it is not on the list, the control node may clear the connection. If it is on the list, it may then attempt to authenticate the connection. If authentication is successful, the authenticating node may transmit information to its peer, such as the port number on which a node is listening for connections, the host name of the node, information about how to authenticate the node, among other information. When a node, such as the new control node, receives information about another active node, it will check to see if it already has a connection to that other node. If it does not have a connection to that node, it may then establish a connection to that control node.

Any worker node added to the grid may establish a connection to the primary control node and any other control nodes on the grid. After establishing the connection, it may authenticate itself to the grid (e.g., any control nodes, including both primary and backup, or a server or user controlling the grid). After successful authentication, the worker node may accept configuration information from the control node.

When a node joins a communications grid (e.g., when the node is powered on or connected to an existing node on the grid or both), the node is assigned (e.g., by an operating system of the grid) a universally unique identifier (UUID). This unique identifier may help other nodes and external entities (devices, users, etc.) to identify the node and distinguish it from other nodes. When a node is connected to the grid, the node may share its unique identifier with the other nodes in the grid. Since each node may share its unique identifier, each node may know the unique identifier of every other node on the grid. Unique identifiers may also designate a hierarchy of each of the nodes (e.g., backup control nodes) within the grid. For example, the unique identifiers of each of the backup control nodes may be stored in a list of backup control nodes to indicate an order in which the backup control nodes will take over for a failed primary control node to become a new primary control node. However, a hierarchy of nodes may also be determined using methods other than using the unique identifiers of the nodes. For example, the hierarchy may be predetermined, or may be assigned based on other predetermined factors.

The grid may add new machines at any time (e.g., initiated from any control node). Upon adding a new node to the grid, the control node may first add the new node to its table of grid nodes. The control node may also then notify every other control node about the new node. The nodes receiving the notification may acknowledge that they have updated their configuration information.

Primary control node 402 may, for example, transmit one or more communications to backup control nodes 404 and 406 (and, for example, to other control or worker nodes within the communications grid). Such communications may be sent periodically, at fixed time intervals, between known fixed stages of the project's execution, among other protocols. The communications transmitted by primary control node 402 may be of varied types and may include a variety of types of information. For example, primary control node 402 may transmit snapshots (e.g., status information) of the communications grid so that backup control node 404 always has a recent snapshot of the communications grid. The snapshot or grid status may include, for example, the structure of the grid (including, for example, the worker nodes in the grid, unique identifiers of the nodes, or their relationships with the primary control node) and the status of a project (including, for example, the status of each worker node's portion of the project). The snapshot may also include analysis or results received from worker nodes in the communications grid. The backup control nodes may receive and store the backup data received from the primary control node. The backup control nodes may transmit a request for such a snapshot (or other information) from the primary control node, or the primary control node may send such information periodically to the backup control nodes.

As noted, the backup data may allow the backup control node to take over as primary control node if the primary control node fails without requiring the grid to start the project over from scratch. If the primary control node fails, the backup control node that will take over as primary control node may retrieve the most recent version of the snapshot received from the primary control node and use the snapshot to continue the project from the stage of the project indicated by the backup data. This may prevent failure of the project as a whole.

A backup control node may use various methods to determine that the primary control node has failed. In one example of such a method, the primary control node may transmit (e.g., periodically) a communication to the backup control node that indicates that the primary control node is working and has not failed, such as a heartbeat communication. The backup control node may determine that the primary control node has failed if the backup control node has not received a heartbeat communication for a certain predetermined period of time. Alternatively, a backup control node may also receive a communication from the primary control node itself (before it failed) or from a worker node that the primary control node has failed, for example because the primary control node has failed to communicate with the worker node.

Different methods may be performed to determine which backup control node of a set of backup control nodes (e.g., backup control nodes 404 and 406) will take over for failed primary control node 402 and become the new primary control node. For example, the new primary control node may be chosen based on a ranking or "hierarchy" of backup control nodes based on their unique identifiers. In an alternative embodiment, a backup control node may be assigned to be the new primary control node by another device in the communications grid or from an external device (e.g., a system infrastructure or an end user, such as a server or computer, controlling the communications grid). In another alternative embodiment, the backup control node that takes over as the new primary control node may be designated based on bandwidth or other statistics about the communications grid.

A worker node within the communications grid may also fail. If a worker node fails, work being performed by the failed worker node may be redistributed amongst the operational worker nodes. In an alternative embodiment, the primary control node may transmit a communication to each of the operable worker nodes still on the communications grid that each of the worker nodes should purposefully fail also. After each of the worker nodes fail, they may each retrieve their most recent saved checkpoint of their status and re-start the project from that checkpoint to minimize lost progress on the project being executed.

Figure 5:
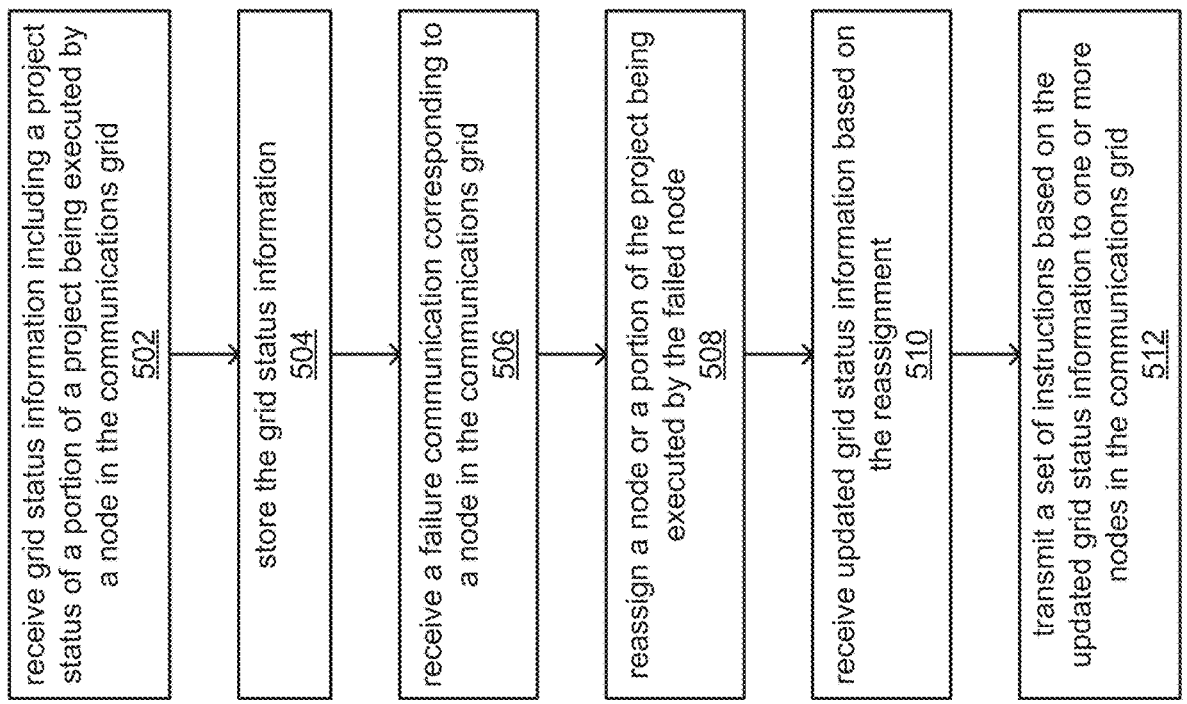
FIG. 5 illustrates a flow chart showing an example process for adjusting a communications grid or a work project in a communications grid after a failure of a node, according to some embodiments of the present technology.

FIG. 5 illustrates a flow chart showing an example process 500 for adjusting a communications grid or a work project in a communications grid after a failure of a node, according to embodiments of the present technology. The process may include, for example, receiving grid status information including a project status of a portion of a project being executed by a node in the communications grid, as described in operation 502. For example, a control node (e.g., a backup control node connected to a primary control node and a worker node on a communications grid) may receive grid status information, where the grid status information includes a project status of the primary control node or a project status of the worker node. The project status of the primary control node and the project status of the worker node may include a status of one or more portions of a project being executed by the primary and worker nodes in the communications grid. The process may also include storing the grid status information, as described in operation 504. For example, a control node (e.g., a backup control node) may store the received grid status information locally within the control node. Alternatively, the grid status information may be sent to another device for storage where the control node may have access to the information.

The process may also include receiving a failure communication corresponding to a node in the communications grid in operation 506. For example, a node may receive a failure communication including an indication that the primary control node has failed, prompting a backup control node to take over for the primary control node. In an alternative embodiment, a node may receive a failure that a worker node has failed, prompting a control node to reassign the work being performed by the worker node. The process may also include reassigning a node or a portion of the project being executed by the failed node, as described in operation 508. For example, a control node may designate the backup control node as a new primary control node based on the failure communication upon receiving the failure communication. If the failed node is a worker node, a control node may identify a project status of the failed worker node using the snapshot of the communications grid, where the project status of the failed worker node includes a status of a portion of the project being executed by the failed worker node at the failure time.

The process may also include receiving updated grid status information based on the reassignment, as described in operation 510, and transmitting a set of instructions based on the updated grid status information to one or more nodes in the communications grid, as described in operation 512. The updated grid status information may include an updated project status of the primary control node or an updated project status of the worker node. The updated information may be transmitted to the other nodes in the grid to update their stale stored information.

Figure 6:
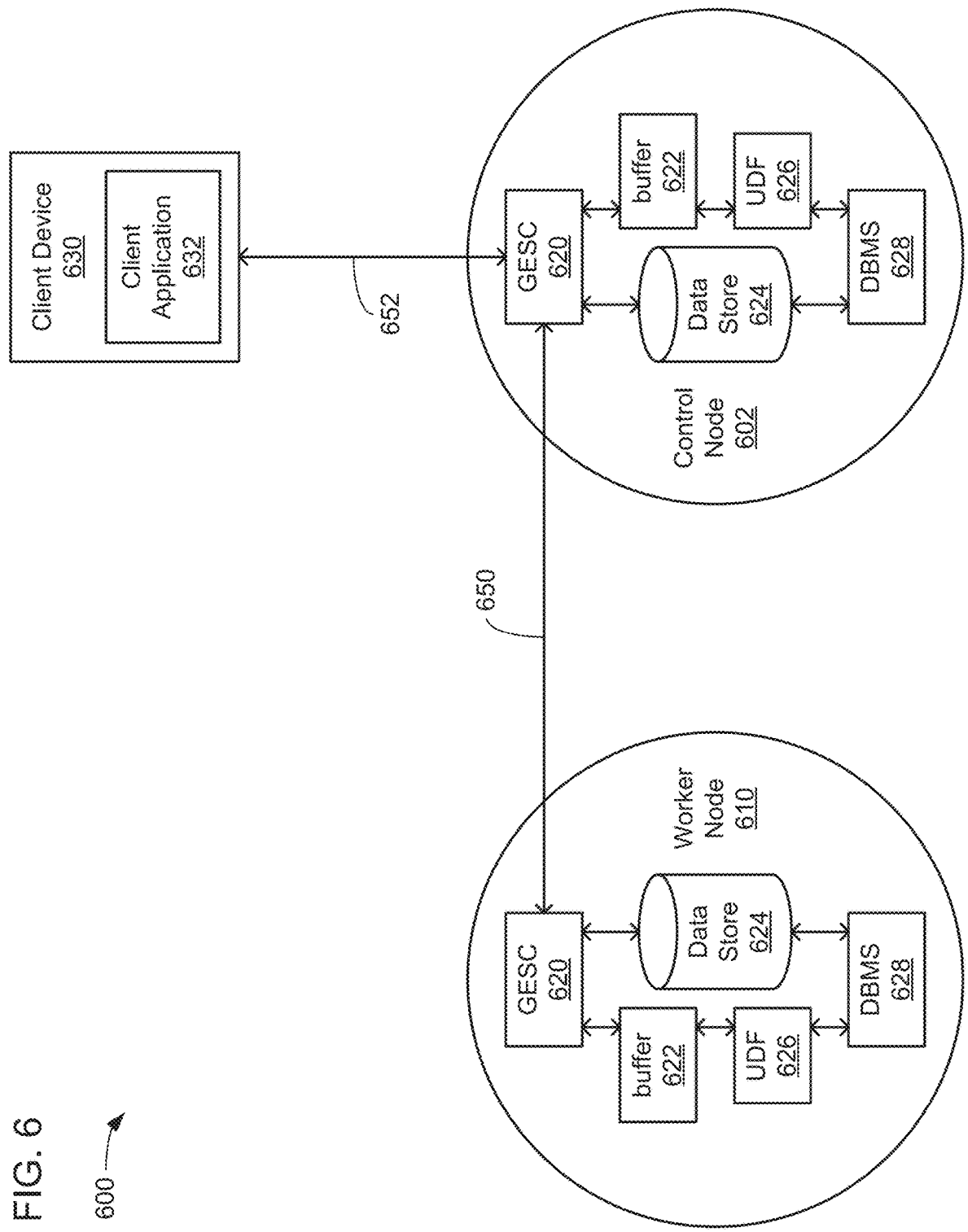
FIG. 6 illustrates a portion of a communications grid computing system including a control node and a worker node, according to some embodiments of the present technology.

FIG. 6 illustrates a portion of a communications grid computing system 600 including a control node and a worker node, according to embodiments of the present technology. Communications grid 600 computing system includes one control node (control node 602) and one worker node (worker node 610) for purposes of illustration but may include more worker and/or control nodes. The control node 602 is communicatively connected to worker node 610 via communication path 650. Therefore, control node 602 may transmit information (e.g., related to the communications grid or notifications), to and receive information from worker node 610 via path 650.

Similar to in FIG. 4, communications grid computing system (or just "communications grid") 600 includes data processing nodes (control node 602 and worker node 610). Nodes 602 and 610 include multi-core data processors. Each node 602 and 610 includes a grid-enabled software component (GESC) 620 that executes on the data processor associated with that node and interfaces with buffer memory 622 also associated with that node. Each node 602 and 610 includes database management software (DBMS) 628 that executes on a database server (not shown) at control node 602 and on a database server (not shown) at worker node 610.

Each node also includes a data store 624. Data stores 624, similar to network-attached data stores 110 in FIG. 1 and data stores 235 in FIG. 2, are used to store data to be processed by the nodes in the computing environment. Data stores 624 may also store any intermediate or final data generated by the computing system after being processed, for example in non-volatile memory. However, in certain embodiments, the configuration of the grid computing environment allows its operations to be performed such that intermediate and final data results can be stored solely in volatile memory (e.g., RAM), without a requirement that intermediate or final data results be stored to non-volatile types of memory. Storing such data in volatile memory may be useful in certain situations, such as when the grid receives queries (e.g., ad hoc) from a client and when responses, which are generated by processing large amounts of data, need to be generated quickly or on-the-fly. In such a situation, the grid may be configured to retain the data within memory so that responses can be generated at different levels of detail and so that a client may interactively query against this information.

Each node also includes a user-defined function (UDF) 626. The UDF provides a mechanism for the DBMS 628 to transfer data to or receive data from the database stored in the data stores 624 that are managed by the DBMS. For example, UDF 626 can be invoked by the DBMS to provide data to the GESC for processing. The UDF 626 may establish a socket connection (not shown) with the GESC to transfer the data. Alternatively, the UDF 626 can transfer data to the GESC by writing data to shared memory accessible by both the UDF and the GESC.

The GESC 620 at the nodes 602 and 620 may be connected via a network, such as network 108 shown in FIG. 1. Therefore, nodes 602 and 620 can communicate with each other via the network using a predetermined communication protocol such as, for example, the Message Passing Interface (MPI). Each GESC 620 can engage in point-to-point communication with the GESC at another node or in collective communication with multiple GESCs via the network. The GESC 620 at each node may contain identical (or nearly identical) software instructions. Each node may be capable of operating as either a control node or a worker node. The GESC at the control node 602 can communicate, over a communication path 652, with a client deice 630. More specifically, control node 602 may communicate with client application 632 hosted by the client device 630 to receive queries and to respond to those queries after processing large amounts of data.

DBMS 628 may control the creation, maintenance, and use of database or data structure (not shown) within a nodes 602 or 610. The database may organize data stored in data stores 624. The DBMS 628 at control node 602 may accept requests for data and transfer the appropriate data for the request. With such a process, collections of data may be distributed across multiple physical locations. In this example, each node 602 and 610 stores a portion of the total data managed by the management system in its associated data store 624.

Furthermore, the DBMS may be responsible for protecting against data loss using replication techniques. Replication includes providing a backup copy of data stored on one node on one or more other nodes. Therefore, if one node fails, the data from the failed node can be recovered from a replicated copy residing at another node. However, as described herein with respect to FIG. 4, data or status information for each node in the communications grid may also be shared with each node on the grid.

Figure 7:
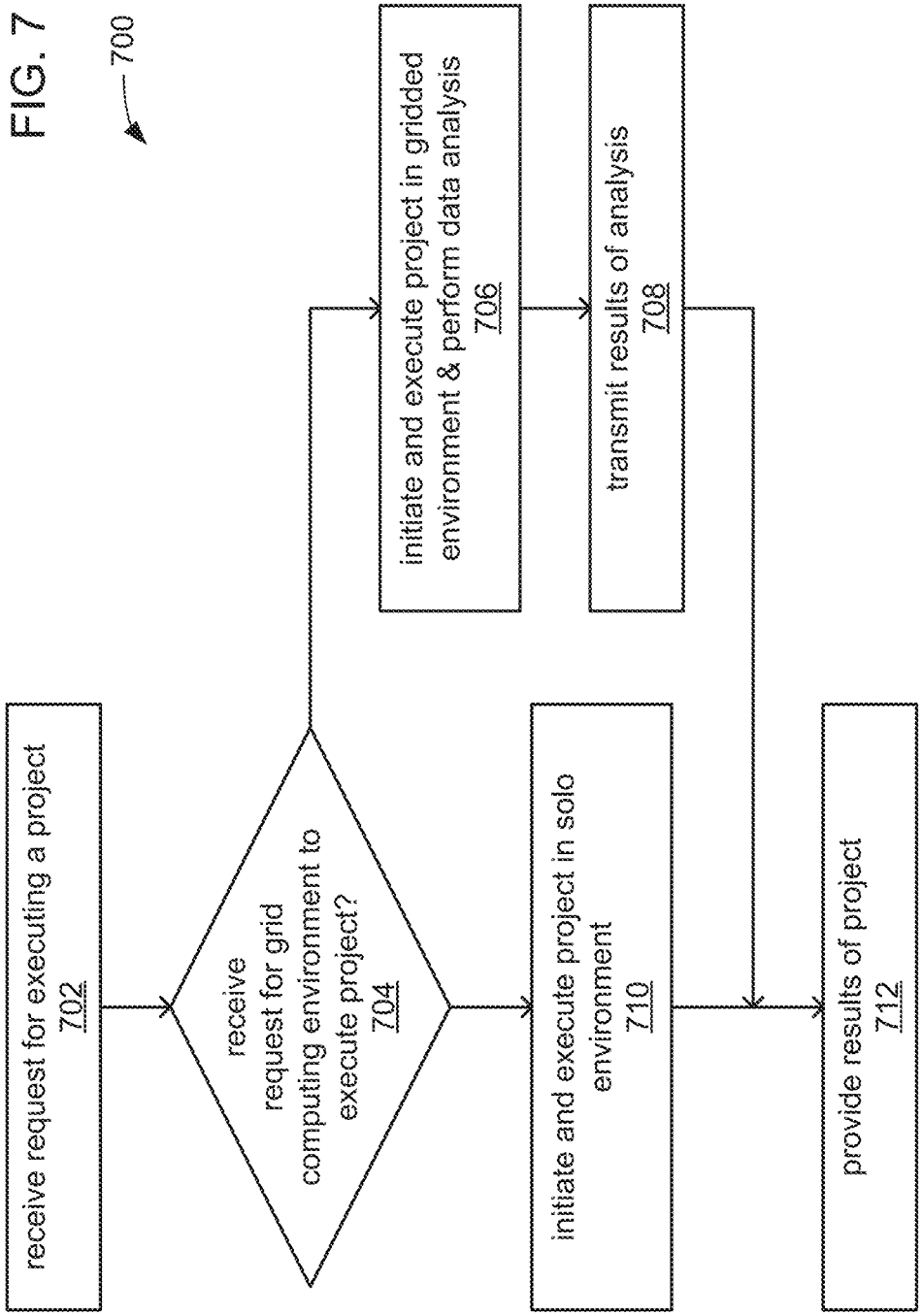
FIG. 7 illustrates a flow chart showing an example process for executing a data analysis or processing project, according to some embodiments of the present technology.

FIG. 7 illustrates a flow chart showing an example method 700 for executing a project within a grid computing system, according to embodiments of the present technology. As described with respect to FIG. 6, the GESC at the control node may transmit data with a client device (e.g., client device 630) to receive queries for executing a project and to respond to those queries after large amounts of data have been processed. The query may be transmitted to the control node, where the query may include a request for executing a project, as described in operation 702. The query can contain instructions on the type of data analysis to be performed in the project and whether the project should be executed using the grid-based computing environment, as shown in operation 704.

To initiate the project, the control node may determine if the query requests use of the grid-based computing environment to execute the project. If the determination is no, then the control node initiates execution of the project in a solo environment (e.g., at the control node), as described in operation 710. If the determination is yes, the control node may initiate execution of the project in the grid-based computing environment, as described in operation 706. In such a situation, the request may include a requested configuration of the grid. For example, the request may include a number of control nodes and a number of worker nodes to be used in the grid when executing the project. After the project has been completed, the control node may transmit results of the analysis yielded by the grid, as described in operation 708. Whether the project is executed in a solo or grid-based environment, the control node provides the results of the project, as described in operation 712.

As noted with respect to FIG. 2, the computing environments described herein may collect data (e.g., as received from network devices, such as sensors, such as network devices 204-209 in FIG. 2, and client devices or other sources) to be processed as part of a data analytics project, and data may be received in real time as part of a streaming analytics environment (e.g., ESP). Data may be collected using a variety of sources as communicated via different kinds of networks or locally, such as on a real-time streaming basis. For example, network devices may receive data periodically from network device sensors as the sensors continuously sense, monitor and track changes in their environments. More specifically, an increasing number of distributed applications develop or produce continuously flowing data from distributed sources by applying queries to the data before distributing the data to geographically distributed recipients. An event stream processing engine (ESPE) may continuously apply the queries to the data as it is received and determines which entities should receive the data. Client or other devices may also subscribe to the ESPE or other devices processing ESP data so that they can receive data after processing, based on for example the entities determined by the processing engine. For example, client devices 230 in FIG. 2 may subscribe to the ESPE in computing environment 214. In another example, event subscription devices 1024*a-c*, described further with respect to FIG. 10, may also subscribe to the ESPE. The ESPE may determine or define how input data or event streams from network devices or other publishers (e.g., network devices 204-209 in FIG. 2) are transformed into meaningful output data to be consumed by subscribers, such as for example client devices 230 in FIG. 2.

FIG. 8 illustrates a block diagram including components of an Event Stream Processing Engine (ESPE), according to embodiments of the present technology. ESPE 800 may include one or more projects 802. A project may be described as a second-level container in an engine model managed by ESPE 800 where a thread pool size for the project may be defined by a user. Each project of the one or more projects 802 may include one or more continuous queries 804 that contain data flows, which are data transformations of incoming event streams. The one or more continuous queries 804 may include one or more source windows 806 and one or more derived windows 808.

The ESPE may receive streaming data over a period of time related to certain events, such as events or other data sensed by one or more network devices. The ESPE may perform operations associated with processing data created by the one or more devices. For example, the ESPE may receive data from the one or more network devices 204-209 shown in FIG. 2. As noted, the network devices may include sensors that sense different aspects of their environments and may collect data over time based on those sensed observations. For example, the ESPE may be implemented within one or more of machines 220 and 240 shown in FIG. 2. The ESPE may be implemented within such a machine by an ESP application. An ESP application may embed an ESPE with its own dedicated thread pool or pools into its application space where the main application thread can do application-specific work and the ESPE processes event streams at least by creating an instance of a model into processing objects.

The engine container is the top-level container in a model that manages the resources of the one or more projects 802. In an illustrative embodiment, for example, there may be only one ESPE 800 for each instance of the ESP application, and ESPE 800 may have a unique engine name. Additionally, the one or more projects 802 may each have unique project names, and each query may have a unique continuous query name and begin with a uniquely named source window of the one or more source windows 806. ESPE 800 may or may not be persistent.

Continuous query modeling involves defining directed graphs of windows for event stream manipulation and transformation. A window in the context of event stream manipulation and transformation is a processing node in an event stream processing model. A window in a continuous query can perform aggregations, computations, pattern-matching, and other operations on data flowing through the window. A continuous query may be described as a directed graph of source, relational, pattern matching, and procedural windows. The one or more source windows 806 and the one or more derived windows 808 represent continuously executing queries that generate updates to a query result set as new event blocks stream through ESPE 800. A directed graph, for example, is a set of nodes connected by edges, where the edges have a direction associated with them.

An event object may be described as a packet of data accessible as a collection of fields, with at least one of the fields defined as a key or unique identifier (ID). The event object may be created using a variety of formats including binary, alphanumeric, XML, etc. Each event object may include one or more fields designated as a primary identifier (ID) for the event so ESPE 800 can support operation codes (opcodes) for events including insert, update, upsert, and delete. Upsert opcodes update the event if the key field already exists; otherwise, the event is inserted. For illustration, an event object may be a packed binary representation of a set of field values and include both metadata and field data associated with an event. The metadata may include an opcode indicating if the event represents an insert, update, delete, or upsert, a set of flags indicating if the event is a normal, partial-update, or a retention generated event from retention policy management, and a set of microsecond timestamps that can be used for latency measurements.

An event block object may be described as a grouping or package of event objects. An event stream may be described as a flow of event block objects. A continuous query of the one or more continuous queries 804 transforms a source event stream made up of streaming event block objects published into ESPE 800 into one or more output event streams using the one or more source windows 806 and the one or more derived windows 808. A continuous query can also be thought of as data flow modeling.

The one or more source windows 806 are at the top of the directed graph and have no windows feeding into them. Event streams are published into the one or more source windows 806, and from there, the event streams may be directed to the next set of connected windows as defined by the directed graph. The one or more derived windows 808 are all instantiated windows that are not source windows and that have other windows streaming events into them. The one or more derived windows 808 may perform computations or transformations on the incoming event streams. The one or more derived windows 808 transform event streams based on the window type (that is operators such as join, filter, compute, aggregate, copy, pattern match, procedural, union, etc.) and window settings. As event streams are published into ESPE 800, they are continuously queried, and the resulting sets of derived windows in these queries are continuously updated.

FIG. 9 illustrates a flow chart showing an example process including operations performed by an event stream processing engine, according to some embodiments of the present technology. As noted, the ESPE 800 (or an associated ESP application) defines how input event streams are transformed into meaningful output event streams. More specifically, the ESP application may define how input event streams from publishers (e.g., network devices providing sensed data) are transformed into meaningful output event streams consumed by subscribers (e.g., a data analytics project being executed by a machine or set of machines).

Within the application, a user may interact with one or more user interface windows presented to the user in a display under control of the ESPE independently or through a browser application in an order selectable by the user. For example, a user may execute an ESP application, which causes presentation of a first user interface window, which may include a plurality of menus and selectors such as drop down menus, buttons, text boxes, hyperlinks, etc. associated with the ESP application as understood by a person of skill in the art. As further understood by a person of skill in the art, various operations may be performed in parallel, for example, using a plurality of threads.

At operation 900, an ESP application may define and start an ESPE, thereby instantiating an ESPE at a device, such as machine 220 and/or 240. In an operation 902, the engine container is created. For illustration, ESPE 800 may be instantiated using a function call that specifies the engine container as a manager for the model.

In an operation 904, the one or more continuous queries 804 are instantiated by ESPE 800 as a model. The one or more continuous queries 804 may be instantiated with a dedicated thread pool or pools that generate updates as new events stream through ESPE 800. For illustration, the one or more continuous queries 804 may be created to model business processing logic within ESPE 800, to predict events within ESPE 800, to model a physical system within ESPE 800, to predict the physical system state within ESPE 800, etc. For example, as noted, ESPE 800 may be used to support sensor data monitoring and management (e.g., sensing may include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, or electrical current, etc.).

ESPE 800 may analyze and process events in motion or "event streams." Instead of storing data and running queries against the stored data, ESPE 800 may store queries and stream data through them to allow continuous analysis of data as it is received. The one or more source windows 806 and the one or more derived windows 808 may be created based on the relational, pattern matching, and procedural algorithms that transform the input event streams into the output event streams to model, simulate, score, test, predict, etc. based on the continuous query model defined and application to the streamed data.

In an operation 906, a publish/subscribe (pub/sub) capability is initialized for ESPE 800. In an illustrative embodiment, a pub/sub capability is initialized for each project of the one or more projects 802. To initialize and enable pub/sub capability for ESPE 800, a port number may be provided. Pub/sub clients can use a host name of an ESP device running the ESPE and the port number to establish pub/sub connections to ESPE 800.

FIG. 10 illustrates an ESP system 1000 interfacing between publishing device 1022 and event subscribing devices 1024*a-c*, according to embodiments of the present technology. ESP system 1000 may include ESP device or subsystem 851, event publishing device 1022, an event subscribing device A 1024*a*, an event subscribing device B 1024*b*, and an event subscribing device C 1024*c*. Input event streams are output to ESP device 851 by publishing device 1022. In alternative embodiments, the input event streams may be created by a plurality of publishing devices. The plurality of publishing devices further may publish event streams to other ESP devices. The one or more continuous queries instantiated by ESPE 800 may analyze and process the input event streams to form output event streams output to event subscribing device A 1024*a*, event subscribing device B 1024*b*, and event subscribing device C 1024*c*. ESP system 1000 may include a greater or a fewer number of event subscribing devices of event subscribing devices.

Publish-subscribe is a message-oriented interaction paradigm based on indirect addressing. Processed data recipients specify their interest in receiving information from ESPE 800 by subscribing to specific classes of events, while information sources publish events to ESPE 800 without directly addressing the receiving parties. ESPE 800 coordinates the interactions and processes the data. In some cases, the data source receives confirmation that the published information has been received by a data recipient.

A publish/subscribe API may be described as a library that enables an event publisher, such as publishing device 1022, to publish event streams into ESPE 800 or an event subscriber, such as event subscribing device A 1024*a*, event subscribing device B 1024*b*, and event subscribing device C 1024*c*, to subscribe to event streams from ESPE 800. For illustration, one or more publish/subscribe APIs may be defined. Using the publish/subscribe API, an event publishing application may publish event streams into a running event stream processor project source window of ESPE 800, and the event subscription application may subscribe to an event stream processor project source window of ESPE 800.

The publish/subscribe API provides cross-platform connectivity and endianness compatibility between ESP application and other networked applications, such as event publishing applications instantiated at publishing device 1022, and event subscription applications instantiated at one or more of event subscribing device A 1024*a*, event subscribing device B 1024*b*, and event subscribing device C 1024*c*.

Referring back to FIG. 9, operation 906 initializes the publish/subscribe capability of ESPE 800. In an operation 908, the one or more projects 802 are started. The one or more started projects may run in the background on an ESP device. In an operation 910, an event block object is received from one or more computing device of the event publishing device 1022.

ESP subsystem 800 may include a publishing client 1002, ESPE 800, a subscribing client A 1004, a subscribing client B 1006, and a subscribing client C 1008. Publishing client 1002 may be started by an event publishing application executing at publishing device 1022 using the publish/subscribe API. Subscribing client A 1004 may be started by an event subscription application A, executing at event subscribing device A 1024*a* using the publish/subscribe API. Subscribing client B 1006 may be started by an event subscription application B executing at event subscribing device B 1024*b* using the publish/subscribe API. Subscribing client C 1008 may be started by an event subscription application C executing at event subscribing device C 1024*c* using the publish/subscribe API.

An event block object containing one or more event objects is injected into a source window of the one or more source windows 806 from an instance of an event publishing application on event publishing device 1022. The event block object may be generated, for example, by the event publishing application and may be received by publishing client 1002. A unique ID may be maintained as the event block object is passed between the one or more source windows 806 and/or the one or more derived windows 808 of ESPE 800, and to subscribing client A 1004, subscribing client B 1006, and subscribing client C 1008 and to event subscription device A 1024*a*, event subscription device B 1024*b*, and event subscription device C 1024*c*. Publishing client 1002 may further generate and include a unique embedded transaction ID in the event block object as the event block object is processed by a continuous query, as well as the unique ID that publishing device 1022 assigned to the event block object.

In an operation 912, the event block object is processed through the one or more continuous queries 804. In an operation 914, the processed event block object is output to one or more computing devices of the event subscribing devices 1024*a-c*. For example, subscribing client A 1004, subscribing client B 1006, and subscribing client C 1008 may send the received event block object to event subscription device A 1024*a*, event subscription device B 1024*b*, and event subscription device C 1024*c*, respectively.

ESPE 800 maintains the event block containership aspect of the received event blocks from when the event block is published into a source window and works its way through the directed graph defined by the one or more continuous queries 804 with the various event translations before being output to subscribers. Subscribers can correlate a group of subscribed events back to a group of published events by comparing the unique ID of the event block object that a publisher, such as publishing device 1022, attached to the event block object with the event block ID received by the subscriber.

In an operation 916, a determination is made concerning whether or not processing is stopped. If processing is not stopped, processing continues in operation 910 to continue receiving the one or more event streams containing event block objects from the, for example, one or more network devices. If processing is stopped, processing continues in an operation 918. In operation 918, the started projects are stopped. In operation 920, the ESPE is shutdown.

As noted, in some embodiments, big data is processed for an analytics project after the data is received and stored. In other embodiments, distributed applications process continuously flowing data in real-time from distributed sources by applying queries to the data before distributing the data to geographically distributed recipients. As noted, an event stream processing engine (ESPE) may continuously apply the queries to the data as it is received and determines which entities receive the processed data. This allows for large amounts of data being received and/or collected in a variety of environments to be processed and distributed in real time. For example, as shown with respect to FIG. 2, data may be collected from network devices that may include devices within the internet of things, such as devices within a home automation network. However, such data may be collected from a variety of different resources in a variety of different environments. In any such situation, embodiments of the present technology allow for real-time processing of such data.

Aspects of the current disclosure provide technical solutions to technical problems, such as computing problems that arise when an ESP device fails which results in a complete service interruption and potentially significant data loss. The data loss can be catastrophic when the streamed data is supporting mission critical operations such as those in support of an ongoing manufacturing or drilling operation. An embodiment of an ESP system achieves a rapid and seamless failover of ESPE running at the plurality of ESP devices without service interruption or data loss, thus significantly improving the reliability of an operational system that relies on the live or real-time processing of the data streams. The event publishing systems, the event subscribing systems, and each ESPE not executing at a failed ESP device are not aware of or effected by the failed ESP device. The ESP system may include thousands of event publishing systems and event subscribing systems. The ESP system keeps the failover logic and awareness within the boundaries of out-messaging network connector and out-messaging network device.

In one example embodiment, a system is provided to support a failover when event stream processing (ESP) event blocks. The system includes, but is not limited to, an out-messaging network device and a computing device. The computing device includes, but is not limited to, a processor and a computer-readable medium operably coupled to the processor. The processor is configured to execute an ESP engine (ESPE). The computer-readable medium has instructions stored thereon that, when executed by the processor, cause the computing device to support the failover. An event block object is received from the ESPE that includes a unique identifier. A first status of the computing device as active or standby is determined. When the first status is active, a second status of the computing device as newly active or not newly active is determined. Newly active is determined when the computing device is switched from a standby status to an active status. When the second status is newly active, a last published event block object identifier that uniquely identifies a last published event block object is determined. A next event block object is selected from a non-transitory computer-readable medium accessible by the computing device. The next event block object has an event block object identifier that is greater than the determined last published event block object identifier. The selected next event block object is published to an out-messaging network device. When the second status of the computing device is not newly active, the received event block object is published to the out-messaging network device. When the first status of the computing device is standby, the received event block object is stored in the non-transitory computer-readable medium.

Figure 11:
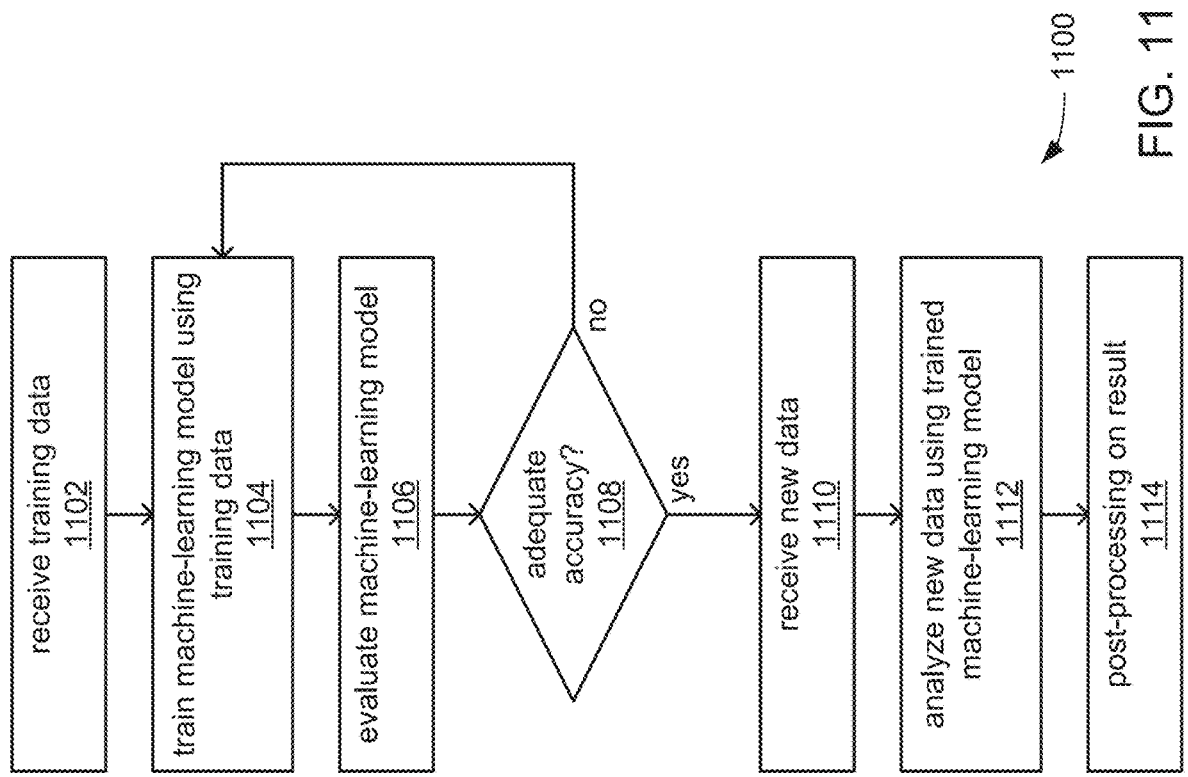
FIG. 11 illustrates a flow chart of an example of a process for generating and using a machine-learning model according to some aspects, according to embodiments of the present technology.

FIG. 11 is a flow chart of an example of a process for generating and using a machine-learning model according to some aspects. Machine learning is a branch of artificial intelligence that relates to mathematical models that can learn from, categorize, and make predictions about data. Such mathematical models, which can be referred to as machine-learning models, can classify input data among two or more classes; cluster input data among two or more groups; predict a result based on input data; identify patterns or trends in input data; identify a distribution of input data in a space; or any combination of these. Examples of machine-learning models can include (i) neural networks; (ii) decision trees, such as classification trees and regression trees; (iii) classifiers, such as Naïve bias classifiers, logistic regression classifiers, ridge regression classifiers, random forest classifiers, least absolute shrinkage and selector (LASSO) classifiers, and support vector machines; (iv) clusterers, such as k-means clusterers, mean-shift clusterers, and spectral clusterers; (v) factorizers, such as factorization machines, principal component analyzers and kernel principal component analyzers; and (vi) ensembles or other combinations of machine-learning models. In some examples, neural networks can include deep neural networks, feed-forward neural networks, recurrent neural networks, convolutional neural networks, radial basis function (RBF) neural networks, echo state neural networks, long short-term memory neural networks, bi-directional recurrent neural networks, gated neural networks, hierarchical recurrent neural networks, stochastic neural networks, modular neural networks, spiking neural networks, dynamic neural networks, cascading neural networks, neuro-fuzzy neural networks, or any combination of these.

Different machine-learning models may be used interchangeably to perform a task. Examples of tasks that can be performed at least partially using machine-learning models include various types of scoring; bioinformatics; cheminformatics; software engineering; fraud detection; customer segmentation; generating online recommendations; adaptive websites; determining customer lifetime value; search engines; placing advertisements in real time or near real time; classifying DNA sequences; affective computing; performing natural language processing and understanding; object recognition and computer vision; robotic locomotion; playing games; optimization and metaheuristics; detecting network intrusions; medical diagnosis and monitoring; or predicting when an asset, such as a machine, will need maintenance.

Any number and combination of tools can be used to create machine-learning models. Examples of tools for creating and managing machine-learning models can include SAS® Enterprise Miner, SAS® Rapid Predictive Modeler, and SAS® Model Manager, SAS Cloud Analytic Services (CAS)®, SAS Viya® of all which are by SAS Institute Inc. of Cary, North Carolina.

Machine-learning models can be constructed through an at least partially automated (e.g., with little or no human involvement) process called training. During training, input data can be iteratively supplied to a machine-learning model to enable the machine-learning model to identify patterns related to the input data or to identify relationships between the input data and output data. With training, the machine-learning model can be transformed from an untrained state to a trained state. Input data can be split into one or more training sets and one or more validation sets, and the training process may be repeated multiple times. The splitting may follow a k-fold cross-validation rule, a leave-one-out-rule, a leave-p-out rule, or a holdout rule. An overview of training and using a machine-learning model is described below with respect to the flow chart of FIG. 11.

In block 1102, training data is received. In some examples, the training data is received from a remote database or a local database, constructed from various subsets of data, or input by a user. The training data can be used in its raw form for training a machine-learning model or pre-processed into another form, which can then be used for training the machine-learning model. For example, the raw form of the training data can be smoothed, truncated, aggregated, clustered, or otherwise manipulated into another form, which can then be used for training the machine-learning model.

In block 1104, a machine-learning model is trained using the training data. The machine-learning model can be trained in a supervised, unsupervised, or semi-supervised manner. In supervised training, each input in the training data is correlated to a desired output. This desired output may be a scalar, a vector, or a different type of data structure such as text or an image. This may enable the machine-learning model to learn a mapping between the inputs and desired outputs. In unsupervised training, the training data includes inputs, but not desired outputs, so that the machine-learning model has to find structure in the inputs on its own. In semi-supervised training, only some of the inputs in the training data are correlated to desired outputs.

In block 1106, the machine-learning model is evaluated. For example, an evaluation dataset can be obtained, for example, via user input or from a database. The evaluation dataset can include inputs correlated to desired outputs. The inputs can be provided to the machine-learning model and the outputs from the machine-learning model can be compared to the desired outputs. If the outputs from the machine-learning model closely correspond with the desired outputs, the machine-learning model may have a high degree of accuracy. For example, if 90% or more of the outputs from the machine-learning model are the same as the desired outputs in the evaluation dataset, the machine-learning model may have a high degree of accuracy. Otherwise, the machine-learning model may have a low degree of accuracy. The 90% number is an example only. A realistic and desirable accuracy percentage is dependent on the problem and the data.

In some examples, if, at 1108, the machine-learning model has an inadequate degree of accuracy for a particular task, the process can return to block 1104, where the machine-learning model can be further trained using additional training data or otherwise modified to improve accuracy. However, if, at 1108, the machine-learning model has an adequate degree of accuracy for the particular task, the process can continue to block 1110.

In block 1110, new data is received. In some examples, the new data is received from a remote database or a local database, constructed from various subsets of data, or input by a user. The new data may be unknown to the machine-learning model. For example, the machine-learning model may not have previously processed or analyzed the new data.

In block 1112, the trained machine-learning model is used to analyze the new data and provide a result. For example, the new data can be provided as input to the trained machine-learning model. The trained machine-learning model can analyze the new data and provide a result that includes a classification of the new data into a particular class, a clustering of the new data into a particular group, a prediction based on the new data, or any combination of these.

In block 1114, the result is post-processed. For example, the result can be added to, multiplied with, or otherwise combined with other data as part of a job. As another example, the result can be transformed from a first format, such as a time series format, into another format, such as a count series format. Any number and combination of operations can be performed on the result during post-processing.

Figure 12:
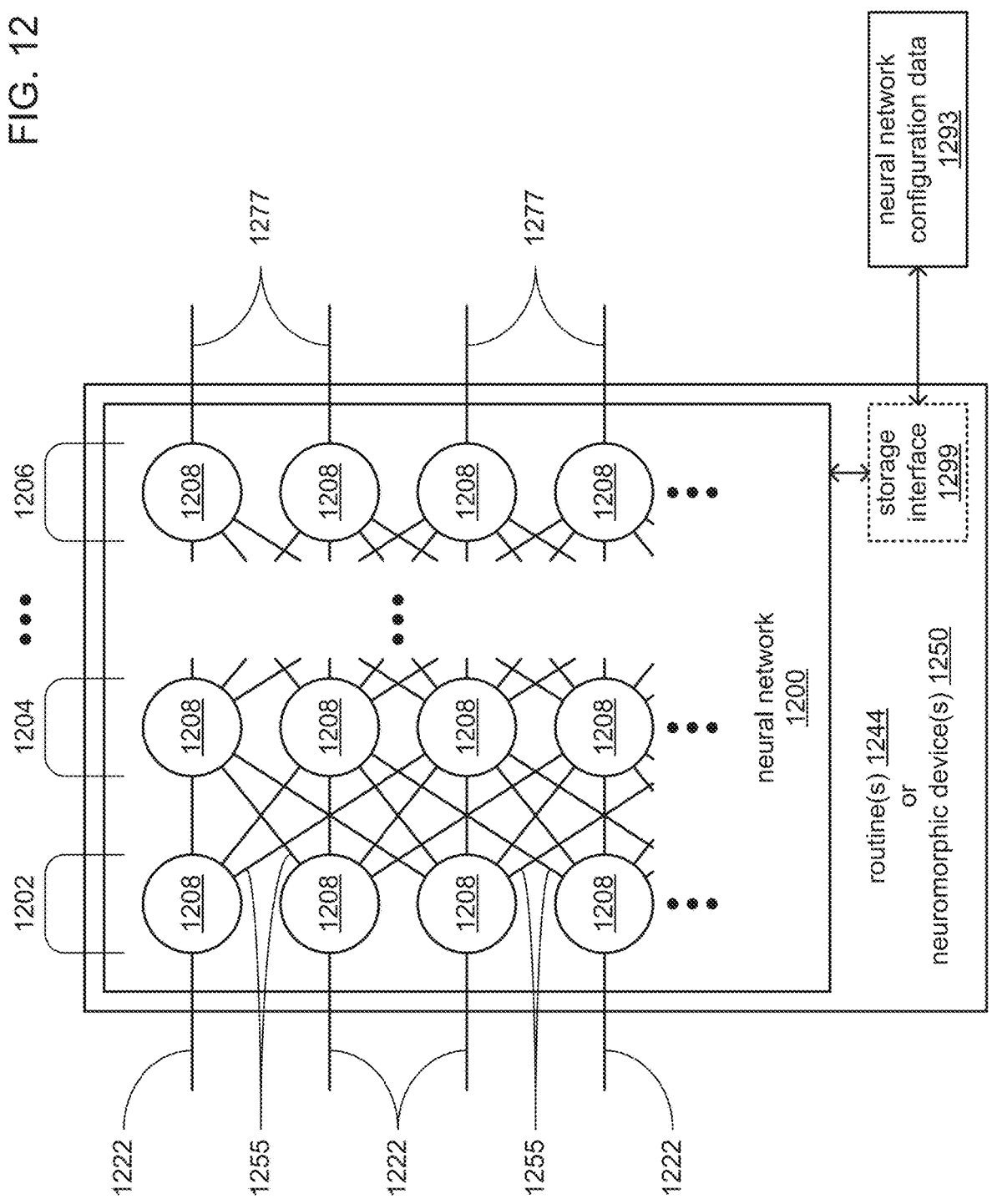
FIG. 12 illustrates an example of a machine-learning model as a neural network, according to embodiments of the present technology.

A more specific example of a machine-learning model is the neural network 1200 shown in FIG. 12. The neural network 1200 is represented as multiple layers of neurons 1208 that can exchange data between one another via connections 1255 that may be selectively instantiated thereamong. The layers include an input layer 1202 for receiving input data provided at inputs 1222, one or more hidden layers 1204, and an output layer 1206 for providing a result at outputs 1277. The hidden layer(s) 1204 are referred to as hidden because they may not be directly observable or have their inputs or outputs directly accessible during the normal functioning of the neural network 1200. Although the neural network 1200 is shown as having a specific number of layers and neurons for exemplary purposes, the neural network 1200 can have any number and combination of layers, and each layer can have any number and combination of neurons.

The neurons 1208 and connections 1255 thereamong may have numeric weights, which can be tuned during training of the neural network 1200. For example, training data can be provided to at least the inputs 1222 to the input layer 1202 of the neural network 1200, and the neural network 1200 can use the training data to tune one or more numeric weights of the neural network 1200. In some examples, the neural network 1200 can be trained using backpropagation. Backpropagation can include determining a gradient of a particular numeric weight based on a difference between an actual output of the neural network 1200 at the outputs 1277 and a desired output of the neural network 1200. Based on the gradient, one or more numeric weights of the neural network 1200 can be updated to reduce the difference therebetween, thereby increasing the accuracy of the neural network 1200. This process can be repeated multiple times to train the neural network 1200. For example, this process can be repeated hundreds or thousands of times to train the neural network 1200.

In some examples, the neural network 1200 is a feed-forward neural network. In a feed-forward neural network, the connections 1255 are instantiated and/or weighted so that every neuron 1208 only propagates an output value to a subsequent layer of the neural network 1200. For example, data may only move one direction (forward) from one neuron 1208 to the next neuron 1208 in a feed-forward neural network. Such a "forward" direction may be defined as proceeding from the input layer 1202 through the one or more hidden layers 1204, and toward the output layer 1206.

In other examples, the neural network 1200 may be a recurrent neural network. A recurrent neural network can include one or more feedback loops among the connections 1255, thereby allowing data to propagate in both forward and backward through the neural network 1200. Such a "backward" direction may be defined as proceeding in the opposite direction of forward, such as from the output layer 1206 through the one or more hidden layers 1204, and toward the input layer 1202. This can allow for information to persist within the recurrent neural network. For example, a recurrent neural network can determine an output based at least partially on information that the recurrent neural network has seen before, giving the recurrent neural network the ability to use previous input to inform the output.

In some examples, the neural network 1200 operates by receiving a vector of numbers from one layer; transforming the vector of numbers into a new vector of numbers using a matrix of numeric weights, a nonlinearity, or both; and providing the new vector of numbers to a subsequent layer ("subsequent" in the sense of moving "forward") of the neural network 1200. Each subsequent layer of the neural network 1200 can repeat this process until the neural network 1200 outputs a final result at the outputs 1277 of the output layer 1206. For example, the neural network 1200 can receive a vector of numbers at the inputs 1222 of the input layer 1202. The neural network 1200 can multiply the vector of numbers by a matrix of numeric weights to determine a weighted vector. The matrix of numeric weights can be tuned during the training of the neural network 1200. The neural network 1200 can transform the weighted vector using a nonlinearity, such as a sigmoid tangent or the hyperbolic tangent. In some examples, the nonlinearity can include a rectified linear unit, which can be expressed using the equation $y = \max(x, 0)$ where y is the output and x is an input value from the weighted vector. The transformed output can be supplied to a subsequent layer (e.g., a hidden layer 1204) of the neural network 1200. The subsequent layer of the neural network 1200 can receive the transformed output, multiply the transformed output by a matrix of numeric weights and a nonlinearity, and provide the result to yet another layer of the neural network 1200 (e.g., another, subsequent, hidden layer 1204). This process continues until the neural network 1200 outputs a final result at the outputs 1277 of the output layer 1206.

As also depicted in FIG. 12, the neural network 1200 may be implemented either through the execution of the instructions of one or more routines 1244 by central processing units (CPUs), or through the use of one or more neuromorphic devices 1250 that incorporate a set of memristors (or other similar components) that each function to implement one of the neurons 1208 in hardware. Where multiple neuromorphic devices 1250 are used, they may be interconnected in a depth-wise manner to enable implementing neural networks with greater quantities of layers, and/or in a width-wise manner to enable implementing neural networks having greater quantities of neurons 1208 per layer.

The neuromorphic device 1250 may incorporate a storage interface 1299 by which neural network configuration data 1293 that is descriptive of various parameters and hyperparameters of the neural network 1200 may be stored and/or retrieved. More specifically, the neural network configuration data 1293 may include such parameters as weighting and/or biasing values derived through the training of the neural network 1200, as has been described. Alternatively or additionally, the neural network configuration data 1293 may include such hyperparameters as the manner in which the neurons 1208 are to be interconnected (e.g., feed-forward or recurrent), the trigger function to be implemented within the neurons 1208, the quantity of layers and/or the overall quantity of the neurons 1208. The neural network configuration data 1293 may provide such information for more than one neuromorphic device 1250 where multiple ones have been interconnected to support larger neural networks.

Other examples of the present disclosure may include any number and combination of machine-learning models having any number and combination of characteristics. The machine-learning model(s) can be trained in a supervised, semi-supervised, or unsupervised manner, or any combination of these. The machine-learning model(s) can be implemented using a single computing device or multiple computing devices, such as the communications grid computing system 400 discussed above.

Implementing some examples of the present disclosure at least in part by using machine-learning models can reduce the total number of processing iterations, time, memory, electrical power, or any combination of these consumed by a computing device when analyzing data. For example, a neural network may more readily identify patterns in data than other approaches. This may enable the neural network and/or a transformer model to analyze the data using fewer processing cycles and less memory than other approaches, while obtaining a similar or greater level of accuracy.

Some machine-learning approaches may be more efficiently and speedily executed and processed with machine-learning specific processors (e.g., not a generic CPU). Such processors may also provide an energy savings when compared to generic CPUs. For example, some of these processors can include a graphical processing unit (GPU), an application-specific integrated circuit (ASIC), a field-programmable gate array (FPGA), an artificial intelligence (AI) accelerator, a neural computing core, a neural computing engine, a neural processing unit, a purpose-built chip architecture for deep learning, and/or some other machine-learning specific processor that implements a machine learning approach or one or more neural networks using semiconductor (e.g., silicon (Si), gallium arsenide (GaAs)) devices. These processors may also be employed in heterogeneous computing architectures with a number of and/or a variety of different types of cores, engines, nodes, and/or layers to achieve various energy efficiencies, processing speed improvements, data communication speed improvements, and/or data efficiency targets and improvements throughout various parts of the system when compared to a homogeneous computing architecture that employs CPUs for general purpose computing.

Figure 13:
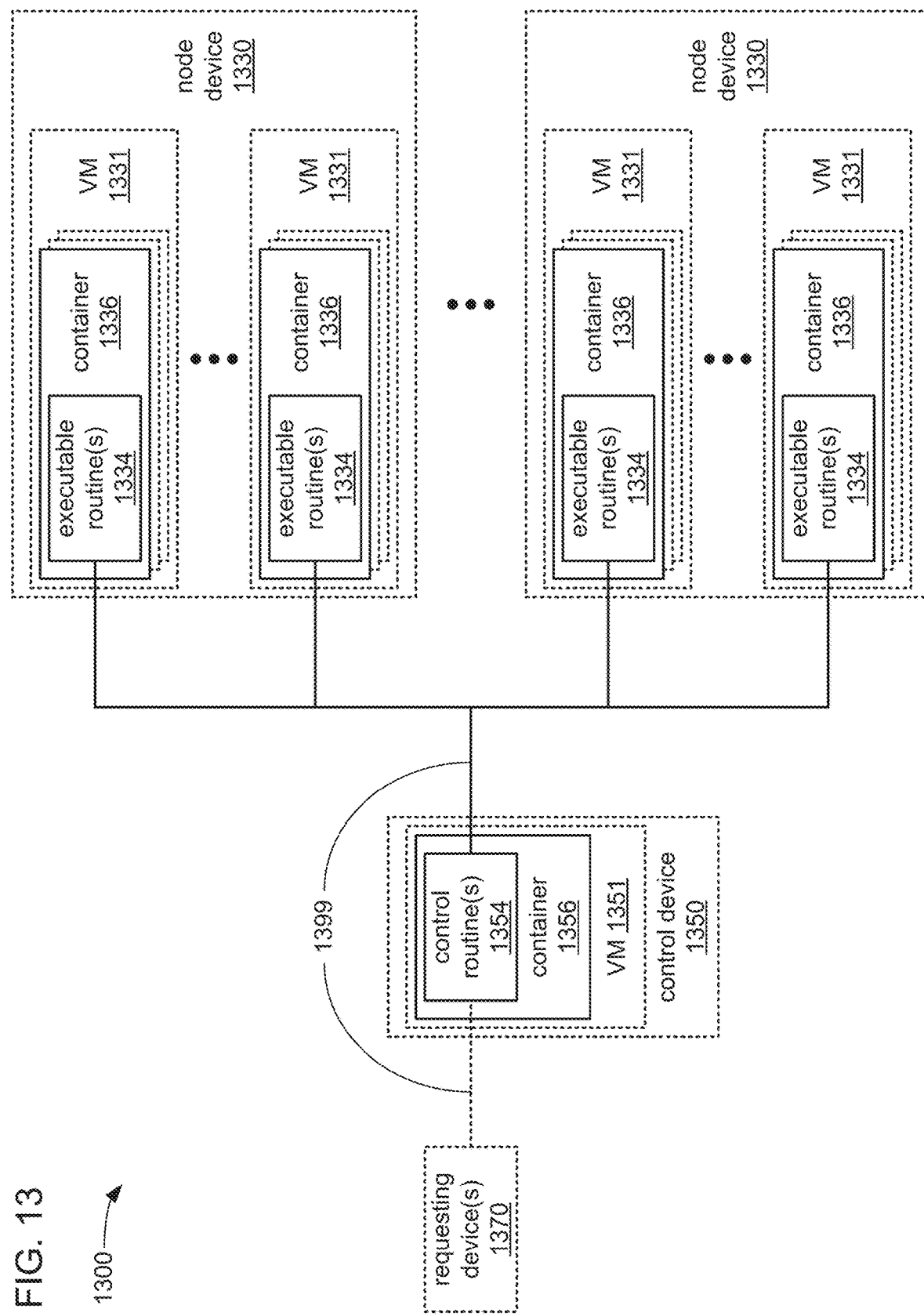
FIG. 13 illustrates various aspects of the use of containers as a mechanism to allocate processing, storage and/or other resources of a processing system to the performance of various analyses, according to embodiments of the present technology.

FIG. 13 illustrates various aspects of the use of containers 1336 as a mechanism to allocate processing, storage and/or other resources of a processing system 1300 to the performance of various analyses. More specifically, in a processing system 1300 that includes one or more node devices 1330 (e.g., the aforedescribed grid system 400), the processing, storage and/or other resources of each node device 1330 may be allocated through the instantiation and/or maintenance of multiple containers 1336 within the node devices 1330 to support the performance(s) of one or more analyses. As each container 1336 is instantiated, predetermined amounts of processing, storage and/or other resources may be allocated thereto as part of creating an execution environment therein in which one or more executable routines 1334 may be executed to cause the performance of part or all of each analysis that is requested to be performed.

It may be that at least a subset of the containers 1336 are each allocated a similar combination and amounts of resources so that each is of a similar configuration with a similar range of capabilities, and therefore, are interchangeable. This may be done in embodiments in which it is desired to have at least such a subset of the containers 1336 already instantiated prior to the receipt of requests to perform analyses, and thus, prior to the specific resource requirements of each of those analyses being known.

Alternatively, or additionally, it may be that at least a subset of the containers 1336 are not instantiated until after the processing system 1300 receives requests to perform analyses where each request may include indications of the resources required for one of those analyses. Such information concerning resource requirements may then be used to guide the selection of resources and/or the amount of each resource allocated to each such container 1336. As a result, it may be that one or more of the containers 1336 are caused to have somewhat specialized configurations such that there may be differing types of containers to support the performance of different analyses and/or different portions of analyses.

It may be that the entirety of the logic of a requested analysis is implemented within a single executable routine 1334. In such embodiments, it may be that the entirety of that analysis is performed within a single container 1336 as that single executable routine 1334 is executed therein. However, it may be that such a single executable routine 1334, when executed, is at least intended to cause the instantiation of multiple instances of itself that are intended to be executed at least partially in parallel. This may result in the execution of multiple instances of such an executable routine 1334 within a single container 1336 and/or across multiple containers 1336.

Alternatively, or additionally, it may be that the logic of a requested analysis is implemented with multiple differing executable routines 1334. In such embodiments, it may be that at least a subset of such differing executable routines 1334 are executed within a single container 1336. However, it may be that the execution of at least a subset of such differing executable routines 1334 is distributed across multiple containers 1336.

Where an executable routine 1334 of an analysis is under development, and/or is under scrutiny to confirm its functionality, it may be that the container 1336 within which that executable routine 1334 is to be executed is additionally configured assist in limiting and/or monitoring aspects of the functionality of that executable routine 1334. More specifically, the execution environment provided by such a container 1336 may be configured to enforce limitations on accesses that are allowed to be made to memory and/or I/O addresses to control what storage locations and/or I/O devices may be accessible to that executable routine 1334. Such limitations may be derived based on comments within the programming code of the executable routine 1334 and/or other information that describes what functionality the executable routine 1334 is expected to have, including what memory and/or I/O accesses are expected to be made when the executable routine 1334 is executed. Then, when the executable routine 1334 is executed within such a container 1336, the accesses that are attempted to be made by the executable routine 1334 may be monitored to identify any behavior that deviates from what is expected.

Where the possibility exists that different executable routines 1334 may be written in different programming languages, it may be that different subsets of containers 1336 are configured to support different programming languages. In such embodiments, it may be that each executable routine 1334 is analyzed to identify what programming language it is written in, and then what container 1336 is assigned to support the execution of that executable routine 1334 may be at least partially based on the identified programming language. Where the possibility exists that a single requested analysis may be based on the execution of multiple executable routines 1334 that may each be written in a different programming language, it may be that at least a subset of the containers 1336 are configured to support the performance of various data structure and/or data format conversion operations to enable a data object output by one executable routine 1334 written in one programming language to be accepted as an input to another executable routine 1334 written in another programming language.

As depicted, at least a subset of the containers 1336 may be instantiated within one or more VMs 1331 that may be instantiated within one or more node devices 1330. Thus, in some embodiments, it may be that the processing, storage and/or other resources of at least one node device 1330 may be partially allocated through the instantiation of one or more VMs 1331, and then in turn, may be further allocated within at least one VM 1331 through the instantiation of one or more containers 1336.

In some embodiments, it may be that such a nested allocation of resources may be carried out to affect an allocation of resources based on two differing criteria. By way of example, it may be that the instantiation of VMs 1331 is used to allocate the resources of a node device 1330 to multiple users or groups of users in accordance with any of a variety of service agreements by which amounts of processing, storage and/or other resources are paid for each such user or group of users. Then, within each VM 1331 or set of VMs 1331 that is allocated to a particular user or group of users, containers 1336 may be allocated to distribute the resources allocated to each VM 1331 among various analyses that are requested to be performed by that particular user or group of users.

As depicted, where the processing system 1300 includes more than one node device 1330, the processing system 1300 may also include at least one control device 1350 within which one or more control routines 1354 may be executed to control various aspects of the use of the node device(s) 1330 to perform requested analyses. By way of example, it may be that at least one control routine 1354 implements logic to control the allocation of the processing, storage and/or other resources of each node device 1300 to each VM 1331 and/or container 1336 that is instantiated therein. Thus, it may be the control device(s) 1350 that affects a nested allocation of resources, such as the aforementioned example allocation of resources based on two differing criteria.

As also depicted, the processing system 1300 may also include one or more distinct requesting devices 1370 from which requests to perform analyses may be received by the control device(s) 1350. Thus, and by way of example, it may be that at least one control routine 1354 implements logic to monitor for the receipt of requests from authorized users and/or groups of users for various analyses to be performed using the processing, storage and/or other resources of the node device(s) 1330 of the processing system 1300. The control device(s) 1350 may receive indications of the availability of resources, the status of the performances of analyses that are already underway, and/or still other status information from the node device(s) 1330 in response to polling, at a recurring interval of time, and/or in response to the occurrence of various preselected events. More specifically, the control device(s) 1350 may receive indications of status for each container 1336, each VM 1331 and/or each node device 1330. At least one control routine 1354 may implement logic that may use such information to select container(s) 1336, VM(s) 1331 and/or node device(s) 1330 that are to be used in the execution of the executable routine(s) 1334 associated with each requested analysis.

As further depicted, in some embodiments, the one or more control routines 1354 may be executed within one or more containers 1356 and/or within one or more VMs 1351 that may be instantiated within the one or more control devices 1350. It may be that multiple instances of one or more varieties of control routine 1354 may be executed within separate containers 1356, within separate VMs 1351 and/or within separate control devices 1350 to better enable parallelized control over parallel performances of requested analyses, to provide improved redundancy against failures for such control functions, and/or to separate differing ones of the control routines 1354 that perform different functions.

By way of example, it may be that multiple instances of a first variety of control routine 1354 that communicate with the requesting device(s) 1370 are executed in a first set of containers 1356 instantiated within a first VM 1351, while multiple instances of a second variety of control routine 1354 that control the allocation of resources of the node device(s) 1330 are executed in a second set of containers 1356 instantiated within a second VM 1351. It may be that the control of the allocation of resources for performing requested analyses may include deriving an order of performance of portions of each requested analysis based on such factors as data dependencies there among, as well as allocating the use of containers 1336 in a manner that effectuates such a derived order of performance.

Where multiple instances of control routine 1354 are used to control the allocation of resources for performing requested analyses, such as the assignment of individual ones of the containers 1336 to be used in executing executable routines 1334 of each of multiple requested analyses, it may be that each requested analysis is assigned to be controlled by just one of the instances of control routine 1354. This may be done as part of treating each requested analysis as one or more "ACID transactions" that each have the four properties of atomicity, consistency, isolation, and durability such that a single instance of control routine 1354 is given full control over the entirety of each such transaction to better ensure that either all of each such transaction is either entirely performed or is entirely not performed. As will be familiar to those skilled in the art, allowing partial performances to occur may cause cache incoherencies and/or data corruption issues.

As additionally depicted, the control device(s) 1350 may communicate with the requesting device(s) 1370 and with the node device(s) 1330 through portions of a network 1399 extending there among. Again, such a network as the depicted network 1399 may be based on any of a variety of wired and/or wireless technologies and may employ any of a variety of protocols by which commands, status, data and/or still other varieties of information may be exchanged. It may be that one or more instances of a control routine 1354 cause the instantiation and maintenance of a web portal or other variety of portal that is based on any of a variety of communication protocols, etc. (e.g., a restful API). Through such a portal, requests for the performance of various analyses may be received from requesting device(s) 1370, and/or the results of such requested analyses may be provided thereto. Alternatively, or additionally, it may be that one or more instances of a control routine 1354 cause the instantiation of and maintenance of a message passing interface and/or message queues. Through such an interface and/or queues, individual containers 1336 may each be assigned to execute at least one executable routine 1334 associated with a requested analysis to cause the performance of at least a portion of that analysis.

Although not specifically depicted, it may be that at least one control routine 1354 may include logic to implement a form of management of the containers 1336 based on the Kubernetes container management platform promulgated by Could Native Computing Foundation of San Francisco, CA, USA. In such embodiments, containers 1336 in which executable routines 1334 of requested analyses may be instantiated within "pods" (not specifically shown) in which other containers may also be instantiated for the execution of other supporting routines. Such supporting routines may cooperate with control routine(s) 1354 to implement a communications protocol with the control device(s) 1350 via the network 1399 (e.g., a message passing interface, one or more message queues, etc.). Alternatively, or additionally, such supporting routines may serve to provide access to one or more storage repositories (not specifically shown) in which at least data objects may be stored for use in performing the requested analyses.

One or more embodiments herein provide for execution of a data program inside data systems so that data need not be exchanged between systems. Data movement can be processing-intensive, inefficient, and risky if it leads to data corruption. Architecture described in one or more embodiments provides for deployment, to a data system, of a data program from an external system. In this way the data program need not be specially written for the data system and need not remain in storage of the data system. This approach can allow for ad hoc extension of the capabilities of the data system without having to make program-specific changes to the data system or data-system-specific changes to a data program.

Computer modeling can be a useful tool for providing a prediction based on known inputs. For example, computer models can be used to predict future weather outcomes given specified temperatures, wind information, air pollution, and other geographic or meteorological data. However, a user may not know what inputs to give. For example, the inputs may be subject to change over time based on changing circumstances or policy decisions that could affect the environment (e.g., policy decisions that can change the global temperature, air pollution, or geographic landscape). Alternatively, or additionally the user may dislike the prediction according to given inputs (e.g., the weather outcome can predict increased rain for a geographic area over previous years). The user does not know which inputs would improve that prediction (e.g., air quality changes or landscape changes). One or more embodiments provide computer generated recommendations for derived inputs, or information based on those derived inputs, allowing user control over a prediction according to a computer model. Embodiments are agnostic to the system modeled, so example systems will be specified from various fields, and should not be construed as limiting particular embodiments.

Figure 14:
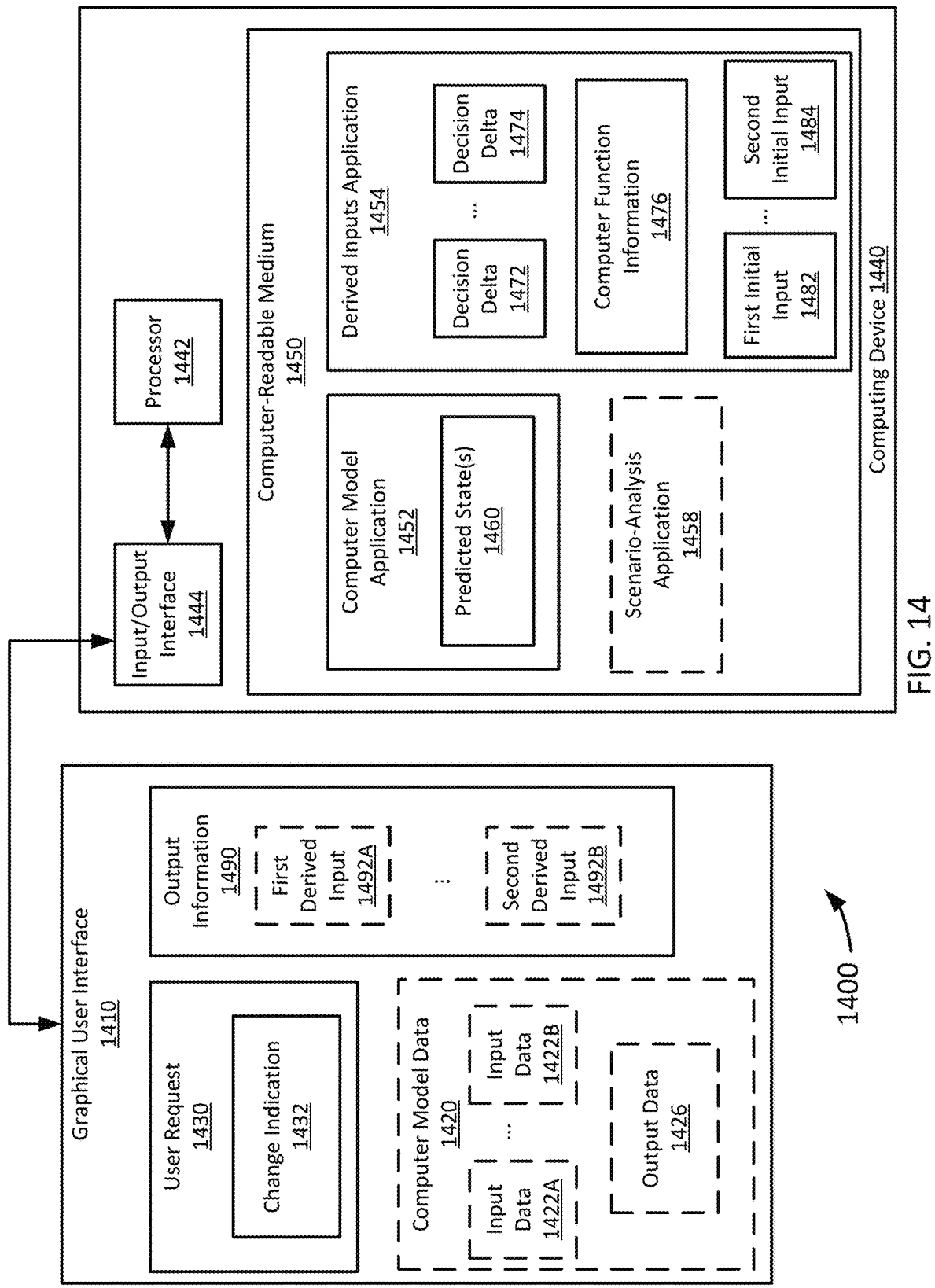
FIG. 14 illustrates a block diagram of a system for outputting derived inputs that will affect a user-requested change in an initial predicted state according to at least one embodiment of the present technology.

FIG. 14 illustrates a block diagram of a system 1400 for outputting derived inputs that will affect a user-requested change in an initial predicted state (e.g., a computer-generated prediction according to a computer model). System 1400 is a computing system that includes a computing device 1440. In one or more embodiments, the system 1400 includes a graphical user interface 1410 for receiving user information (e.g., user request 1430) and displaying information received from computing device 1440 (e.g., output information 1490).

In one or more embodiments, the computing device 1440 includes one or more input and/or output interface(s) 1444 for receiving input and/or sending output. For instance, an input interface can in some embodiments be used to receive computer model data 1420 for generating a computer model by the computing device 1440. An output interface can be used to display a computer model or information pertaining to a computer model at the graphical user interface 1410 (e.g., a generated or retrieved computer model).

In one or more embodiments, the computer model data 1420 can include input data 1422 with one or more different input types (e.g., input data 1422A and 1422B). Alternatively, or additionally, computer model data 1420 can include output data 1426 (e.g., for determining a model that can predict the output data 1426 given the input data 1422).

An input interface can in some embodiments be used to receive a computer model (e.g., receive a selection of a computer model or data from an external system not shown). Alternatively, or additionally input and/or output interface(s) 1444 can be used to identify computer model data or a generated computer model that is already available at the computing device 1440 (e.g., stored in computer-readable medium 1450). Alternatively, or additionally input and/or output interface(s) 1444 can be used to retrieve computer model data or a generated computer model (e.g., to be stored in computer-readable medium 1450). For example, there can be retrieved data values recorded from a real-world environment for use in generating a computer model. For instance, if the real-world environment pertained to a geographic area, recorded data could include information recorded about the geographic area such as the number of people in poverty or the amount of low-income housing. Alternatively, or additionally, there can be sensors (not shown) in a studied system, and real-time data can be collected by computing device 1440 from these sensors for generating or updating a computer model. For instance, if the studied system was a government facility like a hospital or a prison, sensors can collect information from the facilities computing systems like admission statuses or biometric data of the admitted.

Regardless of how the computing device 1440 obtains a computer model, in one or more embodiments an obtained computer model can be used to predict a predicted output for a studied system. For instance, if the studied system pertains to studying factors leading to a virus outbreak in an environment, the predicted state can be related to the spread of that virus, or deaths caused by that virus. The computing device 1440 can itself generate the predicted output or it can obtain it from another device (e.g. via input and/or output interface(s) 1444). In one or more embodiments, the graphical user interface 1410 can be used to display predictions made from a computer model.

In one or more embodiments, the graphical user interface 1410 can receive a user request 1430 comprising a change indication 1432 pertaining to a prediction for the computer model for a system. The system could be a studied system used to generate the computer model or could be an applied system which is a system in which the computer model is applied. The user request can indicate a request for a different prediction from the computer model (e.g., for the studied or an applied system). The applied system could be the same system as the studied system. For example, the studied system could pertain to a state and the applied system could pertain to the same state. The applied system could be a simulation of a real-world environment. For instance, it could be a digital twin representing a simulation for the studied system. The applied system and studied system could be different systems. For instance, the studied system could be pertaining to one geographic state, or a simulation of that state, and the applied system could pertain to another state or simulation of that other state.

Regardless of the type of system, the change indication 1432 can be for a derived set of inputs that will generate for a system (e.g., an applied or studied system), a user-requested change in a predicted state (e.g., according to a computer model). For example, the graphical user interface 1410 could display a value representation for a predicted number of hospitalizations or number of deaths in a region, and the user request 1430 could indicate a user-requested objective to decrease the value representation by a user-requested amount (e.g., by a percentage or a number). As another example, the graphical user interface 1410 could display a value representation for a predicted number of rehabilitation releases in a region, and the user request 1430 could indicate a user-requested objective to increase the value representation by a user-requested amount.

In one or more embodiments, the input/output interface(s) can be used to output information 1490. The output information 1490 can be one or more derived inputs that, according to the computer model, will affect the user-requested change in the initial predicted state (e.g., first derived input 1492A and second derived input 1492B). Alternatively, or additionally, the output information 1490 can be based on one or more derived inputs. For example, the derived inputs can include one or more different data values for data types in the computer model. For instance, if number of prescriptions for a drug was a factor for predicting deaths from that drug, the derived input can be a lower amount of drug prescriptions to affect a lower predicted death rate. The derived information can be the amount of drug prescriptions itself or a recommendation based on that derived input like a recommendation for an increase in drug-overdose awareness campaigns. As another example, if the number of flies in an area and the amount of a water pollutant was a predictor for a number of frogs in the area, the derived inputs can indicate a lower amount of the water pollutant and a greater number of flies. The graphical user interface 1410 can display one or more of these derived inputs or could display a recommendation for achieving those changes (e.g., how many fly larvae or water pollutant clean-up agent to release). In one or more embodiments, the computing system can output a computer-generated recommendation that generates an updated prediction state that meets or exceeds the user-requested objective.

The computing device 1440 has a computer-readable medium 1450 and a processor 1442. Computer-readable medium 1450 is an electronic holding place or storage for information so the information can be accessed by processor 1442. Computer-readable medium 1450 can include, but is not limited to, any type of random access memory (RAM), any type of read only memory (ROM), any type of flash memory, etc. such as magnetic storage devices (e.g., hard disk, floppy disk, magnetic strips), optical disks (e.g., compact disc (CD), digital versatile disc (DVD)), smart cards, flash memory devices, etc.

Processor 1442 executes instructions (e.g., stored at the computer-readable medium 1450). The instructions can be carried out by a special purpose computer, logic circuits, or hardware circuits. In one or more embodiments, processor 1442 is implemented in hardware and/or firmware. Processor 1442 executes an instruction, meaning it performs or controls the operations called for by that instruction. The term "execution" is the process of running an application or the carrying out of the operation called for by an instruction. The instructions can be written using one or more programming language, scripting language, assembly language, etc. Processor 1442 in one or more embodiments can retrieve a set of instructions from a permanent memory device and copy the instructions in an executable form to a temporary memory device that is generally some form of RAM, for example. Processor 1442 operably couples with components of computing device 1440 (e.g., input and/or output interface 1444 and with computer-readable medium 1450) to receive, to send, and to process information.

In one or more embodiments, computer-readable medium 1450 stores instructions for execution by processor 1442. In one or more embodiments, one or more applications stored on computer-readable medium 1450 are implemented in software (e.g., computer-readable and/or computer-executable instructions) stored in computer-readable medium 1450 and accessible by processor 1442 for execution of the instructions.

In one or more embodiments, the computer-readable medium 1450 comprises instructions for generating the output information 1490. For example, the computer-readable medium 1450 can include a computer model application 1452 for obtaining or generating a computer model and one or more predicted states 1460 according to a computer model. In one or more embodiments, the computer-readable medium comprises a derived inputs application 1454 for deriving inputs according to embodiments herein. In one or more embodiments, the derived inputs application can be used to generate a set of decision deltas for the computer model. Each decision delta corresponds to each data type or factor in the computer model. A decision delta can indicate an extent of allowable change in an input. For instance, if the input was related to a factor pertaining to a percentage of a population with health insurance, a decision delta can represent a minimum percentage pertaining to physical constraints in the environment such as an amount of free health insurance provided to government employees. The decision delta can also be based on user preferences like allowing more change in factors the users prefer the computing device 1440 to change to achieve a prediction according to a computer model. In one or more embodiments, the derived inputs application 1454 can obtain computer function information 1476 indicating a computer function for the set of decision deltas. For instance, the derived inputs application 1454 can generate or apply a computer function that takes as inputs one or more values from the set of decision deltas. In one or more embodiments, the derived inputs application 1454 can determine allowable function inputs to the computer function. For instance, the allowable function inputs can be derived based on the set of decision deltas, a user-requested change in a predicted state, and the computer model. For example, allowable function inputs could be decision delta values that would achieve the user-requested change according to the computer model. Depending on the computer function, the computer function information 1476 could include computations, using one or more of the allowable function inputs, of at least one minimum or maximum value for the computer function. For example, computations could include computing a minimum of a sum of squared deltas.

Based on the derived inputs application 1454 (e.g., based on the at least one minimum or maximum value for the computer function) the computing device 1440 can send output information 1490 to the graphical user interface 1410 (e.g., one or more derived inputs 1492). The system 1400 is configured to exchange information between devices in the system (e.g., via wired and/or wireless transmission). For example, a network (not shown) can connect one or more devices of system 1400 to one or more other devices of system 1400. Alternatively, or additionally, the system is integrated into one device (e.g., entering information and display information at graphical user interface 1410), or computing device 1440 is itself considered a computing system.

In one or more embodiments, fewer, different, and additional components can be incorporated into computing device 1440. For instance, in one or more embodiments, there can be other systems or devices not shown for generating a computer model. As another example there can be fewer or more applications (e.g., computer model application 1452 and derived inputs application 1454 can be the same application). As another example, the computer-readable medium 1450 can comprise a scenario-analysis application 1458 for the user to explore user-defined inputs as opposed to derived inputs according to derived inputs application 1454. The one or more application can be integrated with other analytic tools. Merely for illustration, one or more applications are implemented using or integrated with one or more software tools such as JMP®, Base SAS, SAS® Enterprise Miner™, SAS/STAT®, SAS® High Performance Analytics Server, SAS® Visual Data Mining and Machine Learning, SAS® LASR™ SAS® In-Database Products, SAS® Scalable Performance Data Engine, SAS® Cloud Analytic Services, SAS/OR®, SAS/ETS®, SAS® Inventory Optimization, SAS® Inventory Optimization Workbench, SAS® Visual Analytics, SAS® Viya™, SAS In-Memory Statistics for Hadoop®, SAS® Forecast Server, and SAS/IML® all of which are developed and provided by SAS Institute Inc., or JMP Statistical Discovery LLC, of Cary, N.C., USA.

As another example, the input and/or output interface 1444 can support one or more input interfaces and output interfaces. For example, a touch screen provides a mechanism for user input and for presentation of output to the user. Alternatively, or additionally the input and/or output interface 1444 has more than one input interface that uses the same or different interface technology. Alternatively, or additionally, the input and/or output interface 1444 has more than one output interface that uses the same or different interface technology.

Figure 15:
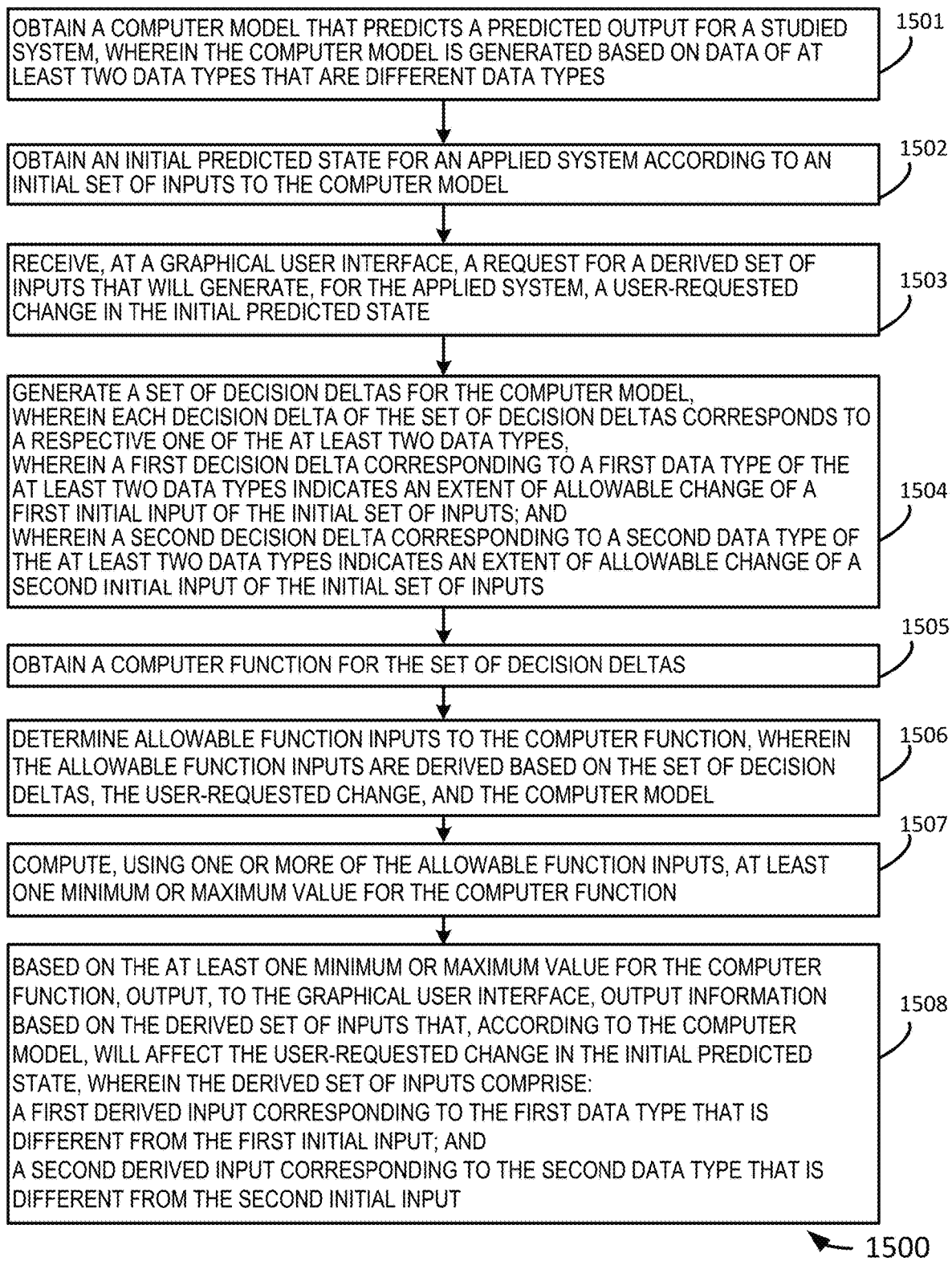
FIG. 15 illustrates a flow diagram for outputting derived inputs that will affect a user-requested change in an initial predicted state according to at least one embodiment of the present technology.

In one or more embodiments, the system 1400 implements a method as described herein (e.g., a method 1500 shown in FIG. 15). FIG. 15 illustrates a method 1500 for outputting derived inputs that will affect a user-requested change in an initial predicted state. For example, the method 1500 can be implemented by a computing device (e.g., computing device 1440) or a computing system (e.g., system 1400).

The method 1500 comprises an operation 1501 that includes obtaining a computer model that predicts a predicted output for a studied system. The computer model is generated based on data of at least two data types that are different data types. There could be many more types of data. The studied system is studied in order to generate a computer model. For instance, if the studied system is a real-world environment, environmental factors could be tracked for their ability to predict an output in the real-world environment. If the studied system is a mechanical or electrical system, components or inputs into the mechanical or electrical system could be observed for their ability to predict an output or state for the mechanical or electrical system.

The method 1500 comprises an operation 1502 that includes obtaining an initial predicted state for an applied system according to an initial set of inputs to the computer model. The applied system is so-called because a computer model is applied for making a prediction concerning the applied system. The applied system could be the same or different from the studied system. The initial set of inputs could be supplied by the user such as the user inputting a current state or intended state for the applied system. Alternatively, or additionally, the initial set of inputs could come from sensors, computing devices, or computing systems.

The method 1500 comprises an operation 1503 that includes receiving, at a graphical user interface, a request for a derived set of inputs that will generate, for the applied system, a user-requested change in the initial predicted state. For instance, the graphical user interface may display a prediction that the user wants to change, but the user does not know what inputs would affect that change ideally and needs the computer to generate a set of inputs.

The method 1500 comprises an operation 1504 that includes generating a set of decision deltas for the computer model. Each decision delta of the set of decision deltas corresponds to a respective one of the at least two data types. A first decision delta corresponding to a first data type of the at least two data types indicates an extent of allowable change of a first initial input of the initial set of inputs. An extent of allowable change could indicate a range of change for the first initial input within the computer model. This can allow user control over the derived inputs. For instance, if the input related to amount of low-income housing in a geographic area, the extent of allowable change could include an upper bound for the low-income housing and/or a lower bound for the low-income housing. A second decision delta corresponding to a second data type of the at least two data types indicates an extent of allowable change of a second initial input of the initial set of inputs. A first and second decision delta are given merely as examples. More decision deltas could be present, e.g., one for each intended derived input to ensure derived inputs are within respective extents of allowable change.

The method 1500 comprises an operation 1505 that includes obtaining a computer function for the set of decision deltas. The computer function can allow a computing system to find optimal inputs when multiple input options may achieve the user objective. Example computer functions are provided herein.

The method 1500 comprises an operation 1506 that includes determining allowable function inputs to the computer function. The allowable function inputs are derived based on the set of decision deltas, the user-requested change, and the computer model. For example, allowable function inputs could be aspects of decision deltas that would achieve the user-requested change according to the computer model.

The method 1500 comprises an operation 1507 that includes computing, using one or more of the allowable function inputs, at least one minimum or maximum value for the computer function. Depending on the optimizing computer function used, there may be multiple local minimums or maximums.

The method 1500 comprises an operation 1508 that includes, based on the at least one minimum or maximum value for the computer function, outputting, to the graphical user interface, output information based on derived inputs. The derived inputs are inputs that, according to the computer model, will affect the user-requested change in the initial predicted state. The computing system can present changes in multiple different inputs to achieve the user-requested change. For instance, the derived inputs include a first derived input corresponding to the first data type that is different from the first initial input. The derived inputs include a second derived input corresponding to the second data type that is different from the second initial input. In some embodiments more than two are changed and in some only one. Embodiments can be useful for modeling and analyzing complex dynamic systems and can provide valuable insights into fields such as engineering, economics, and finance by providing computer-generated recommendations for these complex dynamic systems.

FIGS. 16A-16D illustrate data for obtaining a computer model. This example relates to data for predicting a health status of members of a studied system or an environmental status (e.g., human death rates) merely as an example. Substance use is a complex and dynamic issue with various interconnected factors, so it provides a good example system. Embodiments herein have general applicability for a broad range of models that occur in financial services, environmental studies, health care, supply chain, to name a few.

One of ordinary skill in the art will appreciate other types of input data and predictions for other systems than those used in examples. For instance, a computer model as described herein can be used to predict other health statuses such as virus cases, or work-place injuries. Medical related data could be data types for the system such as percentage of masks or wrist-guards purchased. A computer model described herein can be used to predict other environmental statuses of a system such as the amount of carbon dioxide in an atmosphere, environmental sustainability goals, and natural disaster predictions (e.g., a number of storms or volcanic eruptions on a planet). In an environmental case, ecological data can be used such as percentage of algae coverage, recorded temperatures, etc. Alternatively, the system can be a mechanical or electrical system such as an airplane or a server bank and the prediction could relate to failure or success statuses for the system and the inputs could be related to aspects of the system such as recorded temperatures in the system, or component types. For simplicity examples will be described in relation to predictions pertaining to substance abuse.

FIG. 16A shows a subset of data derived from public databases such as CDC Wonder and American Community Survey. CDC Wonder data (e.g., provisional mortality statistics from 2018) is provided from Centers for Disease Control and Prevention and available upon request at https://wonder.cdc.gov/controller/datarequest/D176. American Community Survey data (e.g., household and family data) is provided from The United States Census Bureau available at https://data.census.gov/table/ACSST1Y2021.S1101.

Table 1600 in FIG. 16A shows a sample of data collected in various years from 2018-2021 shown in year column 1602. Year column 1602 shows an example categorical data set. Location data 1604 shows another example of categorical data sets with allowable categorical data related to counties in Tennessee (e.g., Anderson and Bedford). Other location data could be used (e.g., different states or cites). Columns 1606 provide different numerical data sets for medical-related data (e.g., lack of health insurance age adjusted prevalence rate, AAP). Since the data in this example is derived from public databases, all data at all possible points may not be available. For instance, cell 1608 shows missing data. In other examples all data can be available (e.g., a recorded experiment). Further, for brevity, data from all counties and time periods used in modeling are not shown in FIG. 16A. FIG. 16B shows table 1620 of additional data collected in various years from 2018 for the state of Tennessee. Medical-related data columns 1622 relates to crude prevalence rate, CPR. In one or more embodiments, the user can select the types of inputs included in the model (e.g., importing particular datasets or including or excluding columns of imported data).

FIG. 16C illustrates a data set 1640 selected by a user to represent outcome data for deriving a computer model. In this example, overdose deaths column 1646 shows overdose deaths. Year column 1642 provides years from 2017 to 2022 and county column 1644 shows counties in Tennessee for correlating the data with the inputs.

Figure 16D:
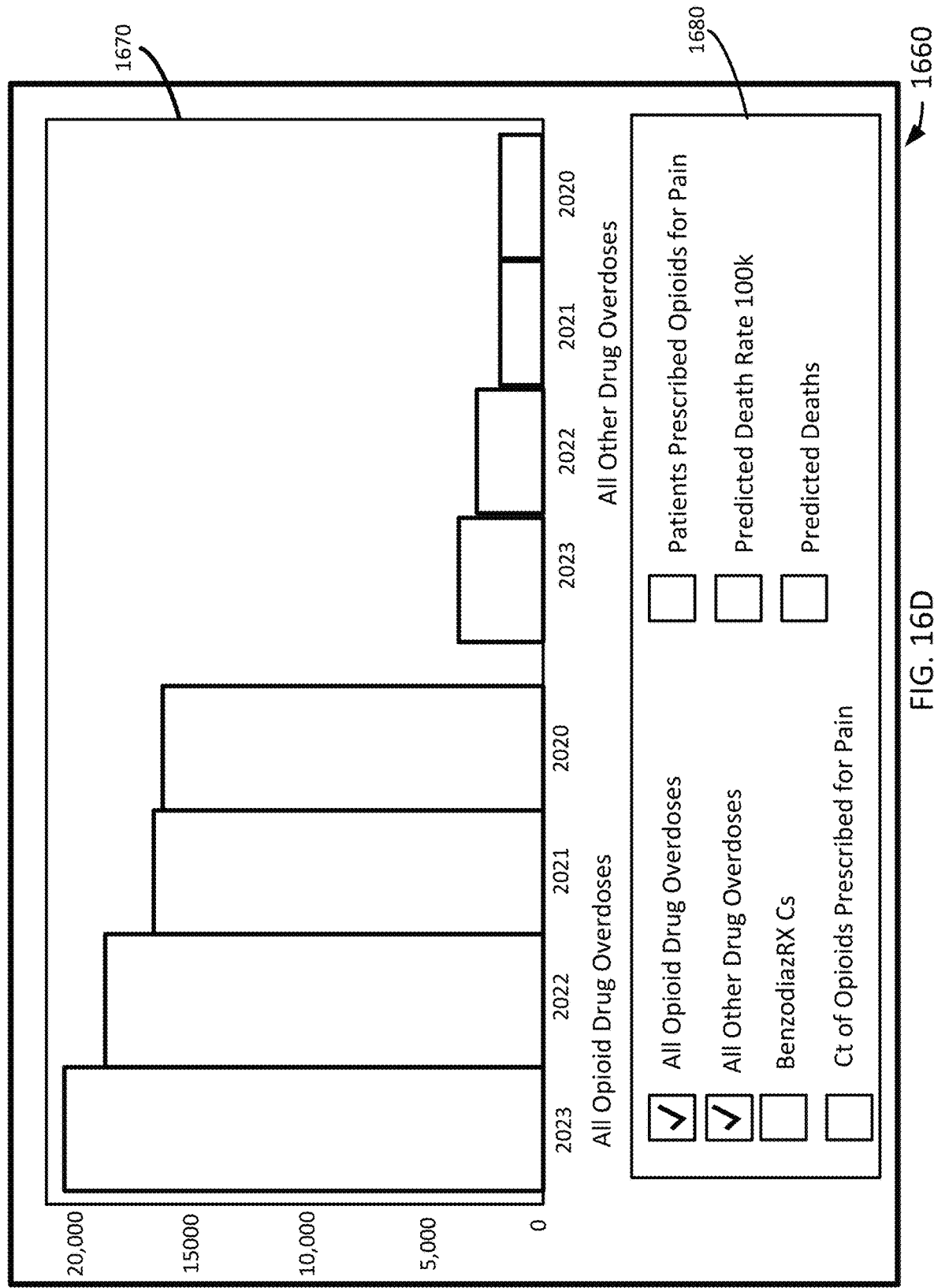

The user could select additional or alternative types of outcome data. FIG. 16D shows a graphical user interface 1660 for selecting one or more output options 1680. In this example, the user has selected all opioid drug overdoses and all other drug overdoses. Different or additional output data could be selected. Visualization tools such as graph 1670 can be used to display aggregate data to the user for making selections. A computing system according to embodiments herein can generate a model to predict selected outputs based on selected inputs. For instance, a linear regression model can be used. Other modeling techniques could be used such as gradient boosting and neural network. One of ordinary skill in the art will appreciate other types of models.

FIGS. 17A-17D illustrate a graphical user interface for displaying information pertaining to a generated computer model. This example uses a model to predict overdose opioid deaths utilizing publicly available geographical data and statistically significant attribute data related to opioid overdose deaths (e.g., data shown in FIGS. 16A-16D). The graphical user interfaces are also applicable to displaying one or more indications of model fit of a computer model pertaining to other types of data.

Figure 17A:
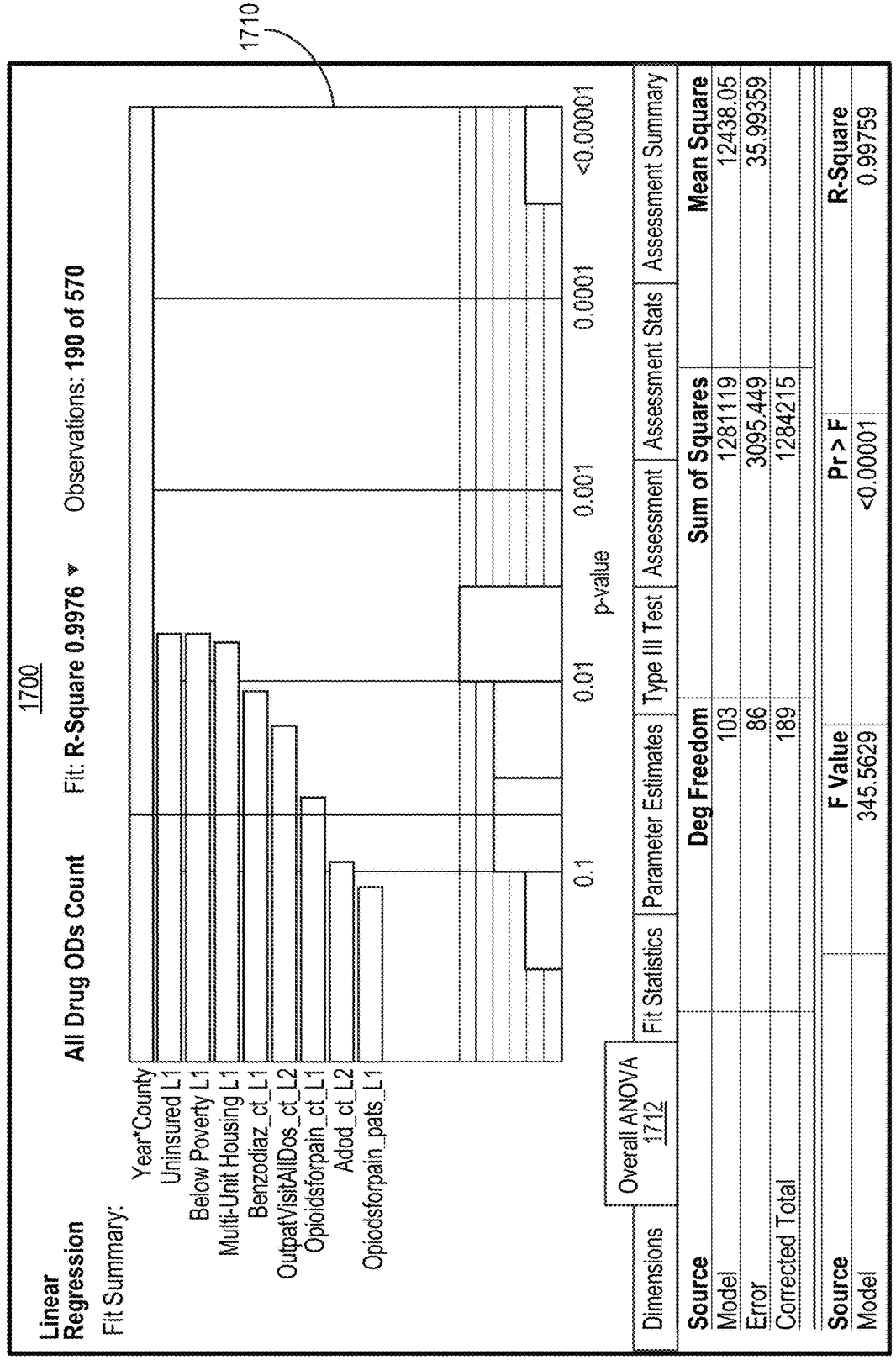

FIG. 17A shows a portion 1700 of a graphical user interface for displaying fit summary information for a linear regression model. A graphical user interface can allow for exploration of fit for individual data types (e.g., predictive value of individuals below poverty level). A fit summary graph 1710 gives example parameters in the model and their fit. Individual variables that have time dependent outcomes can have levels assigned to represent various estimate lags in the model (e.g., a L1 lag or a L2 lag), so that parameters can have different lags accounted for within the model. Fit summary graph 1710 also shows p-values which can be a measure of statistical significance. A p-value measures the probability of obtaining an observed result. Different cutoffs can be used for determining statistical significance. For instance, using a cutoff level of 0.15 for the p-value, all included inputs can be deemed significant as shown in fit summary graph 1710.

The user can explore various aspects of the model such as parameter estimates according to the model and model tests and assessments. For example, FIG. 17A shows overall ANOVA scores for evaluating the linear regression model on Overall ANOVA tab 1712. Degrees of freedom (Deg Freedom), sum of squares, mean square, F Value and Pr>F, and R-Square can be shown for a model, error and/or corrected total. For instance, an R-Square close to 1 for a model could indicate to a user a more robust model. This model has an R-square of 0.99759. Pr(>F) value can be used to determine whether the observed differences in group means and the linear inputs are statistically significant. If the Pr(>F) value is less than a chosen significance level, then a computing system can reject the null hypothesis and conclude that there are statistically significant differences between the group means. The model shows strong adequacy based on the evaluation in FIG. 17A.

Figure 17C:
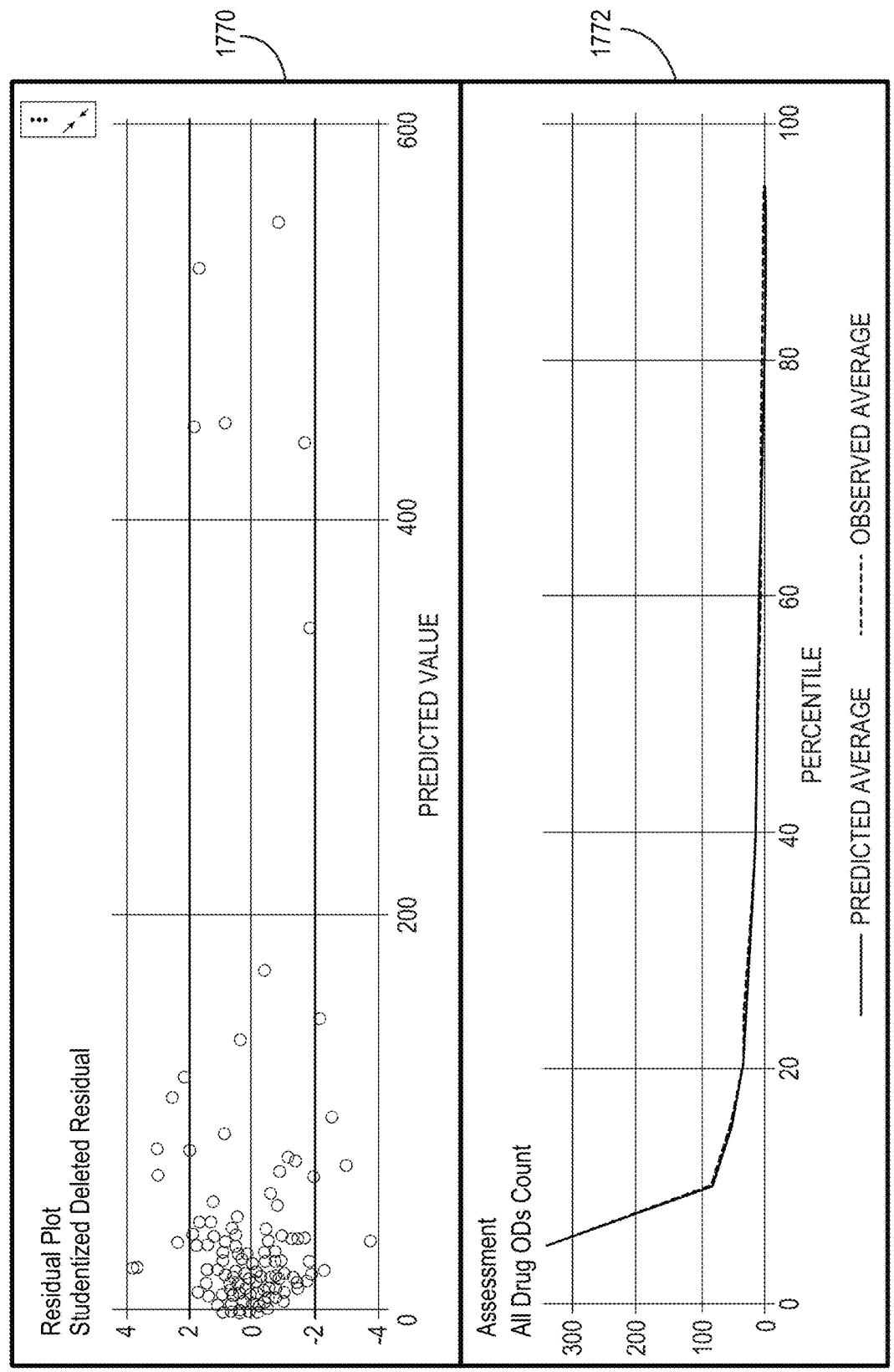

FIG. 17B shows portion 1730 of a graphical user interface for selecting Type III Testing for the model. Portion 1730 shows degrees of freedom (DF), denominator degrees of freedom (DenDF), F Value, Pr>F for individual model effects. FIG. 17C shows a residual plot 1770 showing how individual data points deviate from the model and a graphical assessment 1772 for fit for all drug overdose counts. This information and plots in accordance with FIGS. 17A-17C can be useful for providing interactive visualizations for the user to select to exclude data for updating the model or request a different modeling approach.

In one or more embodiments, different models can be generated and compared to determine the best one or more models for predicting a state. Table 1 shows an example model comparison performed for selecting a model (i.e., the selected model).

TABLE 1

|  | Selected Model | Backward Selection | Forward Selection | Stepwise Selection |
|---|---|---|---|---|
| Root Mean Square Error (RMSE) | 5.99947 | 11.27787 | 11.24134 | 11.27787 |
| Root-Square | 0.99759 | 0.98188 | 0.98209 | 0.98188 |
| Adjusted Root-Square | 0.99470 | 0.98128 | 0.98140 | 0.98128 |
| Akaike Information Criterion (AIC) | 930.22620 | 1119.54807 | 1119.27402 | 1119.54807 |
| Corrected Akaike's Information Criterion (AICC) | 1195.22620 | 1120.34365 | 1120.27402 | 1120.34365 |
| Schwarz's Bayesian Criterion (SBC), also known as the Bayesian Information Criterion (BIC) | 1075.91670 | 950.27724 | 953.25021 | 950.27724 |
| Average Squared Error (ASE) | 16.29184 | 122.50450 | 121.04702 | 122.50450 |

The average squared error (ASE) is the sum of squared errors (SSE) divided by the number of observations. Smaller values are preferred. The selected model had much smaller values than other models according to Table 1. Akaike's Information Criterion (AIC) is based on the Kullback-Leibler information measure of discrepancy between the true distribution of the response variable and the distribution specified by the model. Smaller values indicate better models, and AIC values can become negative. As shown the selected model had the lowest AIC.

The Corrected Akaike's Information Criterion (AICC) is a version of AIC that adjusts the value to account for sample size. The result is that extra effects penalize AICC more than AIC. The selected model did not perform as well for this. However, as the sample size increases, AICC and AIC converge, so a user could increase sample data or if this was a preferred criteria a computing system could select a different model.

As another example, the Schwarz's Bayesian Criterion (SBC), also known as the Bayesian Information Criterion (BIC), is an increasing function of the model's residual sum of squares and the number of effects. Unexplained variations in the response variable and the number of effects increase the value of the SBC. As a result, a lower SBC implies either fewer explanatory variables, better fit, or both. SBC penalizes free parameters more strongly than AIC. The selected model had a higher SBC than other models, which could have influenced a computing system to select a different model.

In one or more embodiments, a graphical user interface can display one or more parameters of a computer model or computer model options. For example, FIG. 17D shows a graphical user interface 1780 with an example parameters estimates tab, displaying one or more parameters of a computer model for inspection or adjustment of one or more parameters by the user via the graphical user interface 1780. For example, this model is derived based on an intercept, and 9 different data types represented by regressor column 1782. A "year" data type allows the computer model to be generated based on time series data for the different data types. Recorded output data can be dependent on a time lag from the recorded input data in the time series data. A computer model can account for multiple lags in the time series data of different lengths. For instance, some data types have an L1 representing a level 1 lag of one length and an L2 representing a lag of a different length. These variables are used merely as an example. Other examples could have hundreds or thousands of data types.

In this example, the computing system displays parameter estimates for each of these data types in a parameter estimate column 1784. The user may look at particular parameter estimates for regressors to see how they are being treated in the model. For instance, the sign (+ or −) may be different than what the user wants for a particular regressor, or a parameter estimate may be too large or too small in magnitude and the user can make adjustments in the parameter estimate column 1784. For example, the computing system can receive a user request or adjustments indicating to change multiple ones of the model parameters by adjusting the weight of the parameter in the model weight column. In one or more embodiments, changing the model parameters will update the computer model according to the user request, which in turn will update outputs based on the computer model. Alternatively, or additionally, the computing system could receive adjustments to model fit parameters for adjusting the computer model.

Figure 18:
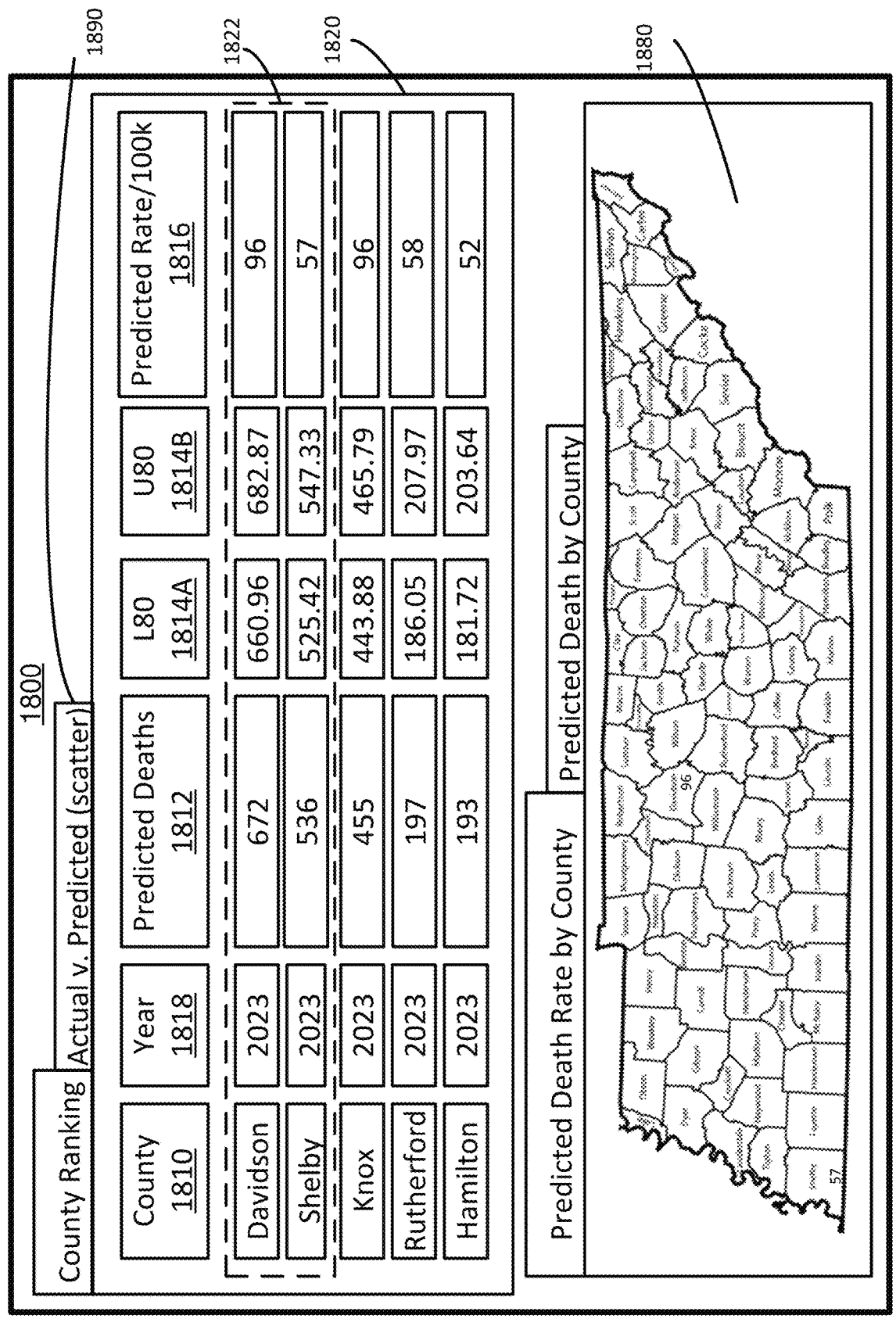
FIG. 18 illustrates a predicted state according to at least one embodiment of the present technology.

Once a model is generated or selected, a computing system or device can display prediction data according to the model for user exploration. FIG. 18 illustrates a graphical user interface 1800 displaying one or more predicted outcomes according to a computer model (e.g., predicted deaths in 2023 for counties in Tennessee). Table 1820 presents predicted outcomes according to a computer model. A county column 1810 of table 1820 shows a county ranking of counties in Tennessee based on highest outcome scores predicted for 2023. In this example, predicted outcome included predicted deaths shown in predicted deaths column 1812 and predicted rate per 100,000 people in column 1816. Prediction output can be associated with a particular point in time (e.g., based on lags in the computer model for particular inputs). Year column 1818 specifies an associated year for the predictions. Map 1880 provides for interactive visualization of the data. For instance, individual counties can be selected using the map 1880 or table 1820. In this example selection 1822 selects datapoints for Davidson and Shelby counties and displays datapoints on map 1880.

Columns 1814 of table 1820 give prediction intervals around the predicted death. For instance, column 1814A gives a lower 80 percent prediction interval and column 1814B gives an upper 80 percent prediction interval. Other prediction intervals could be used for evaluating the prediction (e.g., a 90 or 95 percent prediction interval).

In some cases, some data can be used for training the model and data can be held back for testing, or validating a model developed on training data. Data can also become available at a later point for further evaluating the model (e.g., for example as time progresses more data can be collected). For instance, actual v. predicted scatter plot option 1890 can be used for comparing the predicted values for 2023 to actual data collected in 2023. One of ordinary skill in the art will appreciate other techniques for evaluating and selecting a model than specifically described herein.

Figure 19:
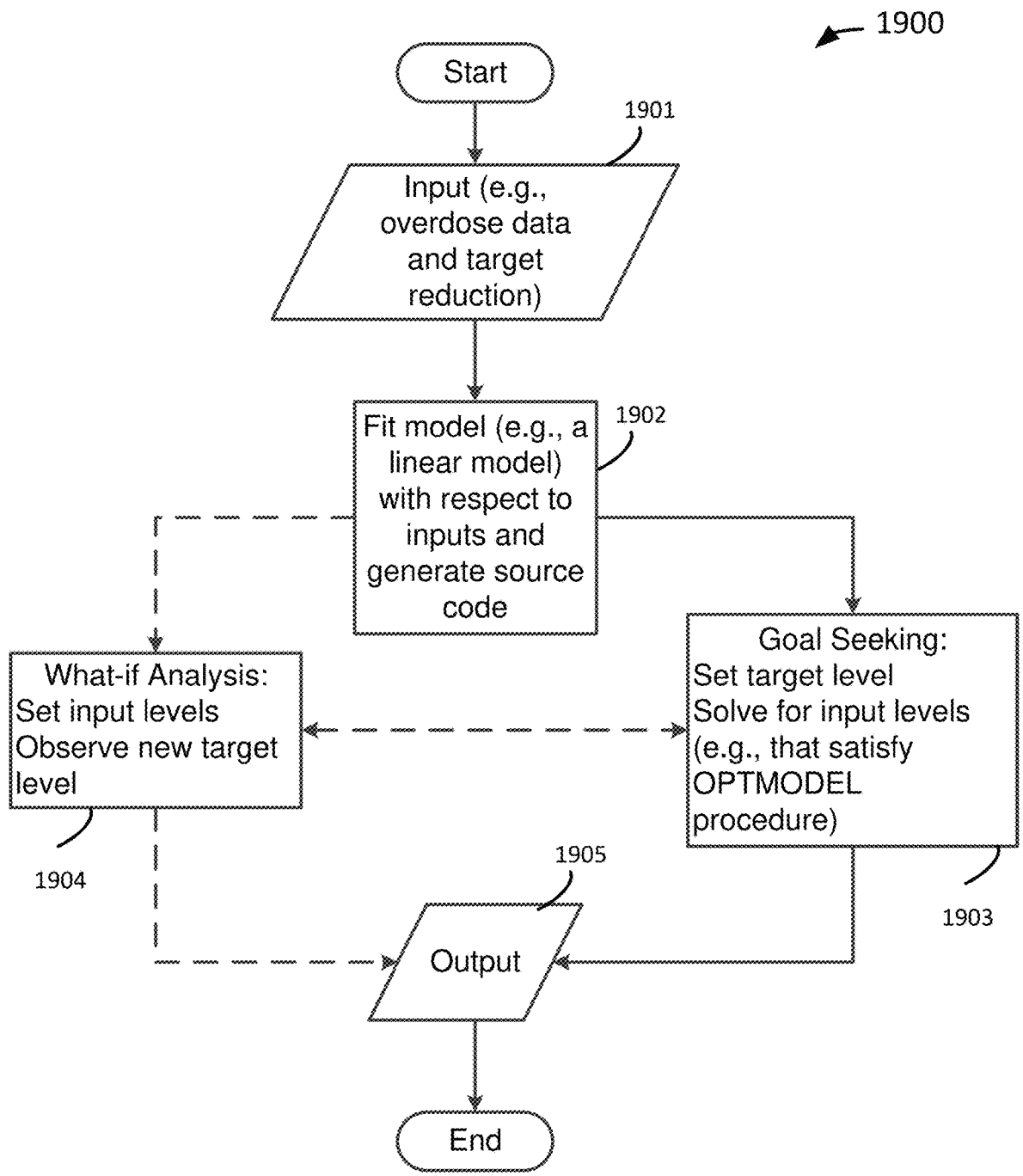
FIG. 19 illustrates a flow diagram for goal seeking and scenario analysis according to at least one embodiment of the present technology.

FIG. 19 illustrates a flow diagram 1900 for goal seeking and scenario analysis in at least one embodiment of the present technology. In an input stage 1901 data is compiled by a computing system (e.g., a system 1400). For instance, compiled data can be for developing a computer model (e.g., overdose data in examples) and for user-requested changes in prediction output (e.g., a target reduction in overdoses). A fit model phase 1902 is used to generate a model with respect to appropriate inputs and generate source code according to the model for further analysis such as what-if analysis and goal seeking.

For example, a linear regression model can be used that assumes fixed and true known values for the inputs, such as the count of opioids or benzodiazepine prescriptions. The objective for model fit is to estimate parameters (coefficients) that closely align predictions with actual outcomes by minimizing the sum of squared residuals ensuring a high degree of model accuracy.

In one or more embodiments, the flow diagram 1900 proceeds with a goal seeking phase 1903. This goal seeking phase 1903 can be referred to as dynamic simulation analytics or DSA method since it can produce dynamic updates to predictions for a simulated system. In one or more embodiments, in this phase, a computing system assumes the parameter estimates are fixed, known values and sets the target level (e.g., Opioid Overdose Deaths) to a recommended and potentially achievable level. The dynamic simulation analytics method involves searching for inputs that not only meet the new target level using the model (e.g., linear equation model) but also minimize or maximize a computer function (e.g., minimize the sum of squared deviations from the current input level to the newly derived ones). In one or more embodiments, dynamic simulation analytics employs quadratic minimization through a quadratic solver (e.g., PROC OPTMODEL) post-modeling. This approach identifies input values that satisfy an objective function while ensuring that the squared errors are minimized (e.g., identifying inputs that satisfies the objective function for a predicted year of 2023).

In some embodiments fit model phase 1902 and goal seeking phase 1903 can be referred to as a two-stage least squares method (e.g., when the function is related to a least squares regression).

The computing system can enter an output stage 1905 (e.g., for outputting or displaying predictions according to goal seeking phase 1903, or outputting or displaying information obtained at other phases such as a computer model according to fit model phase 1902).

In one or more embodiments, flow diagram 1900 optionally includes a what-if analysis phase 1904 (also referred to as scenario-analysis) for a computing system to receive user-defined inputs for providing a predicted output. A what-if analysis differs from goal seeking in that a what-if analysis allows a user to input suggested inputs for exploring a computer model's predictions whereas goal seeking provides computer-generated inputs based on a user's supplied goal for outputs. The what-if analysis phase 1904 can proceed after a model is developed in fit model phase 1902 and after a goal seeking phase 1903 as needed based on user commands. These phases can also work together. For instance, derived inputs from a computing system can be used as a starting point for a user to explore what-if scenarios around the derived inputs.

Figure 20:
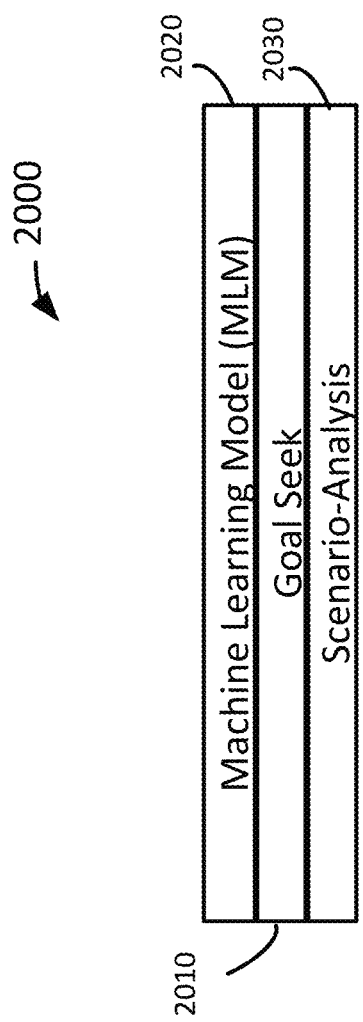
FIG. 20 illustrates a graphical user interface for selecting between goal seeking and scenario-analysis according to at least one embodiment of the present technology.

FIG. 20 illustrates a graphical user interface 2000 for selecting between goal seeking and scenario-analysis. In one or more embodiments, a user can start with a goal seeking analysis path 2010 shown in more detail with respect of FIG. 21. A goal-seeking analysis path 2010 will provide computer recommended inputs to achieve certain predicted target outputs. Alternatively, or additionally a user can be interested in selecting scenario-analysis path 2030 described in more detail with respect to FIG. 23 in which the user provides recommended inputs and sees the predicted target outputs. Alternatively, or additionally, a user can return to a design or evaluation of a machine learning model for adjusting the machine learning model (e.g., by selecting machine learning model (MLM) 2020). A machine learning model could be a time-series machine learning model with inputs including time dependent data. A time-series machine learning model could include time-independent data. Alternatively, a machine learning model could be a non-time series machine learning model for time-independent data. FIG. 17A-17C show example graphical user interfaces for designing or evaluating a machine learning model.

Figure 21:
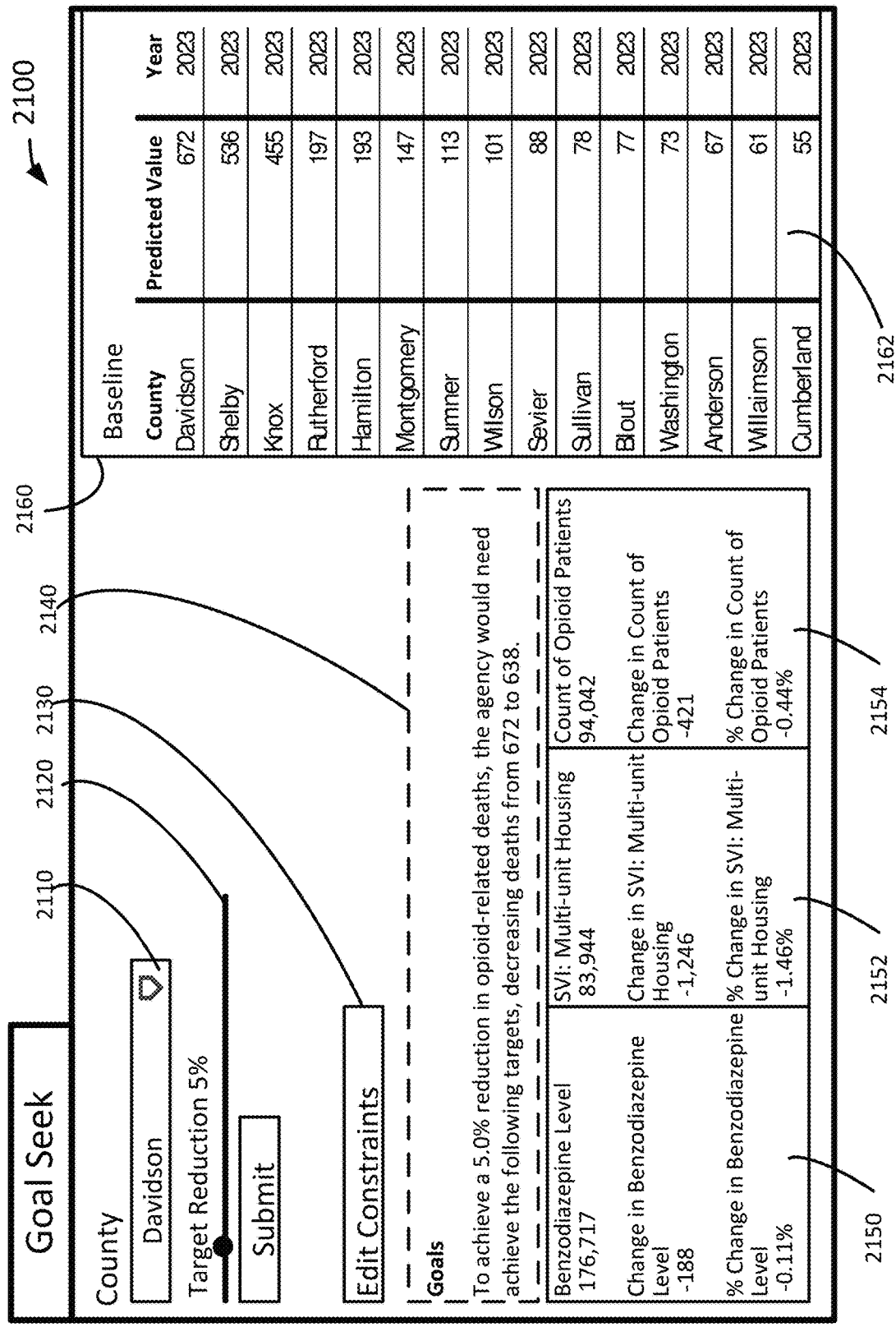
FIG. 21 illustrates a graphical user interface for goal seeking according to at least one embodiment of the present technology.

FIG. 21 illustrates a graphical user interface 2100 for goal seeking. FIG. 21 is used to simulate the real-world environment of Tennessee for making predictions and changing those predictions. Other systems could have been used such as other states or other environments.

In this example, the graphical user interface displays a selection control 2110 for specifying a predicted output. In this example a drop-down box is used to pick a component of a system (in this case a county component of a state system) for predicting an output for that component. Alternatively, or additionally a baseline table 2160 shows each county and predicted value, and the baseline table 2160 can be interactive such that a user could select a particular county from this baseline table 2160. A baseline table 2160 can be helpful for sorting the data. For example, output in sorted in the baseline table 2160 from highest to lowest in predicted value column 2162 for the user to select the county with highest predicted values. A change control 2120 is used to select a change in the predicted output. For example, in this case the change control 2120 is used for the graphical user interface 2100 to receive a request for a user-requested objective to reduce the predicted output to a user-requested amount (in this case a five percent reduction).

The goal 2140 displays on the graphical user interface 2100 a predicted output for the applied system according to a first set of inputs to the computer model (in this case 672 deaths in the selected county). A computing system can generate a set of decision deltas indicating an allowable change from the first set of inputs. One or more computer-generated recommendations are output to the graphical user interface 2100 based on derived inputs derived based on the decision deltas. The graphical user interface can display a recommendation for a second set of inputs different from the first set of inputs as shown in areas 2150, 2152 and 2154. The second set of inputs generates a predicted output for the applied system that is at the user-requested amount or below the user-requested amount. For instance, area 2150 provides a recommendation to reduce the count of Benzodiazepine levels, area 2152 provides a recommendation to reduce multi-unit housing, and area 2154 provides a recommendation to lower the number of opioid patients. Each of these recommendations comes with a precise amount to lower these variables to achieve a target that is the goal 2140.

In this example, the simulated system simulating the state of Tennessee could be considered a digital twin of the system studied (recorded data from Tennessee) for deriving the computer model. The computer model could receive real-time updates (e.g., as benzodiazepine keeps being dispensed in Tennessee). For example, the updates could come from sensors, or from data values recorded in record-keeping systems.

A computing device (e.g., computing device 1440) can use dynamic simulation analytics to determine an optimal adjustment of regressors in a fitted linear regression model required to achieve the desired change in the dependent variable.

For instance, given the vector of parameter estimates, $\hat{\beta}$ and an arbitrary vector (row) of regressors, x, the predicted mean is, $$\hat{y} = x'\hat{\beta}$$

Next, let $\delta$ be a vector of decision variables such that $\delta_i$ is the amount by which the $i^{th}$ regressor will change to meet the goal. Assuming without loss of generality that only the first k elements of x' are eligible to change, the computing system can set:

$$\delta_j = 0, \forall i > k$$

If C is the desired change in the predicted value, then the goal of this dynamic simulation analytics is to optimally satisfy the following equation:

$$\hat{y} + C = (x' + \delta')\hat{\beta}$$

Equivalently, $$\delta'\hat{\beta} = \hat{y} + C - x'\hat{\beta}$$

$$\delta'\hat{\beta} = C$$

The right-hand side of the equation is a constant. Optimality in this example is defined as minimizing the sum of squared deltas, which yields the following optimization problem to minimize $\delta'\delta$, subject to $\delta'\hat{\beta}=C$. In some embodiments, the computation includes computing a single minimum value for the computer function based on minimizing the sum of squared deltas for the set of decision deltas. A computing system can output derived inputs (e.g., in areas 2150, 2152, and 2154), or information based on derived inputs (e.g., goal 2140), corresponding to the single minimum value.

In the example shown in FIG. 21 the initial predicted state was 672 deaths in Davidson County (e.g., a computing model predicted 671.92 opioid deaths). This prediction is based on initial inputs and is in advance of adjustments made to those initial inputs (e.g., regressors shown in Table 2) to determine a target reduction of five percent. For instance, the model represented by y with inputs x' and parameters @ yields 671.92 according to the equation:

$$\hat{y} = x'\hat{\beta} = 671.92$$

In this example shown in Table 2, nine regressors and an intercept are included in the model. The current value, parameter estimate and contribution to the predicted value of each is shown in Table 2. Regressors can also be referred to in this case as model inputs, variables, and covariates. The regressors include a level 1 (L1) or level 2 (L2) indicating the lag associated with each variable in determining output for the input for a model.

TABLE 2

| Regressor | Current Value | Parameter Estimate | Contribution |
|---|---|---|---|
| Intercept | 1 | 435.686931 | 435.6869 |
| adod_count L2 | 529 | −0.214566 | −113.505 |
| Below_Poverty_L1 | 162462.3334 | 0.003377 | 548.6329 |
| Multi-Unit_Housing_L1 | 85190.33334 | 0.023777 | 2025.612 |
| Uninsured_L1 | 71925.66666 | −0.009151 | −658.192 |
| Count_of_Opioid_Patients_L1 | 94458 | 0.007930 | 749.0595 |
| Count_of_Opioid_Perscriptions_L1 | 299356 | −0.002480 | −742.28 |
| Benzodiazepine_count_L1 | 176905 | 0.003583 | 633.9167 |
| OutpatientVisitALLDOs_count_L2 | 2401 | −0.084151 | −202.047 |
| Year | 2023 | −0.991086 | −2004.97 |
| Total |  |  | 671.9156 |

The current value column represents the vector, x. The parameter estimate column represent the vector, $\hat{\beta}$. Multiplying the two values yields the contribution of the given covariate.

The goal according to FIG. 21 is to decrease the number of opioid deaths by five percent, or 33.5993, by adjusting three variables, Multi-Unit_Housing_L1, Count_of_Opioid_Patients_L1, and Benzodiazepine_count_L1. Combining the contributions of the remaining variables and the intercept, which sum to −2736.6728, yielding:

$$\hat{y} = [\,85190.33334 \ \ 94458 \ \ 176905 \ \ -2736.6728\,] \begin{bmatrix} 0.023777 \\ 0.007930 \\ 0.003583 \\ 1 \end{bmatrix} = 671.92$$

The requested change in the predicted value is −33.5993 and corresponds to a five percent reduction requested by the user using change control 2120. The user could have requested other changes in an initial predicted state such as a change greater than or less than five percent. $\delta$ is the vector of adjustments to the three variables corresponding to allowable candidate inputs for each of inputs for the model. Modeled variables need not be independent of one another. For instance, one or more inputs of different data types have a dependence on one another such that allowable candidate inputs of a first data type can influence allowable candidate input of a second data type. For example, in Table 2, a count of opioid patients (Count_of_Opioid_Patients_L1) can influence a count of opioid (Opioidsforpain_count_L1). Modeled variables can have complex interactions such as nested effects.

A computing system can find elements of $\delta$ for the modeled variables to optimally satisfy where C is the requested change of −33.5993:

$$671.92 + C =$$

$$([\,85190.33334 \ \ 94458 \ \ 176905 \ \ -2736.6728\,] + [\,\delta_1 \ \ \delta_2 \ \ \delta_3 \ \ 0\,])$$

$$\begin{bmatrix} 0.023777 \\ 0.007930 \\ 0.003583 \\ 1 \end{bmatrix} = [\,85190.33334 \ \ 94458 \ \ 176905 \ \ -2736.6728\,]$$

-continued $$\begin{bmatrix} 0.023777 \\ 0.007930 \\ 0.003583 \\ 1 \end{bmatrix} + [\delta_1 \ \delta_2 \ \delta_3] \begin{bmatrix} 0.023777 \\ 0.007930 \\ 0.003583 \end{bmatrix} = 671.92 + [\delta_1 \ \delta_2 \ \delta_3] \begin{bmatrix} 0.023777 \\ 0.007930 \\ 0.003583 \end{bmatrix}$$

Equivalently, $$C = [\delta_1 \ \delta_2 \ \delta_3] \begin{bmatrix} 0.023777 \\ 0.007930 \\ 0.003583 \end{bmatrix} - 33.5993 = [\delta_1 \ \delta_2 \ \delta_3] \begin{bmatrix} 0.023777 \\ 0.007930 \\ 0.003583 \end{bmatrix}$$

Defining optimality as minimizing the sum of squared deltas in this example, yields the following optimization problem to minimize:

$$[\delta_1 \ \delta_2 \ \delta_3] \begin{bmatrix} \delta_1 \\ \delta_2 \\ \delta_3 \end{bmatrix}$$

Subject to:

$$[\delta_1 \ \delta_2 \ \delta_3] \begin{bmatrix} 0.023777 \\ 0.007930 \\ 0.003583 \end{bmatrix} = -33.5993$$

which yields the solution, $$\delta_1 = -1246,$$

$$\delta_2 = -416, \text{ and}$$

$$\delta_3 = -188.$$

This equation can be solved using a quadradic optimization solver, available in PROC OPTMODEL software provided by SAS Institute Inc. Other examples could include optimality objectives other than the sum of squared deltas. Specifically, any objective of the form f(δ) is supported if the function is twice continuously differentiable. The differentiability constraint can be relaxed in other examples such as when the magnitude of δ is not too large, typically less than one hundred inputs.

Similarly, models other than linear regression are supported when the predicted value can be expressed as a twice continuously differentiable function of the deltas. Minimum absolute deviation (MAD) can be achieved when that function is monotonically increasing or decreasing with each element of δ.

Compared to previously developed models that resulted in under or overfitting of the data, incorrect statistical tests on the inputs, and inaccurate assessment measures, this model incorporates autoregressive terms (lags on opioid deaths) to address autocorrelation issues. While this model falls under the time-series or econometric class, our second-stage approach is more aligned with dynamic simulation analytics. Emphasizing the importance of accurate overdose death predictions, the inclusion of death lags is useful to adjust for potential under or overfitting issues. Ensuring the reliability of forecasts is paramount, as it directly impacts the validity and utility of the dynamic simulation analytic method for goal-seeking scenarios.

Additional or alternative computer techniques can be used for determining derived inputs such as quadratic estimation methods, MAD (min absolute deviation) estimation, and linear estimation. Enhanced techniques can broaden the scope and precision of dynamic simulations.

Quadratic estimation offers a versatile approach to model the behavior of dynamic systems. This method involves the minimization of squared deviations, providing a balanced compromise between accuracy and computational efficiency. Quadratic estimation is well-suited for systems with linear relationships and Gaussian error distributions, making it a reliable choice in various applications.

MAD estimation focuses on the minimization of absolute deviations rather than squared deviations. This approach is particularly advantageous when dealing with data sets that can contain outliers, as MAD is less sensitive to extreme values. By incorporating MAD estimation, the models become more robust and resistant to the influence of anomalies, leading to improved accuracy in the simulation results.

Linear estimation widens linear model's applicability to diverse scenarios, making them well-suited for real-time simulations and large-scale dynamic systems where computational efficiency is important.

Depending on the techniques applied, multiple local minimums or local maximums could be computed for different allowable sets for derived inputs. A computing system can output one or more of different allowable sets, or information based on these allowable sets, corresponding to the local minimums or maximums.

One or more embodiments allow a user to make adjustments for further controlling computation techniques and allowable options for input. For instance, edit constraints control 2130 in graphical user interface 2100 allows a user to make adjustments in computations such as adjusting allowable candidate inputs and weights in computations. For example, the user can make adjustments based on known real-world constraints.

FIG. 22 illustrates a graphical user interface 2200 for editing constraints (e.g., responsive to constraints control 2130). Graphical user interface 2200 shows a subsample of data types in column 2210. One or more embodiments provide user control over constraints for deriving inputs for data types such as the ones shown in column 2210. For example, in one or more embodiments, directional constraints, implement directional bounds for coefficients, ensuring the allowable inputs move in a specified direction. In the example shown in FIG. 22, the user can control directional constraints by specifying a direction of change from a baseline (e.g., as shown in cell 2250). As another example, one or more embodiments provide upper and lower bounds, which allow user control to fix values at a certain level or remain within a designated range. A computing system can then solve for variables for these inputs using a solver according to embodiments described herein, thereby bounding specific inputs during analysis. For instance, column 2220 allows a user to specify upper bounds for inputs according to the data types in column 2210. Column 2222 allows a user to specify lower bounds for inputs according to the data types in column 2210. These constraints can be user-defined or may be generated by the computing system. For instance, the computing system may derive bounds based on data specification sheets for a component in a system.

These constraints can indicate an extent of allowable change for the decision deltas described herein, a directionality for decision deltas, and/or a range of the decision deltas. They can be used to derive allowable function inputs to a computer function described herein. For example, a computing system can generate a set of decision deltas for the computer model corresponding to each of the inputs in column 2210. The computing system can represent the set of decision deltas by generating a vector readable by a computing device where each element of the vector indicates a directionality of change for a respective data type. For example, where an upper bound is defined for persons living in poverty the vector can indicate a change allowing for increase up to that upper bound for a first initial input from an initial predicted state in a first decision delta. As another example, a lower bound is defined for amount of air pollutant from a baseline representing an input at an initial state. A second decision delta can indicate an extent of allowable change by indicating a second directionality such as a decrease from the baseline. These bounds can also enhance user interaction in "what-if" scenarios as described in more detail with respect to FIG. 23.

One or more embodiments allow a user to assign a unit weight assignment for level changes. For example, in FIG. 22 the graphical user interface 2200 can receive a user-requested weight for changing a given data type in a computer function according to the decision delta by the user inputting or changing a weight in column 2230 (i.e., a unit weight for adjustment of input). For example, column 2230 shows an assigned weight value such that changes in persons living in poverty will weigh more to change versus benzodiazepine prescriptions. Unit weights can be used to limit change in certain data types based on user preference (e.g., public preference for controlling prescriptions versus addressing persons living in poverty). Unit weights can be assigned to reflect the weight associated with each unit change, providing a more comprehensive understanding of the economic or social implications of adjustments and addressing the challenge of allocating limited resources efficiently across various inputs (e.g., it can politically or financially cost more to address persons living in poverty then campaigns or regulations to lower Benzodiazopine prescriptions).

Selecting the submit control 2260 can cause a computing system to obtain a computer function that accounts for the user-requested weight, and compute a minimum or maximum value for the computer function according to the user-requested weight. For example, a multiplier could be applied to appropriate decision deltas so that the weight is implemented in the objective function of an optimization computation (e.g., computing a sum of squared deltas).

In one or more embodiments, a processing constraint can be used to control the processing time for determining derived inputs (e.g., a processing constraint for processing a decision delta). Allowable function inputs can be derived based on constraints (e.g., an interval constraint will limit the types of inputs according to interval adjustments or an allowable processing time can limit how many inputs are tried to find a local minimum). These constraints can be provided as default values or specified by the user. In the example, shown in FIG. 22, integer column 2240 allows user control to specify to only provide derived inputs that are whole integers rather than fractional values for numeric inputs.

By incorporating these refinements over processing, embodiments will not only provide a more robust and user-friendly interface but also offer enhanced analytical capabilities, enabling users to make more informed decisions while navigating complex scenarios.

Figure 23:
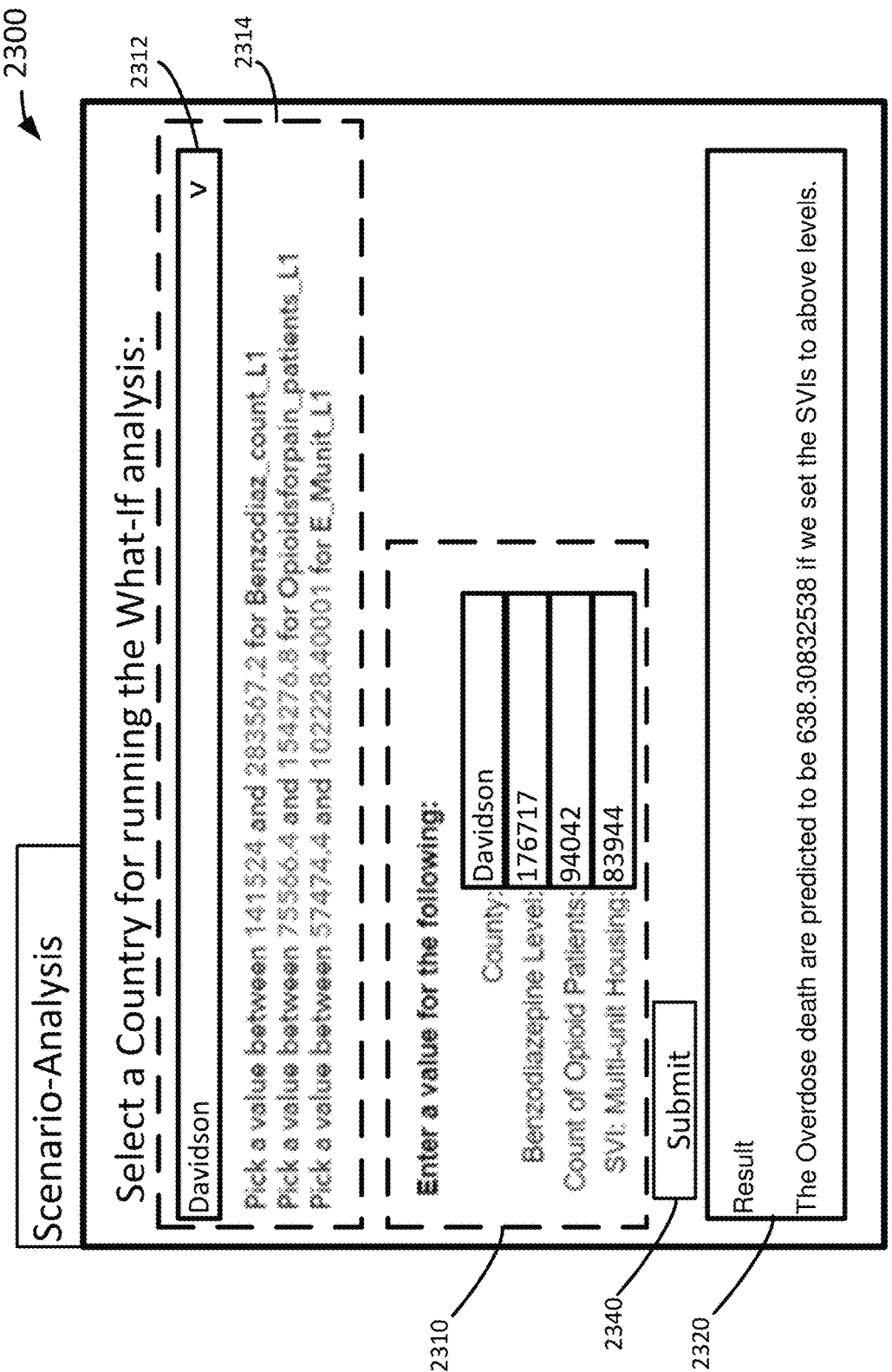
FIG. 23 illustrates a graphical user interface for scenario analysis according to at least one embodiment of the present technology.

In one or more embodiments, a computing system can generate a scenario analysis for an applied system. In scenario analysis or what-if analysis, the computing system can display a predicted output given inputs according to a scenario or event for examining or evaluating that scenario. FIG. 23 illustrates a graphical user interface 2300 for scenario analysis. In this example, inputs 2310 are selected for an event or scenario. The predicted result or outcome given those inputs is overdose deaths shown in result box 2320.

A computing system in one or more embodiments can perform scenario analysis in addition to goal seeking analysis (e.g., as a second phase to a goal seeking analysis). For instance, FIG. 23 shows a graphical user interface 2300 outputting a target prediction state in result box 2320 for the applied system by inputting the derived inputs for inputs 2310 to the computer model according to derived inputs determined from graphical user interface 2100 in FIG. 21. The inputs could be automatically input by the computing system for the user, or the user could input these values from a display according to a goal seeking analysis. The result box 2320 predicts 638 deaths in accordance with the predicted result in FIG. 21 according to goal seeking. A graphical interface (e.g., graphical user interface 2300) could then receive a request to generate a scenario for the computer model (e.g., based on changing one or more of the derived inputs). For instance, the user could manipulate those recommended inputs to see how that would change the prediction state by displaying an updated prediction state for the applied system according to the scenario for the computer model. The result box 2320 can automatically update as the inputs 2310 are changed or in response to a user indication (e.g., selecting the submit button 2340). This way the user could request adjustments to see how this would influence the prediction while still staying close to a desirable target prediction. Alternatively, or additionally, the scenario analysis could be used as a starting point for deriving constraints or as a stand-alone analysis.

In this example, the user can change or select the inputs for numerical data types by inputting a different numerical value and can use a drop-down box 2312 for changing categorical data types. One of ordinary skill in the art will appreciate other data types and methods for changing them. Additionally, this example shows constraints 2314 for the allowable choices for the user to change the scenario. These could be user defined (e.g., based on a user defined upper or lower bound) or based on the available data for deriving the computer model (e.g., categories for a data type used for deriving a computer model for predicting outcome).

One of ordinary skill in the art will appreciate that other graphical user interfaces other than ones shown here could be used to visualize derived inputs or predicted outputs according to goal seeking or scenario analysis described herein. For instance, FIG. 24 illustrates a graphical user interface 2400 for interactively displaying inputs and constraints for goal seeking or scenario analysis.

Figure 24:
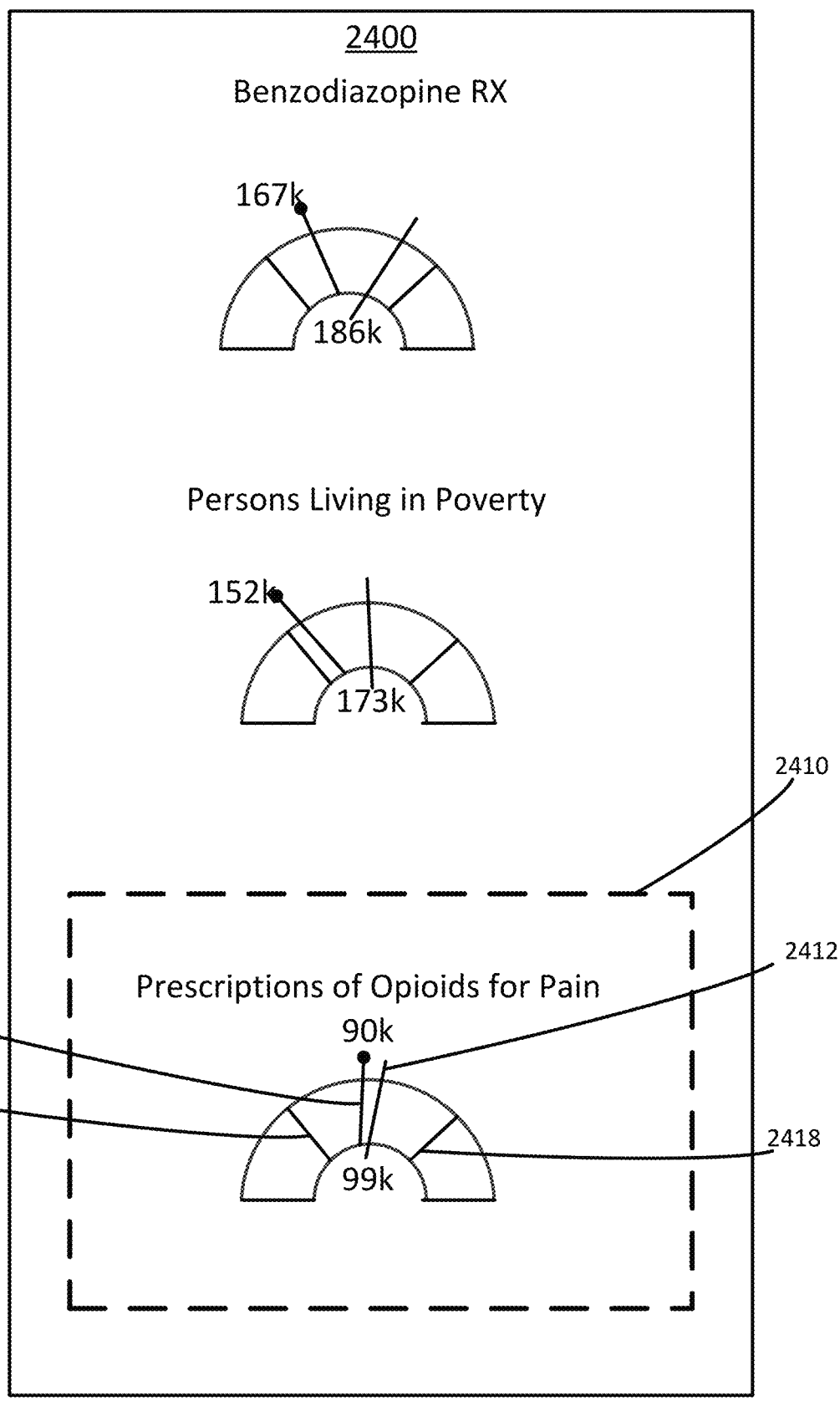
FIG. 24 illustrates a graphical user interface for interactively displaying goal seeking or scenario analysis according to at least one embodiment of the present technology.

In the example shown in FIG. 24, dials (e.g., dial 2410) are displayed for one or more data types. In this example, the displayed data types are related to amount of Benzodiazopine prescriptions (RX), number of persons living in poverty, and prescriptions of opioids for pain. Each dial can display a selected input. For instance, dial 2410 has a marker 2414 at 90,000 indicating a selection of 90,000 prescriptions of opioids for pain. The selected input could be selected based on goal seeking as described herein. For instance, 90,000 prescriptions could be a derived input for achieving a predicted outcome (e.g., a number of deaths from opioids) or a change in a predicted outcome (e.g., a decrease in predicted deaths from opioids).

Alternatively, or additionally the selected input could be selected according to scenario analysis as described herein. For instance, the user can manually move a marker to select an input to see how that would influence the predicted outcome. In this example in FIG. 24, the user can interact with graphical user interface 2400 to move a separate marker (e.g., 2412) to see how this would influence the predicted outcome, while still visualizing the derived input (e.g., at marker 2414). In one or more embodiments, constraints can also be depicted on the dial. For instance, dial 2410 has a lower bound 2416 for allowable inputs for data type prescriptions of opioids for pain, and an upper bound 2418 for allowable inputs for data type prescriptions of opioids for pain. In this example, the lower bound 2416 is set to 80,000 prescriptions of opioid pain and the upper bound 2418 is set to 100,000 prescriptions of opioids for pain. In one or more embodiments, the user can move these bounds in the graphical user interface 2400 to change the constraints. These constraints can also help orient the user when making interactive choices of inputs for scenario analysis. Updates to predicted outputs based on user interactions with graphical user interface 2400 can be shown on graphical user interface 2400 as described with respect to scenario analysis as shown in FIG. 23 and/or as shown with respect to goal seeking analysis shown in FIG. 21.

FIG. 25 illustrates a graphical user interface for computer-generated recommendations. In this example, the prediction state is a multi-level prediction state with binary outputs corresponding to opioid-related deaths and opioid-related hospital stays. A computing system according to embodiments herein can output a computer-generated recommendation that generates an updated multi-level prediction state. In this case, the output is responsive to a user request of a ten percent targeted reduction in opioid-related deaths and a two percent reduction in opioid-related hospital stays. In one or more embodiments, parameters in the model could be related to programs for deriving a predicted state such as prevention programs, and outputting derived inputs could involve making recommendations for these programs. In this example the computer-generated recommendations are made for prevention programs with a recommended five percent increase in media advertisements, two percent increase in community outreach personal, and 0.5 percent in percentage of school curriculum dedicated to opioid awareness. In one or more embodiments, computer recommendations can aid in user planning. For example, predicted outputs could be associated with environmental responses or needs. In this example, with the multi-level prediction, the computing system can make recommendations for needed rehabilitation facilities, outpatient services, and mental health professionals given the prediction.

Embodiments herein are useful for adjusting a target or a multi-level target to a new level and test for adequacy of the newly derived inputs (taking into account weights and desired directions). This can be useful for policymakers understanding the long-term consequences of different policy interventions. Some practical uses for policy development include harm reduction strategies, prevention programs, modeling patterns, identifying high-risk populations, epidemiological modeling, treatment capacity planning, legislation and regulation.

In the context of substance abuse used in the examples herein, harm reduction strategies could include assessing the long-term effects of harm reduction strategies, such as needle exchange programs or supervised consumption facilities. Policymakers can explore how these interventions impact substance use patterns, public health outcomes, and associated weights. In the context of prevention programs, embodiments can model the effectiveness of prevention programs targeting different demographics and risk factors associated with substance use. Policymakers can evaluate the long-term impact of school-based education, community outreach, and media campaigns on preventing substance use initiation. Modeling patterns can be applied to, for example, modeling opioid prescribing patterns. Dynamic simulation analytics as described herein can be used to create dynamic models that simulate the complex interactions and feedback loops involved in opioid prescribing. This includes factors such as patient demographics, healthcare provider behaviors, regulatory changes, and the impact of various interventions. Dynamic simulation analytics models can help identify high-risk populations for opioid overdose based on various factors such as age, demographics, medical history, and geographic location. This information can guide targeted interventions and resources to the areas where they are most needed.

Embodiments herein can be used for epidemiological modeling in which dynamic simulation analytics can simulate the spread and prevalence of disease or disorder in a population (e.g., spread of virus or substance use disorders over time, considering factors such as initiation, relapse, and recovery). Policymakers can test the impact of prevention programs, treatment availability, and harm reduction strategies on the overall burden of substance use in the population. Dynamic simulation analytics can model the dynamics of treatment capacity, including the availability of rehabilitation facilities, outpatient services, and mental health professionals. Policymakers can use simulations to optimize the allocation of resources to meet the changing demands for substance use disorder treatment over time. Dynamic simulation analytics can model the impact of legislative changes and regulatory frameworks on substance use patterns, access to treatment, and public health outcomes. Policymakers can simulate the effects of policy changes such as decriminalization, legalization, or changes in sentencing guidelines.

One or more embodiments provide useful computing devices, graphical user interfaces systems, and methods for deriving inputs for a computer model. These tools can be used for a variety of fields beyond the public health field.

What is claimed is:

1. A computer-program product tangibly embodied in a non-transitory machine-readable storage medium, the computer-program product including instructions operable to cause a computing system to:

display, at a graphical user interface, a selection element for selecting a simulated system;

receive, using the graphical user interface, a selection of the simulated system;

responsive to the selection of the simulated system, obtain, by the computing system, an initial predicted state for the simulated system according to an initial set of inputs to a computer model, wherein the computer model is generated based on data of at least two data types that are different data types;

display, at the graphical user interface, a control element for controlling a predicted output for the simulated system;

receive, at the graphical user interface, a manipulation of the control element, wherein the manipulation indicates to the computing system a request for a computer-generated set of inputs that will generate, for the simulated system, a user-requested change in the initial predicted state according to the manipulation of the control element;

responsive to the manipulation of the control element, the computing system:
  generates a set of decision deltas for the computer model,
    wherein each decision delta of the set of decision deltas corresponds to a respective one of the at least two data types,
    wherein a first decision delta corresponding to a first data type of the at least two data types indicates an extent of allowable change of a first initial input of the initial set of inputs; and
    wherein a second decision delta corresponding to a second data type of the at least two data types indicates an extent of allowable change of a second initial input of the initial set of inputs;
  obtains a computer function for the set of decision deltas;
  determines allowable function inputs to the computer function, wherein the allowable function inputs are derived based on the set of decision deltas, the user-requested change, and the computer model; and
  computes, using one or more of the allowable function inputs, at least one minimum or maximum value for the computer function; and
based on the at least one minimum or maximum value for the computer function, output, to the graphical user interface, computer-generated output information based on the computer-generated set of inputs that, according to the computer model, will affect the user-requested change in the initial predicted state in the simulated system, wherein the computer-generated set of inputs comprise:
  a first computer-generated input corresponding to the first data type that is different from the first initial input; and
  a second computer-generated input corresponding to the second data type that is different from the second initial input.

2. The computer-program product of claim 1, wherein the instructions are operable to cause the computing system to:
  display, at the graphical user interface, a value representation of the initial predicted state for the simulated system;
  receive the request for a derived set of inputs by receiving a user-requested objective to decrease or increase the value representation by a user-requested amount; and
  output the computer-generated output information by outputting a computer-generated recommendation that generates an updated prediction state that meets or exceeds the user-requested objective.

3. The computer-program product of claim 1,
  wherein the extent of allowable change of the first initial input indicates one or more of:
    a range of change for the first initial input within the computer model;
    an upper bound for the first initial input; and
    a lower bound for the first initial input; and
  wherein the first computer-generated input is within the extent of allowable change of the first initial input.

4. The computer-program product of claim 1, wherein the instructions are operable to cause the computing system to:
  generate a set of decision deltas for the computer model by generating a vector, wherein each element of the vector indicates a directionality of change for a respective data type;
  wherein the first decision delta indicates an extent of allowable change by indicating a first directionality for the first initial input from the initial predicted state; and
  wherein the second decision delta indicates an extent of allowable change by indicating a second directionality for the second initial input from the initial predicted state.

5. The computer-program product of claim 1, wherein the instructions are operable to cause the computing system to:
  output a target prediction state for the simulated system by inputting the derived set of inputs to the computer model;
  receive, at the graphical user interface, a request to generate a scenario for the computer model by changing one or more of the computer-generated set of inputs; and
  display an updated prediction state for the simulated system according to the scenario for the computer model.

6. The computer-program product of claim 1,
  wherein the simulated system is a simulation of a real-world environment;
  wherein the computer model is generated according to data values recorded from the real-world environment; and
  wherein the instructions are operable to cause the computing system to output the computer-generated output information by outputting a computer-generated recommendation for the real-world environment based on the computer-generated set of inputs.

7. The computer-program product of claim 1,
  wherein the simulated system is a digital twin of a studied system used for generating the computer model;
  wherein the generating the computer model comprises generating the computer model from real-time sensor data from the studied system; and
  wherein the instructions are operable to cause the computing system to output the computer-generated output information by outputting a computer-generated recommendation for the simulated system based on the computer-generated set of inputs.

8. The computer-program product of claim 1,
  wherein the at least two data types comprise five or more data types;
  wherein the computer model is generated based on time series data for the five or more data types;
  wherein the time series data comprises recorded output data dependent on a time lag from recorded input data in the time series data; and
  wherein the computer model accounts for multiple lags of different lengths in the time series data.

9. The computer-program product of claim 1,
  wherein the at least two data types comprise at least 100 data types; and
  wherein the computer function is at least twice differentiable.

10. The computer-program product of claim 1, wherein the instructions are operable to cause the computing system to:
  compute at least one minimum or maximum value by computing a single minimum value for the computer function based on minimizing a sum of squared deltas for the set of decision deltas; and
  output the computer-generated output information by outputting the computer-generated set of inputs corresponding to the single minimum value.

11. The computer-program product of claim 1,
wherein the data of at least two data types have a dependence on one another such that allowable candidate inputs of a first data type can influence allowable candidate input of a second data type; and
wherein the user-requested change in the initial predicted state indicates a change of 5 percent or greater in the initial predicted state.

12. The computer-program product of claim 1, wherein the computer model is generated by generating a linear regression model.

13. The computer-program product of claim 1, wherein the instructions are operable to cause the computing system to output the computer-generated set of inputs based on one or more computer operations according to linear estimation, quadratic estimation, or minimum absolute deviation (MAD).

14. The computer-program product of claim 1,
wherein the instructions are operable to cause the computing system to receive, via the graphical user interface, one or more user-requested constraints on the allowable function inputs, wherein the one or more user-requested constraints indicate:
an extent of allowable change for the first decision delta;
a directionality for the first decision delta;
a range of the first decision delta; and
a processing constraint for processing the first decision delta; and
wherein the allowable function inputs to the computer function are further derived based on the user-requested constraints.

15. The computer-program product of claim 1, wherein the instructions are operable to cause the computing system to:
receive, via the graphical user interface, a user-requested weight for changing the first data type in the computer function according to the first decision delta;
obtain the computer function that accounts for the user-requested weight; and
compute the at least one minimum or maximum value for the computer function according to the user-requested weight.

16. The computer-program product of claim 1, wherein the instructions are operable to cause the computing system to:
compute the least one minimum or maximum value by generating multiple local minimums or multiple local maximums according to different allowable sets for the computer-generated set of inputs; and
output one or more of the different allowable sets.

17. The computer-program product of claim 1, wherein the instructions are operable to cause the computing system to:
display, in the graphical user interface, one or more indications of model fit of the computer model to the data of the at least two data types;
display, in the graphical user interface, one or more parameters of the computer model;
receive a user request in the graphical user interface to change one or more of the model fit or the one or more parameters of the computer model;
update the computer model to an updated computer model according to the user request; and
update, according to the updated computer model, the computer-generated set of inputs using the at least one minimum or maximum value for the computer function and the user-requested change in the initial predicted state.

18. The computer-program product of claim 1, wherein the instructions are operable to cause the computing system to:
display, at the graphical user interface, a predicted output for the simulated system according to a first set of inputs to the computer model, wherein the user-requested change indicates to reduce the predicted output to a user-requested amount;
generate the set of decision deltas indicating an allowable change from the first set of inputs; and
output the computer-generated output information by outputting a recommendation for a second set of inputs different from the first set of inputs, wherein the second set of inputs generates a predicted output for the simulated system that is at the user-requested amount or below the user-requested amount.

19. The computer-program product of claim 1, wherein the instructions are operable to cause the computing system to:
display, at the graphical user interface, multiple value representations corresponding to a multi-level predicted state for the simulated system; and
output the computer-generated set of inputs by outputting a computer-generated recommendation that generates an updated multi-level prediction state.

20. The computer-program product of claim 1,
wherein the computer model predicts a health status of members of a studied system;
wherein the data of the at least two data types comprises medical-related data for the studied system; and
wherein the instructions are operable to cause the computing system to output a prediction for a health status of members of the simulated system by inputting the computer-generated set of inputs to the computer model.

21. The computer-program product of claim 1,
wherein the computer model predicts an environmental status of a studied system;
wherein the data of the at least two data types comprises ecological-related data for the studied system; and
wherein the instructions are operable to cause the computing system to output a prediction for an environmental status of the simulated system by inputting the computer-generated set of inputs to the computer model.

22. A computer-implemented method comprising:
displaying, at a graphical user interface, a selection element for selecting a simulated system;
receiving, using the graphical user interface, a selection of the simulated system;
responsive to the selection of the simulated environment, obtaining, by a computing system, an initial predicted state for the simulated system according to an initial set of inputs to a computer model, wherein the computer model is generated based on data of at least two data types that are different data types;
displaying, at the graphical user interface, a control element for controlling a predicted output for the simulated system;
receiving, at the graphical user interface, a manipulation of the control element, wherein the manipulation indicates to the computing system a request for a computer-generated set of inputs that will generate, for the simulated system, a user-requested change in the initial predicted state according to the manipulation of the control element;
responsive to the manipulation of the control element, the computing system:
  generating a set of decision deltas for the computer model,
    wherein each decision delta of the set of decision deltas corresponds to a respective one of the at least two data types,
    wherein a first decision delta corresponding to a first data type of the at least two data types indicates an extent of allowable change of a first initial input of the initial set of inputs; and
    wherein a second decision delta corresponding to a second data type of the at least two data types indicates an extent of allowable change of a second initial input of the initial set of inputs;
  obtaining a computer function for the set of decision deltas;
  determining allowable function inputs to the computer function, wherein the allowable function inputs are derived based on the set of decision deltas, the user-requested change, and the computer model; and
  computing, using one or more of the allowable function inputs, at least one minimum or maximum value for the computer function; and
based on the at least one minimum or maximum value for the computer function, outputting, to the graphical user interface, computer-generated output information based on the computer-generated set of inputs that, according to the computer model, will affect the user-requested change in the initial predicted state in the simulated system, wherein the computer-generated set of inputs comprise:
  a first computer-generated input corresponding to the first data type that is different from the first initial input; and
  a second computer-generated input corresponding to the second data type that is different from the second initial input.

23. The computer-implemented method of claim 22,
wherein the extent of allowable change of the first initial input indicates one or more of:
  a range of change for the first initial input within the computer model;
  an upper bound for the first initial input; and
  a lower bound for the first initial input; and
wherein the first computer-generated input is within the extent of allowable change of the first initial input.

24. The computer-implemented method of claim 22,
wherein generating a set of decision deltas for the computer model comprises generating a vector;
wherein each element of the vector indicates a directionality of change for a respective data type;
wherein the first decision delta indicates an extent of allowable change by indicating a first directionality for the first initial input from the initial predicted state; and
wherein the second decision delta indicates an extent of allowable change by indicating a second directionality for the second initial input from the initial predicted state.

25. The computer-implemented method of claim 22,
wherein the at least two data types comprise five or more data types;
wherein the computer model is generated based on time series data for the five or more data types;
wherein the time series data comprises recorded output data dependent on a time lag from recorded input data in the time series data; and
wherein the computer model accounts for multiple lags of different lengths in the time series data.

26. The computer-implemented method of claim 22,
wherein the at least two data types comprise at least 100 data types; and
wherein the computer function is at least twice differentiable.

27. The computer-implemented method of claim 22,
comprising receiving, via the graphical user interface, one or more user-requested constraints on the allowable function inputs;
wherein the one or more user-requested constraints indicate:
  an extent of allowable change for the first decision delta;
  a directionality for the first decision delta;
  a range of the first decision delta; and
  a processing constraint for processing the first decision delta; and
wherein the allowable function inputs to the computer function are further derived based on the user-requested constraints.

28. The computer-implemented method of claim 22,
comprising receiving, via the graphical user interface, a user-requested weight for changing the first data type in the computer function according to the first decision delta;
wherein the computer function accounts for the user-requested weight; and
computing the at least one minimum or maximum value for the computer function comprises computing according to the user-requested weight.

29. The computer-implemented method of claim 22, comprising:
  displaying, in the graphical user interface, one or more indications of model fit of the computer model to the data of the at least two data types;
  displaying, in the graphical user interface, one or more parameters of the computer model;
  receiving a user request in the graphical user interface to change one or more of the model fit or the one or more parameters of the computer model;
  updating the computer model to an updated computer model according to the user request; and
  updating, according to the updated computer model, the computer-generated set of inputs using the at least one minimum or maximum value for the computer function and the user-requested change in the initial predicted state.

30. A computing device comprising processor and memory, the memory containing instructions executable by the processor wherein the computing device is configured to:
  display, at a graphical user interface, a selection element for selecting a simulated system;
  receive, using the graphical user interface, a selection of the simulated system;
  responsive to the selection of the simulated system, obtain, by the computing device, an initial predicted state for the simulated system according to an initial set of inputs to a computer model, wherein the computer model is generated based on data of at least two data types that are different data types;

display, at the graphical user interface, a control element for controlling a predicted output for the simulated system;

receive, at the graphical user interface, a manipulation of the control element, wherein the manipulation indicates to the computing device a request for a computer-generated set of inputs that will generate, for the simulated system, a user-requested change in the initial predicted state according to the manipulation of the control element;

responsive to the manipulation of the control element, the computing device:
  generates a set of decision deltas for the computer model,
    wherein each decision delta of the set of decision deltas corresponds to a respective one of the at least two data types,
    wherein a first decision delta corresponding to a first data type of the at least two data types indicates an extent of allowable change of a first initial input of the initial set of inputs; and
    wherein a second decision delta corresponding to a second data type of the at least two data types indicates an extent of allowable change of a second initial input of the initial set of inputs;
  obtains a computer function for the set of decision deltas;
  determines allowable function inputs to the computer function, wherein the allowable function inputs are derived based on the set of decision deltas, the user-requested change, and the computer model; and
  computes, using one or more of the allowable function inputs, at least one minimum or maximum value for the computer function; and
based on the at least one minimum or maximum value for the computer function, output, to the graphical user interface, computer-generated output information based on the computer-generated set of inputs that, according to the computer model, will affect the user-requested change in the initial predicted state in the simulated system, wherein the computer-generated set of inputs comprise:
  a first computer-generated input corresponding to the first data type that is different from the first initial input; and
  a second computer-generated input corresponding to the second data type that is different from the second initial input.

\* \* \* \* \*